(12) United States Patent
Kellerman

(10) Patent No.: US 9,784,938 B2
(45) Date of Patent: Oct. 10, 2017

(54) WATERFALL-TYPE CABLE ROUTER

(71) Applicant: Cablofil, Inc., Mascoutah, IL (US)

(72) Inventor: Dallas Kellerman, Belleville, IL (US)

(73) Assignee: CABLOFIL, INC., Mascoutah, IL (US)

( * ) Notice: Subject to any disclaimer, the term of this patent is extended or adjusted under 35 U.S.C. 154(b) by 0 days.

(21) Appl. No.: 15/197,909

(22) Filed: Jun. 30, 2016

(65) Prior Publication Data

US 2016/0308339 A1 Oct. 20, 2016

Related U.S. Application Data

(63) Continuation-in-part of application No. 15/067,889, filed on Mar. 11, 2016, which is a continuation-in-part of application No. 14/753,977, filed on Jun. 29, 2015.

(60) Provisional application No. 62/031,473, filed on Jul. 31, 2014, provisional application No. 62/017,904, filed on Jun. 27, 2014.

(51) Int. Cl.
| | |
|---|---|
| *H02G 3/04* | (2006.01) |
| *G02B 6/44* | (2006.01) |
| *F16L 3/22* | (2006.01) |
| *F16M 13/02* | (2006.01) |

(52) U.S. Cl.
CPC .............. *G02B 6/4471* (2013.01); *F16L 3/22* (2013.01); *F16M 13/02* (2013.01); *H02G 3/045* (2013.01); *H02G 3/0443* (2013.01)

(58) Field of Classification Search
CPC ....... H02G 3/0443; H02G 3/22; G02B 6/4478
See application file for complete search history.

(56) References Cited

U.S. PATENT DOCUMENTS

| | | | | |
|---|---|---|---|---|
| 2,656,998 A * | 10/1953 | Ullberg, Jr. | .......... | H02G 3/0443 193/41 |
| 5,937,131 A * | 8/1999 | Haataja | ................ | G02B 6/4459 385/134 |
| 6,037,543 A * | 3/2000 | Nicoli | .................. | H02G 3/0608 138/157 |
| 6,522,823 B1 * | 2/2003 | Wentworth | .......... | G02B 6/4459 385/134 |
| 6,586,680 B1 * | 7/2003 | Nelson | ................. | G02B 6/4478 174/135 |
| 7,184,644 B2 | 2/2007 | Johnson et al. | | |

(Continued)

FOREIGN PATENT DOCUMENTS

WO 2015200910 12/2015

OTHER PUBLICATIONS

Patent Cooperation Treaty, International Search Report for PCT/US2015/038327, dated Sep. 30, 2015, 3 pages.

*Primary Examiner* — Bradley Duckworth
(74) *Attorney, Agent, or Firm* — Bryan Cave LLP

(57) ABSTRACT

A waterfall-type cable router for routing cables out of cable trays includes a curved ramp having a front portion and a rear portion, a vertical left curved wall transitioning into the curved ramp and extending the length of the left side of the curved ramp, and a vertical right curved wall transitioning into the curved ramp and extending the length of the right side of the curved ramp. The rear portion of the curved ramp has a population of tabs configured to attach to an extender. The extender allows a waterfall-type cable router assembly to rest on a wire cable tray with a sidewall of a higher length than the length of the cable router.

2 Claims, 51 Drawing Sheets

(56) References Cited

U.S. PATENT DOCUMENTS

| | | | |
|---|---|---|---|
| 7,470,859 B1 | 12/2008 | Gretz | |
| 7,601,922 B2 * | 10/2009 | Larsen | F16L 3/26 |
| | | | 174/481 |
| 7,693,386 B2 * | 4/2010 | Waszak | G02B 6/4459 |
| | | | 211/26 |
| 8,263,863 B2 * | 9/2012 | Young | H02G 3/0443 |
| | | | 174/135 |
| 8,315,069 B2 * | 11/2012 | Caveney | H02G 3/0608 |
| | | | 361/826 |
| 8,319,120 B2 * | 11/2012 | Caveney | G02B 6/4459 |
| | | | 174/101 |
| 8,502,071 B2 * | 8/2013 | Caveney | H02G 3/22 |
| | | | 174/100 |
| 9,184,578 B2 * | 11/2015 | Winn | H02G 3/0443 |
| 9,466,959 B2 * | 10/2016 | Larsen | H02G 3/045 |
| 2004/0201975 A1 | 10/2004 | Bravo et al. | |
| 2008/0023212 A1 * | 1/2008 | Larsen | H02G 3/0443 |
| | | | 174/101 |
| 2010/0038496 A1 * | 2/2010 | Sjoqvist | H02G 3/0443 |
| | | | 248/73 |
| 2011/0286785 A1 | 11/2011 | Brouwer et al. | |
| 2012/0211609 A1 * | 8/2012 | Mandic | H02G 3/0443 |
| | | | 248/65 |
| 2012/0223192 A1 | 9/2012 | Donaldson et al. | |
| 2015/0380918 A1 | 12/2015 | Kellerman | |
| 2016/0181778 A1 * | 6/2016 | Kellerman | H02G 7/16 |
| | | | 174/95 |

\* cited by examiner

WATERFALL-TYPE CABLE ROUTER

CROSS-REFERENCE TO RELATED APPLICATIONS

This application is a continuation-in-part of U.S. patent application Ser. No. 15/067,889, filed on Mar. 11, 2016, which is a continuation-in-part of U.S. patent application Ser. No. 14/753,977, filed on Jun. 29, 2015, which claimed priority to U.S. Provisional Patent Application No. 62/017,904, filed on Jun. 27, 2014, and to U.S. Provisional Patent Application No. 62/031,473, filed Jul. 31, 2014. The contents of each of the foregoing are incorporated herein by reference in their entireties.

FIELD OF THE DISCLOSURE

The present disclosure generally relates to accessories for cable tray systems, and more particularly to waterfall- or spillover-type cable routers for routing cables in and out of cable trays.

BACKGROUND

Cable trays or troughs are used to support cables which run through, over, and around buildings. Cable trays may have both straight and curved (horizontal, vertical, and/or other angled) sections to accommodate the installation requirements of particular settings.

Waterfall- or spillover-type cable router devices assist in routing cables in/out of and over the side walls of the cable tray. Prior art cable router devices can be easily moved out of place or may sag under the weight of cables carried by the cable routers. Therefore, waterfall- or spillover-type cable routers that do not possess these and other shortcomings are necessary.

SUMMARY OF THE DISCLOSURE

Among the various aspects of the present disclosure is the provision of a water-fall type cable router as substantially shown and described.

Briefly, therefore, one aspect of the disclosure is directed to a waterfall-type cable router for use with a cable tray having a curved ramp with a front portion and a rear portion, the ramp having a left side and a right side, a vertical left curved wall transitioning into the curved ramp and extending the length of the left side of the curved ramp, wherein the left curved wall has a first portion extending forward of the front portion of the curved ramp, and a vertical right curved wall transitioning into the curved ramp and extending the length of the right side of the curved ramp, wherein the right curved wall has a first portion extending forward of the front portion of the curved ramp. The rear portion of the curved ramp preferably includes a plurality of flexible tabs in a first position extending downward from the rear portion of the curved ramp, wherein the flexible tabs are configured to allow bending to a second position to secure the cable router to the cable tray. The cable router may also include a plurality of secure tabs extending downward from the rear portion of the curved ramp wherein the tabs comprise a fastener hole to receive a fastener to secure the cable router to an extender.

In certain embodiments, the extender attached to the rear portion of the curved ramp may include a plate with a top portion and a bottom portion, and have a front face and a rear face. A plurality of tabs in a first position may extend downward from the rear portion of the curved ramp wherein at least some of the tabs are configured to allow bending to a second position away from the front face. The top portion of the plate may include a plurality of holes, wherein the holes at the top portion of the plate of the extender align with the fastener hole of the tabs on the cable router such that front face of the extender rests flush against the tabs of the cable router, and wherein the extender rests below and flush against the rear portion of the ramp.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

Figure 1:
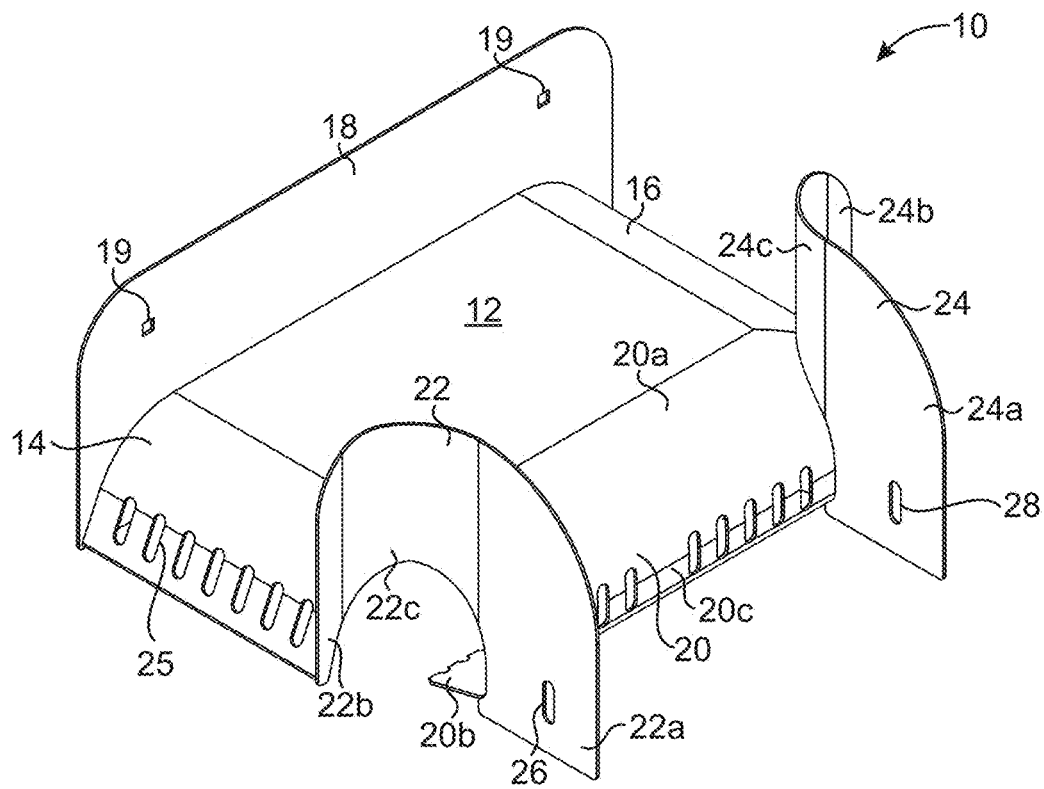
FIG. 1 is a left front perspective view of a cable router according to a first aspect of the disclosure.

The accompanying Figures and this description depict and describe aspects of a cable router in accordance with the present disclosure, and features and components thereof. It should also be noted that any references herein to front and back, right and left, top and bottom and upper and lower are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a waterfall- or spillover-type cable router. As noted above, waterfall- or spillover-type cable routers assist in routing cables in/out of and over the side walls of cable trays. Accordingly, aspects of the waterfall- or spillover-type cable routers described are capable of routing cables from a first direction to a second direction, wherein the second direction is substantially perpendicular to the first direction.

With reference to FIGS. 1-19, an aspect of a waterfall-type cable router 10 is described in detail. Waterfall-type cable router 10, or simply cable router 10, includes a floor 12 on which cables routed out from cable tray will rest. At least a portion of floor 12 is substantially horizontal. Extending downward from the left side of floor 12 is a left ramp 14. At least a portion of left ramp 14 is curved along a first horizontal axis that is substantially perpendicular to the first direction (see FIG. 2) and substantially parallel to the second direction (see FIG. 2). Extending downward from the right side of floor 12 is a right ramp 16. At least a portion of right ramp 16 is curved along a second horizontal axis that is substantially perpendicular to the first direction and substantially parallel to the second direction and the first horizontal axis.

A vertical rear wall 18 extends a width along the back of cable router 10 from the end of left ramp 14 to the end of right ramp 16. In certain aspects, vertical rear wall 18 may extend past the ends of left and/or right ramps 14, 16. In certain aspects, vertical rear wall 18 may stop short of the ends of left and/or right ramps 14, 16. A population of apertures 19, such as holes or slots, extends through vertical rear wall 18 and, as described more fully elsewhere herein, may be used to secure one or more brackets to cable router 10.

Furthermore, extending downward from the front side of floor 12 is a front ramp 20. At least a portion of front ramp 20 is curved along a third horizontal axis that is substantially parallel to the first direction and substantially perpendicular to the second direction and the first and second horizontal axes. Front ramp 20 has a downward curving portion 20a that extends away from vertical rear wall 18 and a brace portion 20b that extends toward vertical rear wall 18. Accordingly, front ramp 20 curves away from and then back toward rear wall 18. Front ramp 20 also includes a substantially vertical ramp portion 20c extending between downward curving portion 20a and brace portion 20b; however, it will be understood that, in certain aspects, downward curving portion 20a and brace portion 20b may be formed of a continuous curve. Brace portion, or simply brace, 20b provides additional support for cable router 10 when installed on a cable tray 40 (see FIGS. 8-10, 12-18). Furthermore, as will be described more fully elsewhere herein, brace 20b includes a population of notches 21 along the length of the brace 20b. It will also be understood that, in certain aspects, front ramp 20 includes downward curving portion 20a but does not include brace portion 20b or substantially vertical ramp portion 20c.

Figure 3:
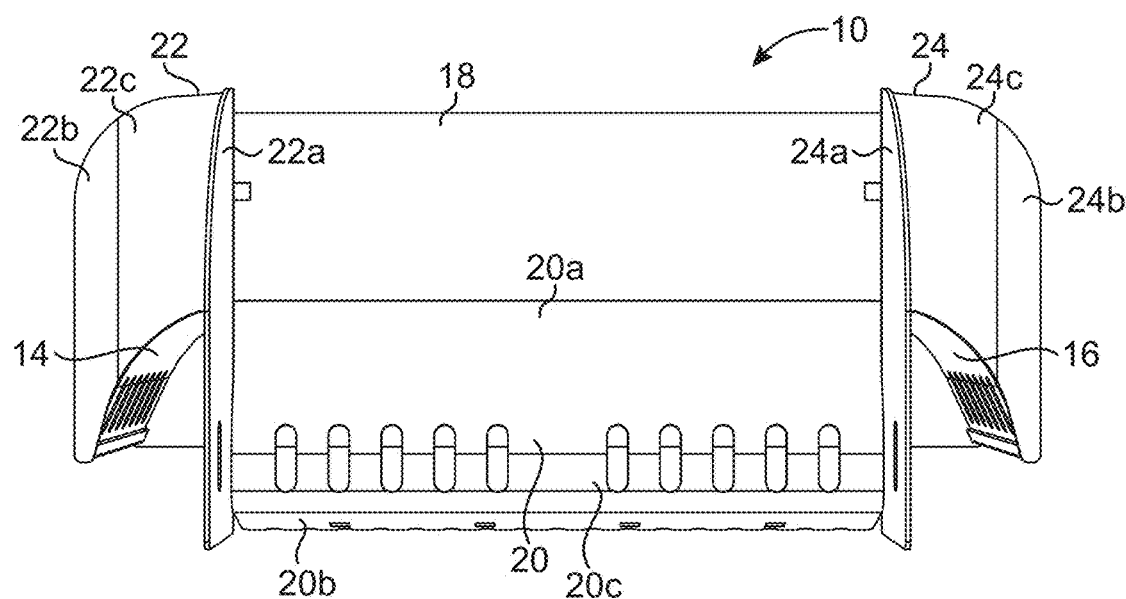
FIG. 3 is a front perspective view of a cable router according to a first aspect of the disclosure.
Figure 4:
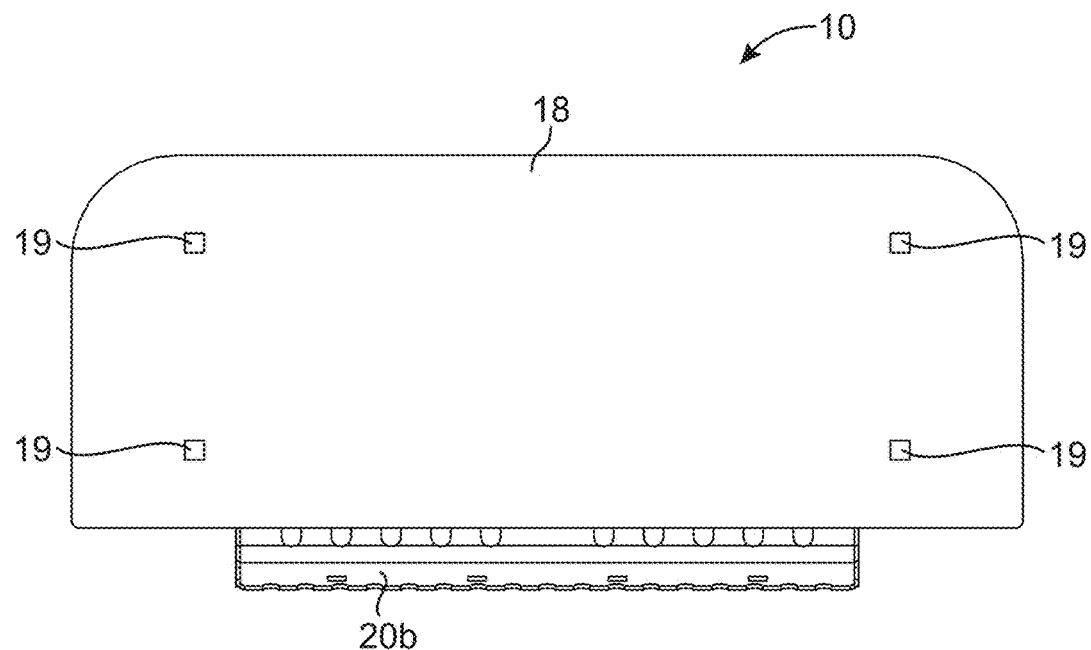
FIG. 4 is a rear perspective view of a cable router according to a first aspect of the disclosure.
Figure 5:
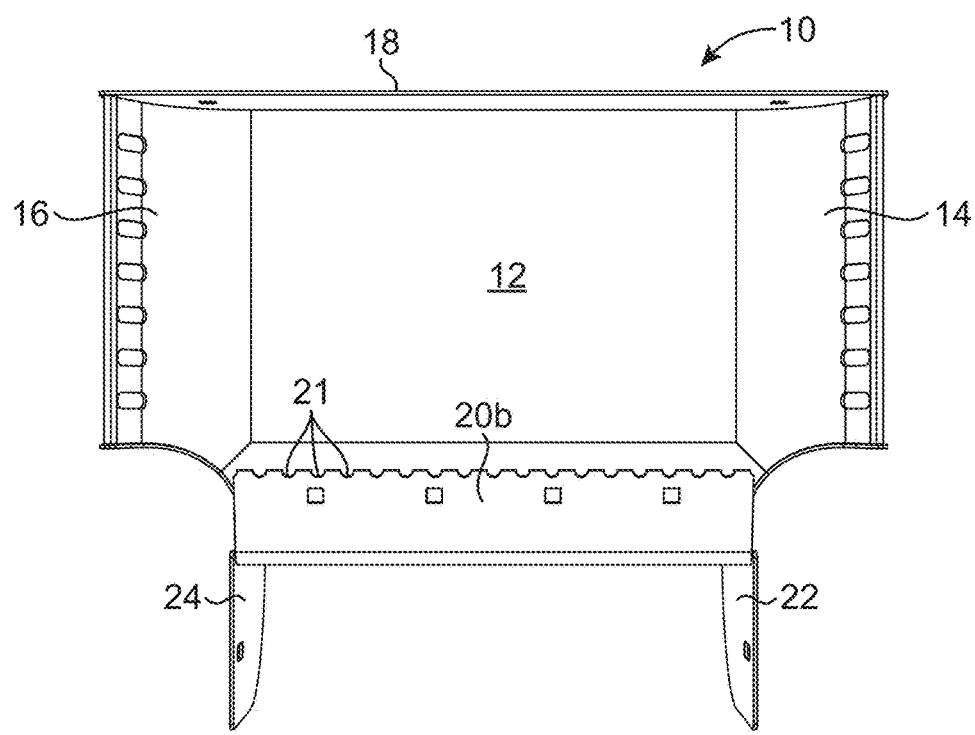
FIG. 5 is a bottom perspective view of a cable router according to a first aspect of the disclosure.
Figure 6:
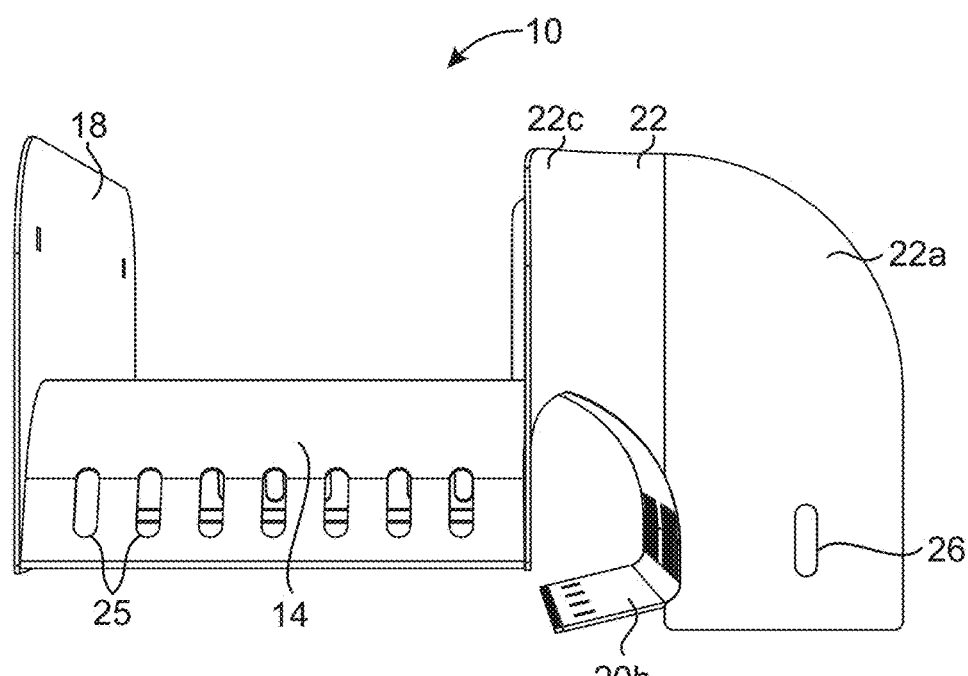
FIG. 6 is a left perspective view of a cable router according to a first aspect of the disclosure.
Figure 7:
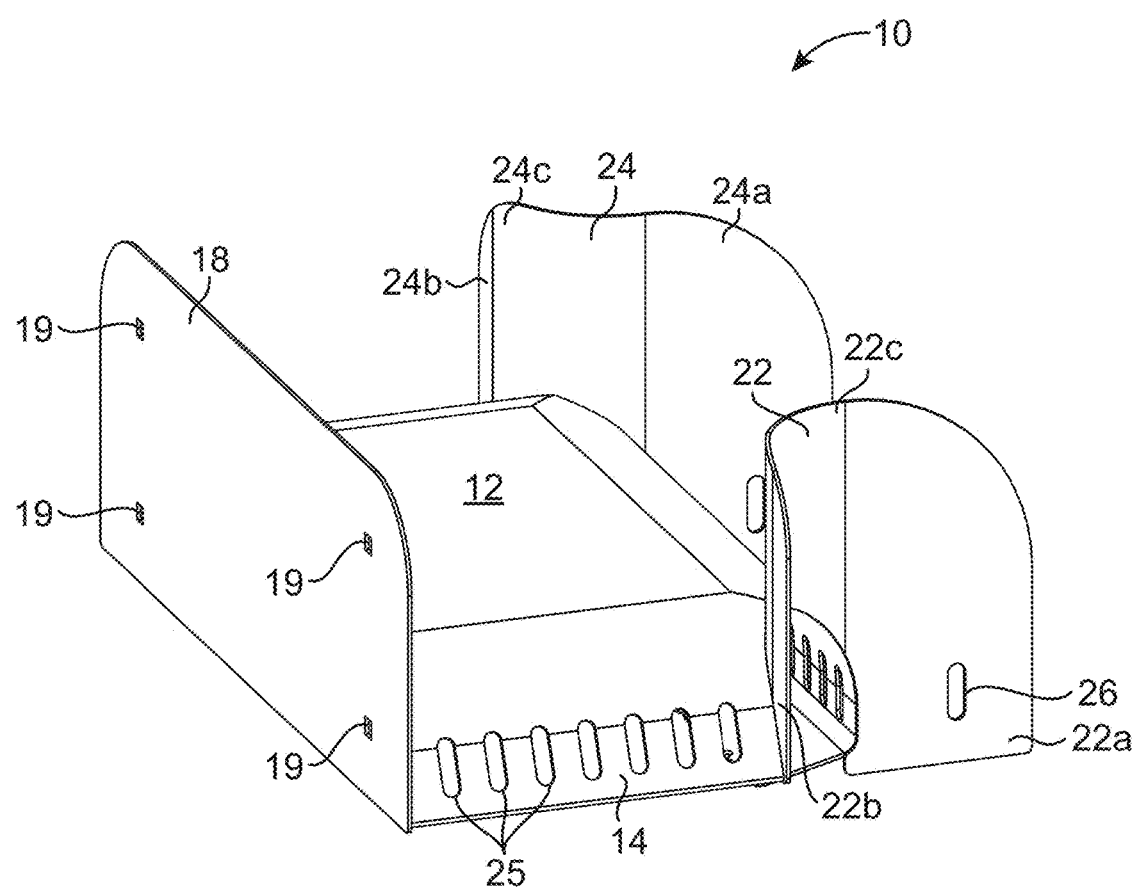
FIG. 7 is a left rear perspective view of a cable router according to a first aspect of the disclosure.

Left ramp 14, right ramp 16, and/or front ramp 20 can include a population of apertures 25, such as holes or slots, extending through left ramp 14, right ramp 16, and/or front ramp 20. The apertures 25 may be used to secure one or more cables to the ramp(s). For instance, zip ties, hose clamps, straps, etc. may be looped through one or more of the population of apertures 25 and around cables routed through cable router 10 to secure cables to cable router 10. Additionally, as illustrated in FIG. 3, in one embodiment, the bottoms of left and right ramps 14, 16 are hemmed. That is, the bottom edge of left ramp 14 is folded over back on itself and the bottom edge of right ramp 16 is folded over back on itself. Hemming left and right ramps 14, 16 creates a smooth edge on the bottom of left and right ramps 14, 16 and reduces or eliminates the potential for cables to snag on the bottom of left and right ramps 14, 16.

Referring again to FIGS. 1-7, cable router 10 further includes a vertical left curved wall 22 extending from left ramp 14 and front ramp 20. A first portion 22a of vertical left curved wall 22 extends forward along the second direction away from rear wall 18. Accordingly, first portion 22a of vertical left curved wall 22 is substantially perpendicular to rear wall 18. Furthermore, a second portion 22b of vertical left curved wall 22 extends leftward along the first direction. Accordingly, second portion 22b of vertical left curved wall 22 is substantially parallel to rear wall 18. A third or curved portion 22c of vertical left curved wall 22 is curved along a first vertical axis that is substantially perpendicular to the first direction and substantially perpendicular to the horizontal portion of floor 12. Thus, vertical left curved wall 22 includes first portion 22a substantially perpendicular to rear wall 18 and second portion 22b substantially parallel to rear wall 18 with third portion 22c transitioning between first and second portions 22a, 22b.

It will be understood that, in certain aspects of cable router 10, vertical left curved wall 22 may not include second portion 22b. In such aspects, the vertical left curved wall 22 terminates at the tangent closest to rear wall 18, such that the tangent is parallel to rear wall 18. It will be understood that, in certain aspects of cable router 10, vertical left curved wall 22 may not include first portion 22a. In such aspects, the vertical left curved wall 22 terminates at the tangent closest to ramp portion 20c, such that the tangent is perpendicular to rear wall 18. It will be understood that, in certain aspects of cable router 10, vertical left curved wall 22 may not include first portion 22a and second portion 22b. In such aspects, the vertical left curved wall 22 terminates at the tangent closest to rear wall 18, such that the tangent is parallel to rear wall 18 and terminates at the tangent closest to ramp portion 20c, such that the tangent is perpendicular to rear wall 18.

An aperture 26, such as a hole or slot, extends through first portion 22a of vertical left curved wall 22 and, as described more fully elsewhere herein, may be used to secure a vertical support drop to cable router 10.

Similarly, cable router 10 further includes a vertical right curved wall 24 extending from right ramp 16 and front ramp 20. As shown in FIGS. 1-7, a first portion 24a of vertical right curved wall 24 extends forward along the second direction away from rear wall 18. Accordingly, first portion 24a of vertical right curved wall 24 is substantially perpendicular to rear wall 18. Furthermore, a second portion 24b of vertical right curved wall 24 extends leftward along the first direction. Accordingly, second portion 24b of vertical right curved wall 24 is substantially parallel to rear wall 18. A third or curved portion 24c of vertical right curved wall 24 is curved along a first vertical axis that is substantially perpendicular to the first direction and substantially perpendicular to the horizontal portion of floor 12. Thus, vertical right curved wall 24 includes first portion 24a substantially perpendicular to rear wall 18 and second portion 24b substantially parallel to rear wall 18 with third portion 24c transitioning between first and second portions 24a, 24b.

It will be understood that, in certain aspects of cable router 10, vertical right curved wall 24 may not include second portion 24b. In such aspects, the vertical right curved wall 24 terminates at the tangent closest to rear wall 18, such that the tangent is parallel to rear wall 18. It will be understood that, in certain aspects of cable router 10, vertical right curved wall 24 may not include first portion 24a. In such aspects, the vertical right curved wall 24 terminates at the tangent closest to ramp portion 20c, such that the tangent is perpendicular to rear wall 18. It will be understood that, in certain aspects of cable router 10, vertical right curved wall 24 may not include first portion 24a and second portion 24b. In such aspects, the vertical right curved wall 24 terminates at the tangent closest to rear wall 18, such that the tangent is parallel to rear wall 18 and terminates at the tangent closest to ramp portion 20c, such that the tangent is perpendicular to rear wall 18.

An aperture 28, such as a hole or slot, extends through first portion 24a of vertical right curved wall 24 and, as described more fully elsewhere herein, may be used to secure a vertical support drop to cable router 10.

Vertical left and right curved walls 22, 24 assist in routing the cables (not shown) from the first direction to the second direction. The radius of third or curved portions 22c, 24c provide a smooth transition from the first direction to the second direction. Accordingly, cables, for example fiber optic cables, routed through cable router 10 are not kinked or bent at a sharp angle (as the performance, reliability and integrity of fiber optic cables can be negatively impacted if the fiber optic cables are kinked or bent).

One or both of first portions 22a, 24a of vertical left and right curved walls 22, 24 may extend a distance, y, from front ramp 20. In certain aspects, for example, the distance, y, from front ramp 20 may be from about 0 mm to about 100 mm (e.g., about 0 mm, about 5 mm, about 10 mm, about 20 mm, about 30 mm, about 40 mm, about 50 mm, about 60 mm, about 70 mm, about 80 mm, about 90 mm, about 100 mm). In certain aspects, the distance, y, from front ramp 20 may be about 70 mm. In certain aspects, the distance, y, from front ramp 20 may be greater than about 100 mm.

Figure 2:
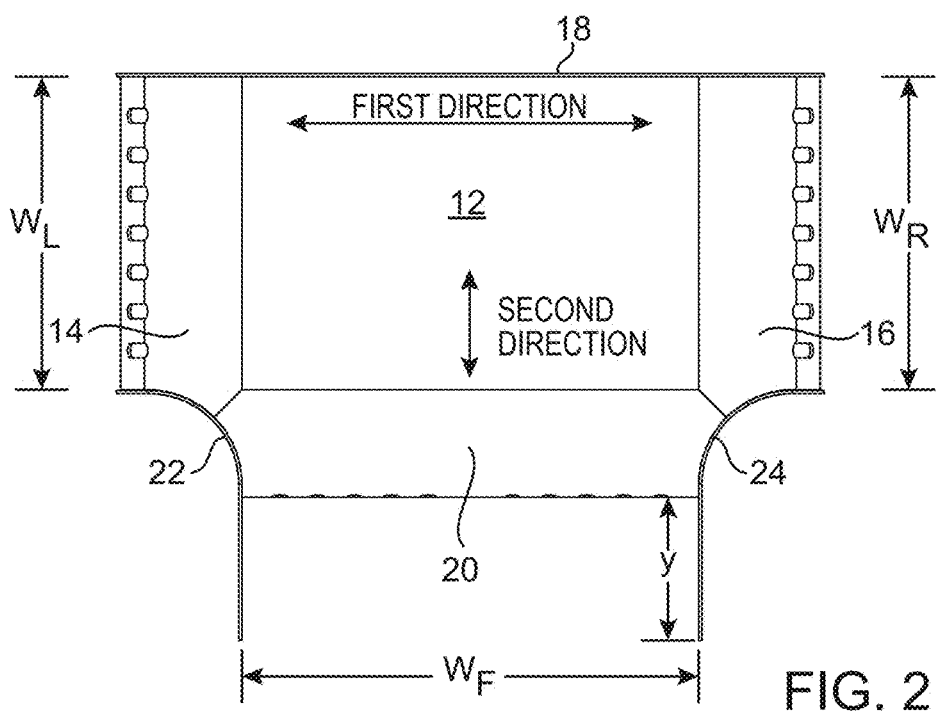
FIG. 2 is a top view of a cable router according to a first aspect of the disclosure.

As shown in FIG. 2, left ramp 14 may have a width, $W_L$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, left ramp 14 has a width, $W_L$, of about 100 mm (about 4 inches). In other aspects, for example, left ramp 14 has a width, $W_L$, of about 150 mm (about 6 inches). Right ramp 16 may have a width, $W_R$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, right ramp 16 has a width, $W_R$, of about 100 mm (about 4 inches). In other aspects, for example, right ramp 16 has a width, $W_R$, of about 150 mm (about 6 inches). In certain aspects, the widths, $W_L$ and $W_R$, of left and right ramps 14, 16 are substantially the same. However, in other aspects, the widths, $W_L$ and $W_R$, of left and right ramps 14, 16 may be different. Front ramp 20 may have a width, $W_F$, from about 40 mm to about 200 mm (e.g., about 40 mm, about 50 mm, about 60 mm, about 70 mm, about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm). In one embodiment, front ramp 20 has a width, $W_F$, of about 120 mm (about 4.75 inches). In other aspects, for example, front ramp 20 has a width, $W_F$, of about 150 mm (about 6 inches). In yet other aspects, for example, front ramp 20 has a width, $W_F$, of about 200 mm (about 8 inches). In various aspects, width, $W_F$, of front ramp 20 is substantially the same as widths, $W_L$ and $W_R$, of left and right ramps 14, 16. In various aspects, width, $W_F$, of front ramp 20 is greater than widths, $W_L$ and $W_R$, of left and right ramps 14, 16 because potentially all of the cables routed up left and right ramps 14, 16 exit front ramp 20. Therefore, the greater width of front ramp 20 allows it to accept the cables routed up left and right ramps 14, 16.

In one embodiment, cable router 10 is constructed of steel or an alloy thereof; however, it will be understood that any type of suitable metal, or plastic, may be used, including, but not limited to, steel, stainless steel, aluminum or alloys thereof. Left, right and front ramps 14, 16, 20 and substantially horizontal portion of floor 12 and may be formed of a single sheet of metal. Vertical rear wall 18 and vertical left and right curved walls 22, 24 may be welded to floor 12. In other aspects, cable router 10 may be constructed in a single or multiple pieces of suitable plastics.

Referring now to FIGS. 8-19, cable router 10 is shown installed on or affixed to cable tray 40. In various embodiments, cable tray 40 is a basket-type cable tray comprising a lattice of longitudinal wires 42 and transverse wires 44 secured to one another. Although cable tray 40 is shown as a basket-style cable tray, it will be understood that cable router 10 may be installed on other types and/or constructions of cable tray. Cable tray 40 is substantially a U-shaped trough having a bottom portion 46 and two sidewalls 48 extending upward substantially perpendicular to bottom portion 46. When cable router 10 is installed on cable tray 40, the first direction is parallel to longitudinal wires 42 and the second direction is parallel to transverse wires 44. That is, the first direction is substantially parallel to cable tray 40 and the second direction is substantially perpendicular to cable tray 40. Furthermore, when cable router 10 is installed on cable tray 40, floor 12 is at a height above the top of sidewall 48 and left and right ramps 14, 16 extend downward from above the top of sidewall 48 to below the top of sidewall 48. Left and right ramps 14, 16 reside between side walls 48, 48 above bottom portion 46. Additionally, front ramp 20 extends downward from above the top of sidewall 48 to below the top of sidewall 48. At least a portion of front ramp 20 resides outside of sidewalls 48, 48. Thus, cable router 10 can be said to straddle sidewall 48 wherein portions of cable router 10 are above the top of sidewall 48 and portions of cable router 10 are below the top of sidewall 48 and wherein portions of cable router 10 are between sidewalls 48, 48 and portions of cable router 10 are outside of sidewalls 48, 48. Certain prior art cable routers that require cutting or modification of the cable tray for the cable router to be installed. However, because cable router 10 straddles cable tray 40, cable tray 40 does not need to be cut or modified for cable router 10 to be installed. By not requiring any cuts or modifications to the cable tray, the structural integrity of cable tray 40 is maintained with the use of cable router 10.

In certain aspects, cable router 10 is substantially T-shaped (see FIG. 2). Cables typically run along a first direction in cable tray 40, wherein the first direction is parallel to longitudinal wires 42. If certain cables are desired to drop out of cable tray 40, those cables can be run up left and/or right ramps 14, 16 and will rest on floor 12 including substantially horizontal portion. Those cables will then make a substantially 90 degree turn and will exit cable router 10 out and down front ramp 20 along a second direction. Accordingly, cables routed through cable router 10 will be directed from a first direction to a second direction, wherein the second direction is substantially perpendicular to the first direction. Cable router 10 also permits cables to run under floor 12 of cable router 10 and not be diverted out cable router 10. Cable router 10 does not take up significant space in cable tray 40 and therefore does not impact the routing of cables along cable tray 40.

When installed on cable tray 40, brace 20b of cable router 10 rests on a longitudinal wire 42 of sidewall 48 thereby reducing or preventing cable router 10 from sagging under the weight of cables carried therein. That is, the weight of the cables in cable router 10 is transferred by brace 20b into sidewall 48 preventing front ramp 20 from moving downward or rotating rearward. Furthermore, one or more of the population of notches 21 can rest on a transverse wire 44 of sidewall 48 thereby reducing or preventing cable router 10 from moving longitudinally along cable tray 40. If present, notches 21 may be semicircular in shape; however, it will be understood that notches may also be a variety of shapes including, but not limited to, triangular, square, hexagonal, octagonal, etc. The combination of brace 20b and the population of notches 21 therein serve to lock cable router 10 in place on cable tray 40. Further holding cable router 10 in place are two brackets 50, wherein a first end of each is bolted or otherwise secured to the bottom portion 46 of cable tray 40 and a second end of each is bolted or otherwise secured to rear wall 18 of cable router 10. In one embodiment, bolts will extend through bracket(s) and holes 19 in vertical rear wall 18 of cable router 10. Additionally, bolts may extend through clips 70 (see FIG. 12) wherein clips 70 may be used to secure or lock brackets 50 to longitudinal and/or transverse wires 42, 44 of cable tray 40. It will be understood that in other aspects, fewer than two brackets 50 may be used to affix cable router 10 to cable tray 40. It will also be understood that in yet other aspects, greater than two brackets 50 may be used to affix cable router 10 to cable tray 40, and fastened by various methods.

Figure 19:
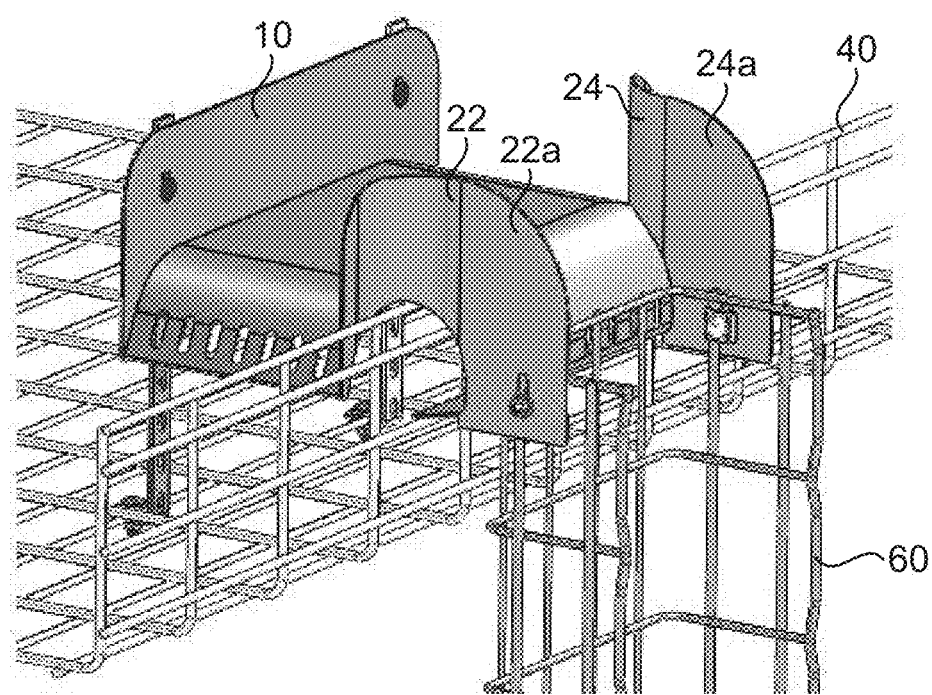
FIG. 19 is a left front perspective view of a cable router affixed to a cable tray and including a vertical drop according to a first aspect of the disclosure.
Figure 20:
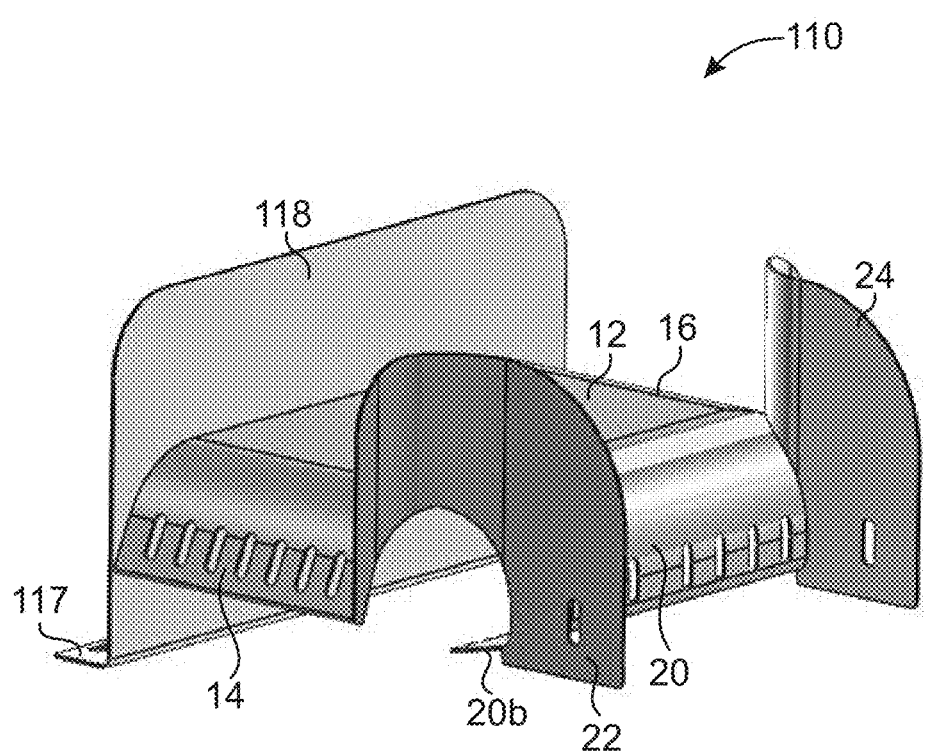
FIG. 20 is a left front perspective view of a cable router according to a second aspect of the disclosure.
Figure 21:
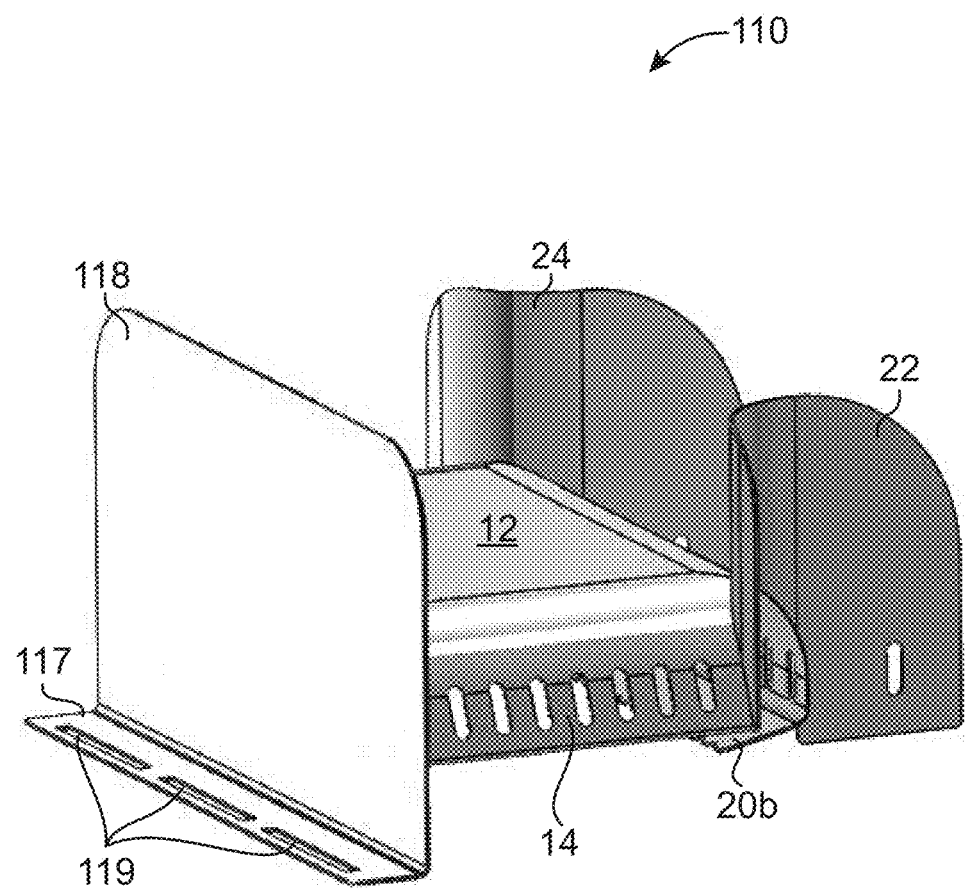
FIG. 21 is a right rear perspective view of a cable router according to a second aspect of the disclosure.
Figure 22:
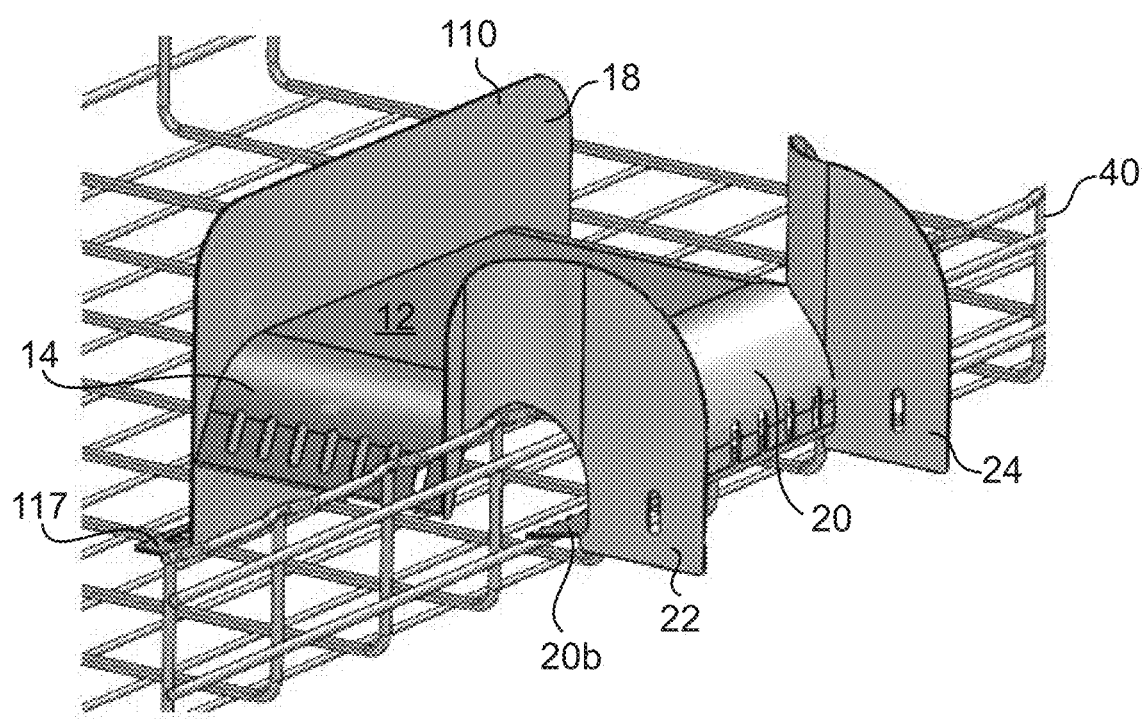
FIG. 22 is a left front perspective view of a cable router affixed to a cable tray according to a second aspect of the disclosure.
Figure 23:
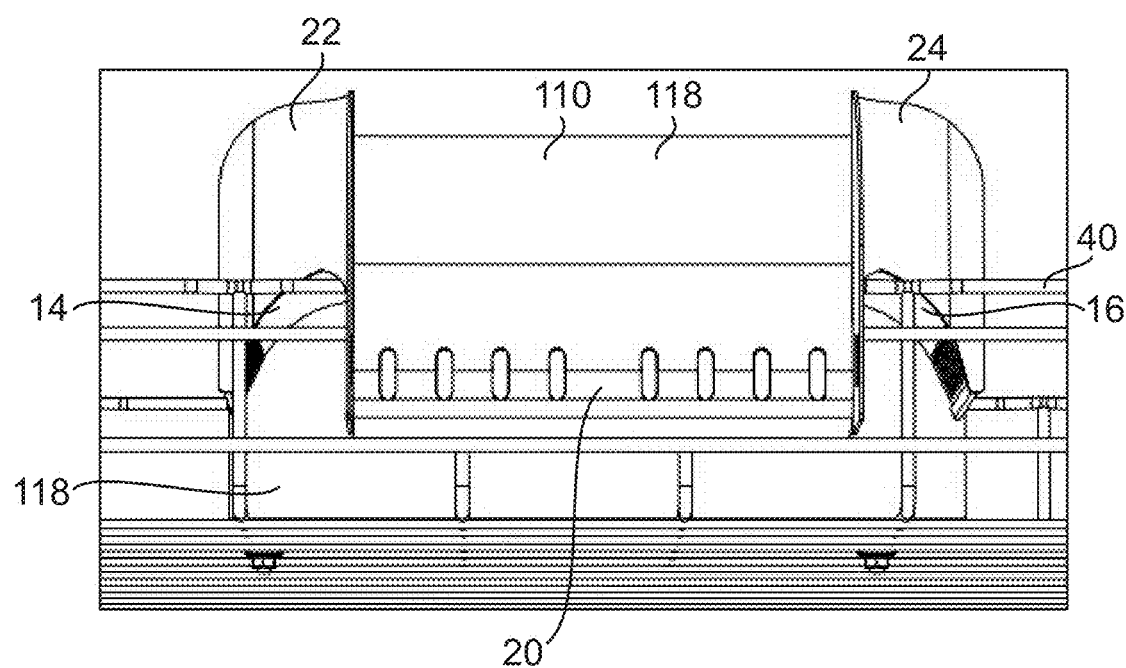
FIG. 23 is a front perspective view of a cable router affixed to a cable tray according to a second aspect of the disclosure.
Figure 24:
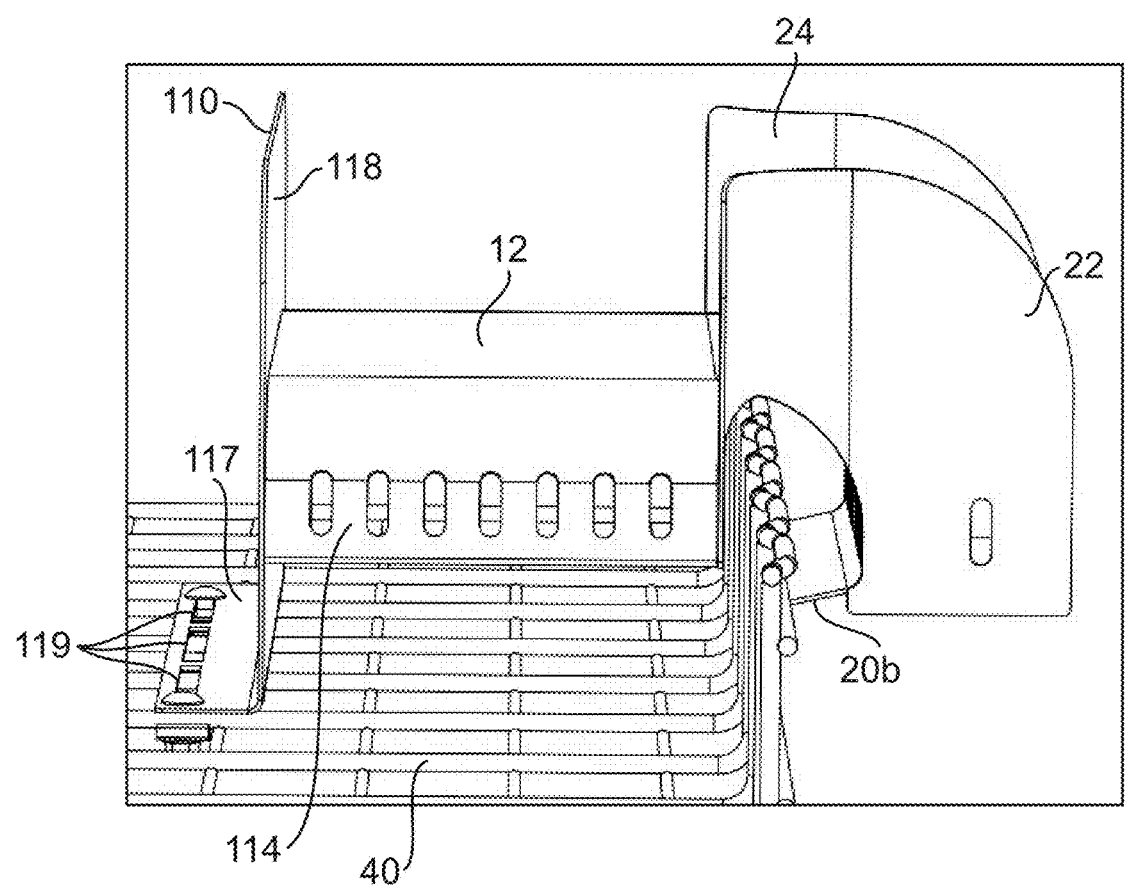
FIG. 24 is a left perspective view of a cable router affixed to a cable tray according to a second aspect of the disclosure.
Figure 25:
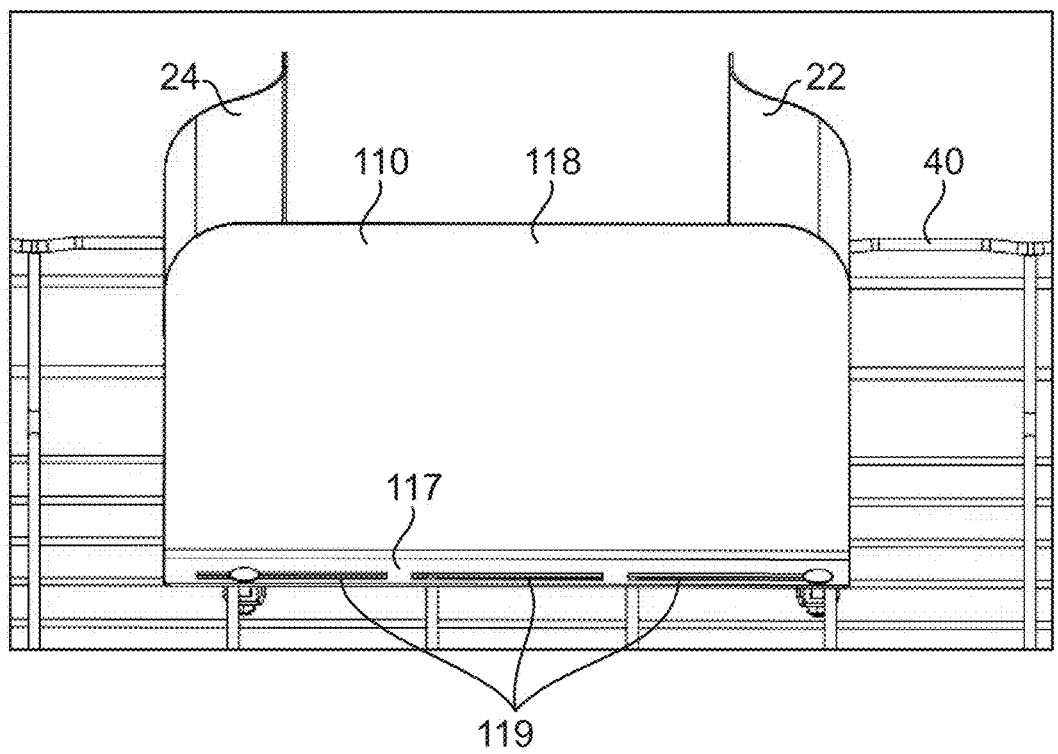
FIG. 25 is a rear perspective view of a cable router affixed to a cable tray according to a second aspect of the disclosure.
Figure 26:
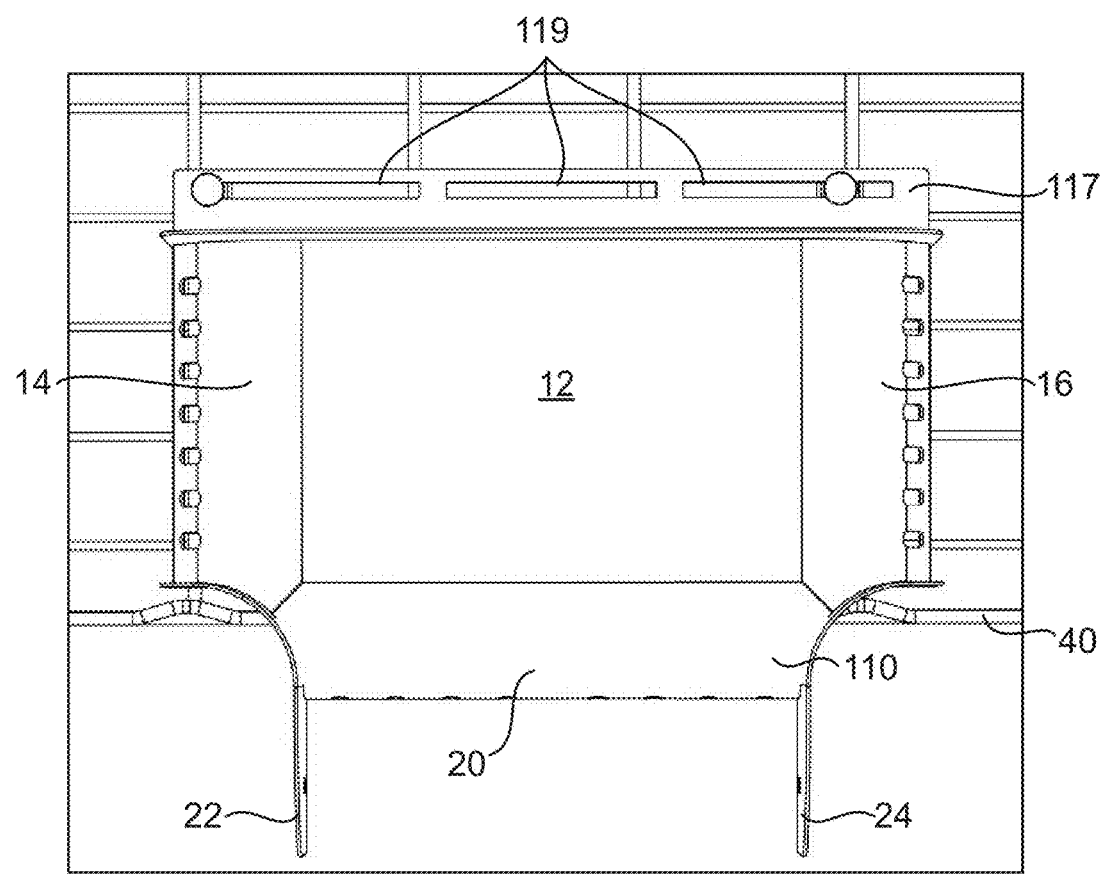
FIG. 26 is a top view of a cable router affixed to a cable tray according to a second aspect of the disclosure.
Figure 27:
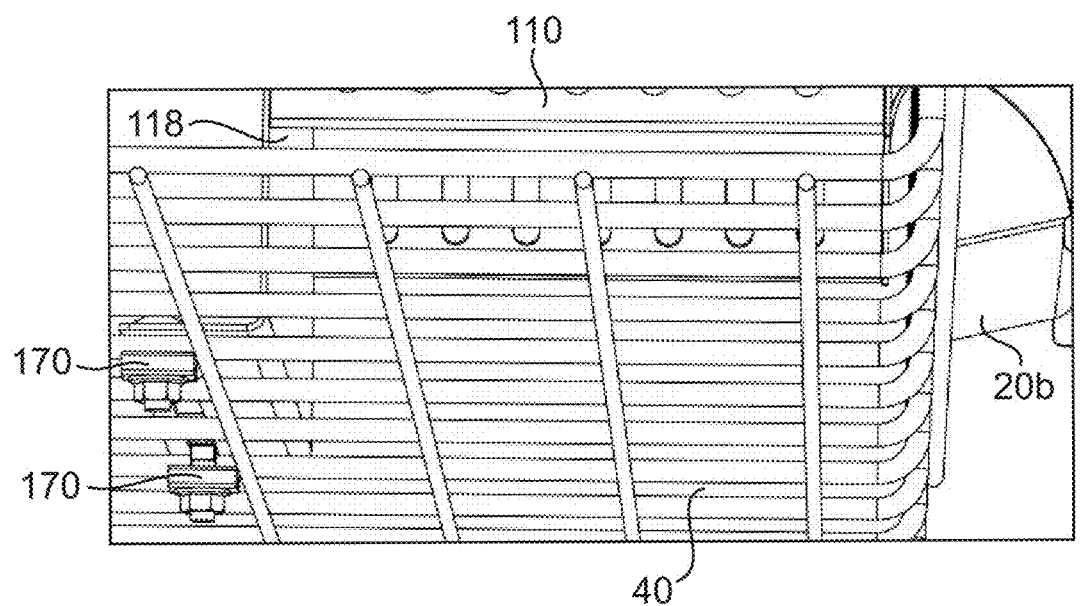
FIG. 27 is a left bottom perspective view of a cable router affixed to a cable tray according to a second aspect of the disclosure.

With reference to FIG. 19, a vertical support drop 60 may be bolted or otherwise secured to cable router 10. Vertical support drop 60 is shown between first portions 22a, 24a of vertical left and right curved walls 22, 24. As illustrated, in certain aspects, bolts may extend through apertures 26, 28 of vertical left and right curved walls 22, 24 to secure vertical support drop 60 to cable router 10. In other aspects, cable router 10 may include or be adapted to accept clips (not shown) on first portions 22a, 24a of vertical left and right curved walls 22, 24. Vertical support drop 60 may be secured to cable router 10 using the clips in addition to or instead of bolts through apertures 26, 28. Cables routed through cable router 10 may be further routed down vertical support drop 60. Vertical support drop 60 is shown as a basket-style vertical support drop having construction similar to that of cable tray 40. However, it will be understood that other types and/or construction of vertical support drop may be used.

Alternative aspects of cable trays according to the disclosure are illustrated in FIGS. 20-56 and are described in detail below. Some features of one or more of cable trays 10, 110, 210, 310, 410, 510, 610, 710, 810, 910, and 1010 are common to one another and, accordingly, descriptions of such features in one aspect should be understood to apply to other aspects. Furthermore, particular characteristics of one aspect may be used in combination with, or instead of, particular characteristics of another aspect.

FIGS. 20-27 illustrate another aspect of cable router 110 wherein a flange 117 extends substantially horizontally from the bottom edge of vertical rear wall 118. Cable router 110 also includes floor 12, left ramp 14, right ramp 16, front ramp 20 (including brace portion 20b), vertical left curved wall 22, and vertical right curved wall 24. Vertical rear wall 118 may extend a distance below the ends of left and right ramps 14, 16 such that the bottom edge of vertical rear wall 118 may be located proximate and/or contact bottom portion 46 of cable tray 40 to provide support for cable router 110. A population of apertures 119, such as slots or holes, extends along the length of flange 117. Unlike cable router 10, flange 117 and the population of apertures 119 permit cable router 110 to be installed or affixed to cable tray 40 without the need for brackets 50. Bolts may extend through one or more of the population of apertures 119 to secure cable router 110 to cable tray 40. Additionally, bolts may extend through clips 170 (see FIG. 27) wherein clips 170 may be used to secure or lock vertical rear wall 118 to longitudinal and/or transverse wires 42, 44 of cable tray 40. Prior to tightening of bolts and/or when the bolts are loosened, the population of apertures 119 (e.g., slots or holes) permit easy adjustment and/or alignment of cable router 110 along the first direction (e.g., the longitudinal direction of cable tray 40). When cable router 110 is located in the desired location on cable tray 40, the bolts are tightened to secure cable router 110 in place.

Figure 28:
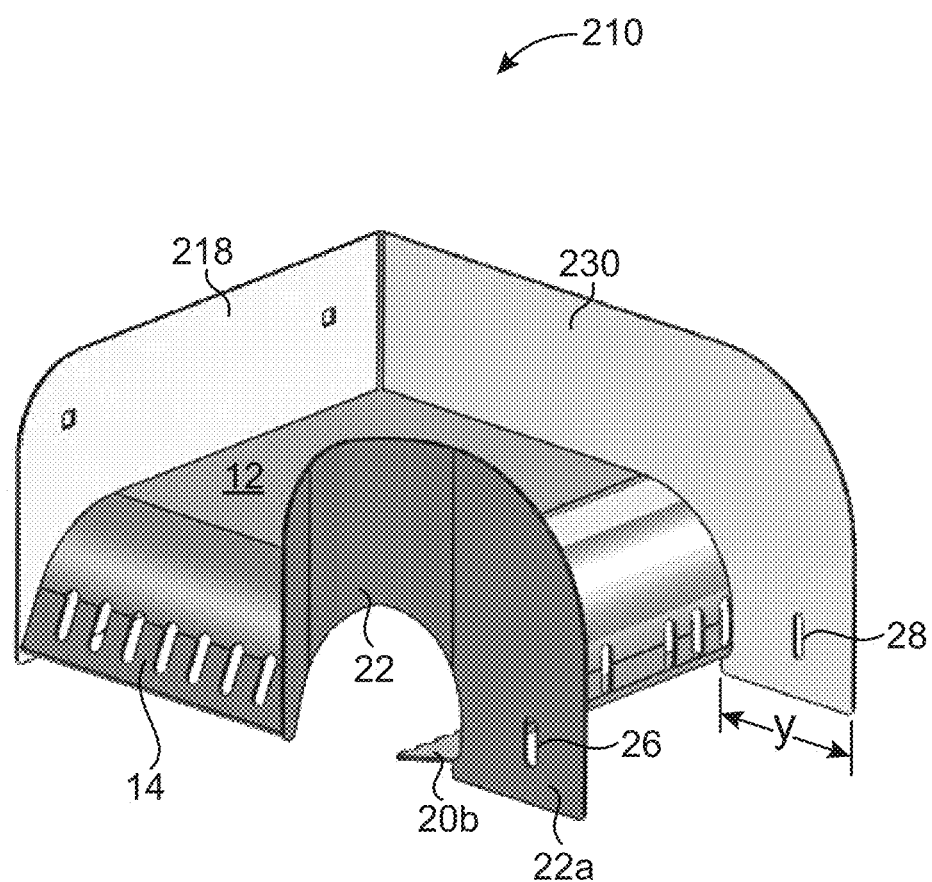
FIG. 28 is a left front perspective view of a cable router according to a third aspect of the disclosure.

Referring now to FIG. 28 another aspect of cable router 210 is described in detail. Cable router 210 includes floor 12, left ramp 14, vertical rear wall 18, front ramp 20 (including brace portion 20b), and vertical left curved wall 22. However, cable router 210 does not include a right ramp. As shown, cable router 210 includes a right wall 230 extending substantially perpendicular from vertical rear wall 218 along the second direction. A portion of right wall 230 may extend the same distance, y, as first portion 22a of vertical left curved wall 22 as described in conjunction with vertical left curved wall 22 of cable router 10. Additionally, an aperture 28, such as a hole or slot, extends through a portion of right wall 230 and, as described more fully elsewhere herein, may be used to secure a vertical support drop to cable router 210. Accordingly, cable router 210 only allows cables to be routed up and/or down left ramp 14 and front ramp 20 of cable router 210. Thus, unlike cable router 10, there is only one cable input and only one cable output. It will be understood in this regard, that the cable routers described herein can direct cables in a number of directions. That is, while shown as having a right vertical wall and a left ramp, it will be understood that other aspects of cable router may include a left vertical wall and a right ramp.

Figure 29:
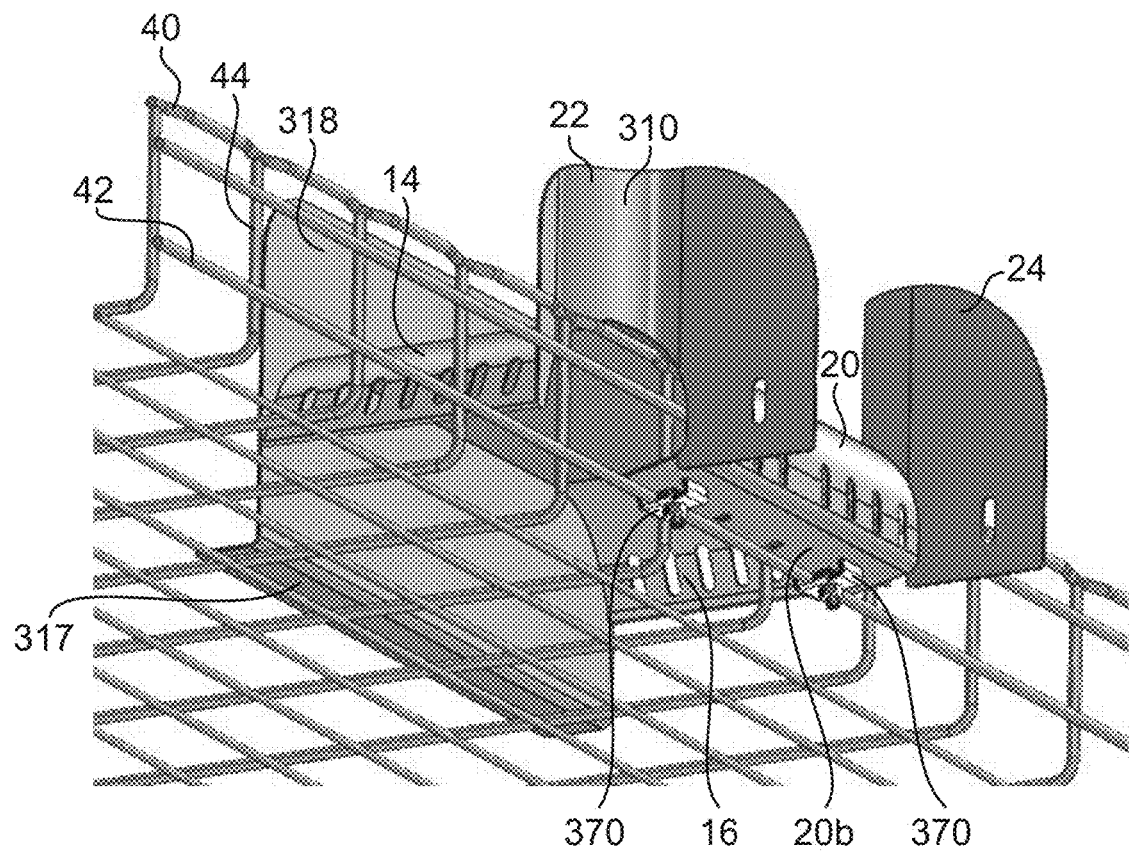
FIG. 29 is a left bottom perspective view of a cable router affixed to a cable tray according to a fourth aspect of the disclosure.

Referring now to FIG. 29 another aspect of cable router 310 is described in detail. Cable router 310 includes floor 12, left ramp 14, right ramp 16, front ramp 20 (including brace portion 20b), vertical left curved wall 22, and vertical right curved wall 24. Vertical rear wall 318 may extend a distance below the ends of left and right ramps 14, 16 such that the bottom edge of vertical rear wall 318 may be located proximate and/or contact bottom portion 46 of cable tray 40 to provide support for cable router 310. This aspect of cable router 310 may also include a flange 317 extending substantially horizontally from the bottom edge of vertical rear wall 318. In addition to or instead of the population of notches 21 along the length of the brace 20b shown in cable router 10 (see FIGS. 13-18), cable router 310 may include one or more clips 370 which may be bolted onto brace 20b. Clips 370 may be used to secure or lock brace 20b onto one or more of the population of longitudinal wires 42. Thus, in certain aspects, the cable router may include both a population of notches and one or more clips for securing the cable router to the cable tray. In other aspects, for example, the cable router may include only one or more clips for securing the cable router to the cable tray (i.e., without a population of notches).

Figure 30:
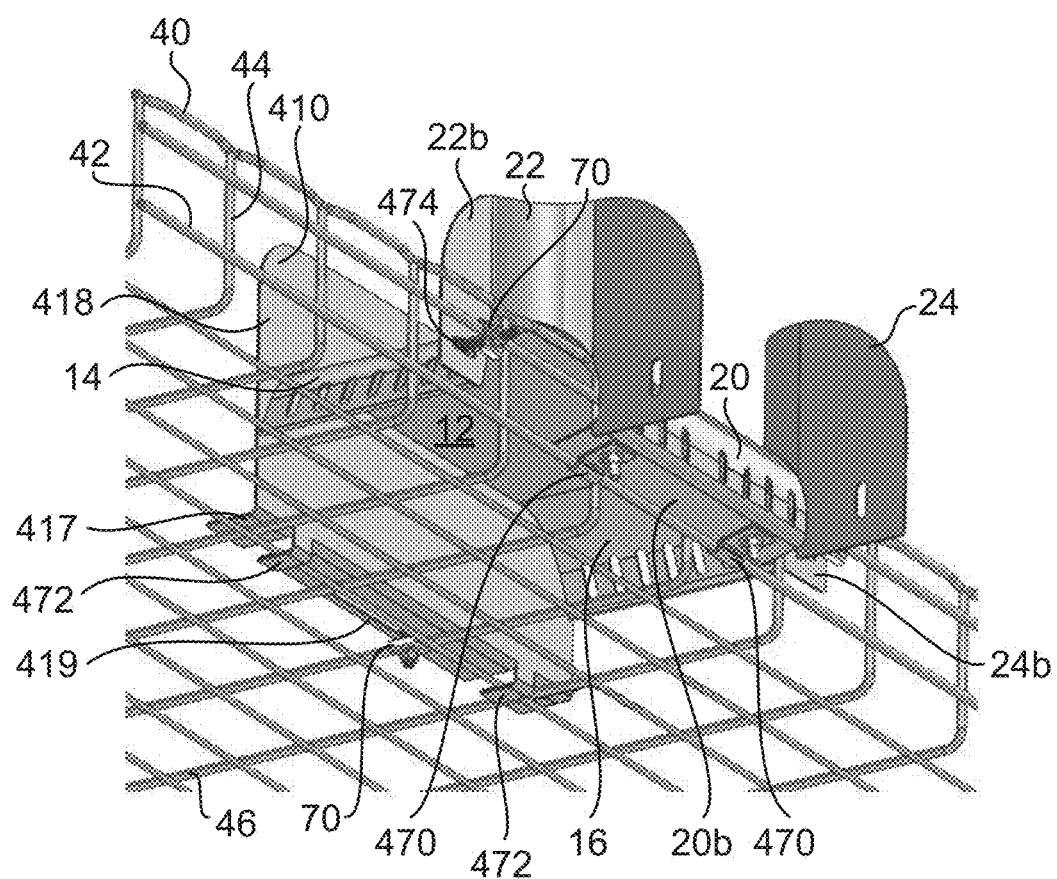
FIG. 30 is a left bottom perspective view of a cable router affixed to a cable tray according to a fifth aspect of the disclosure.
Figure 31:
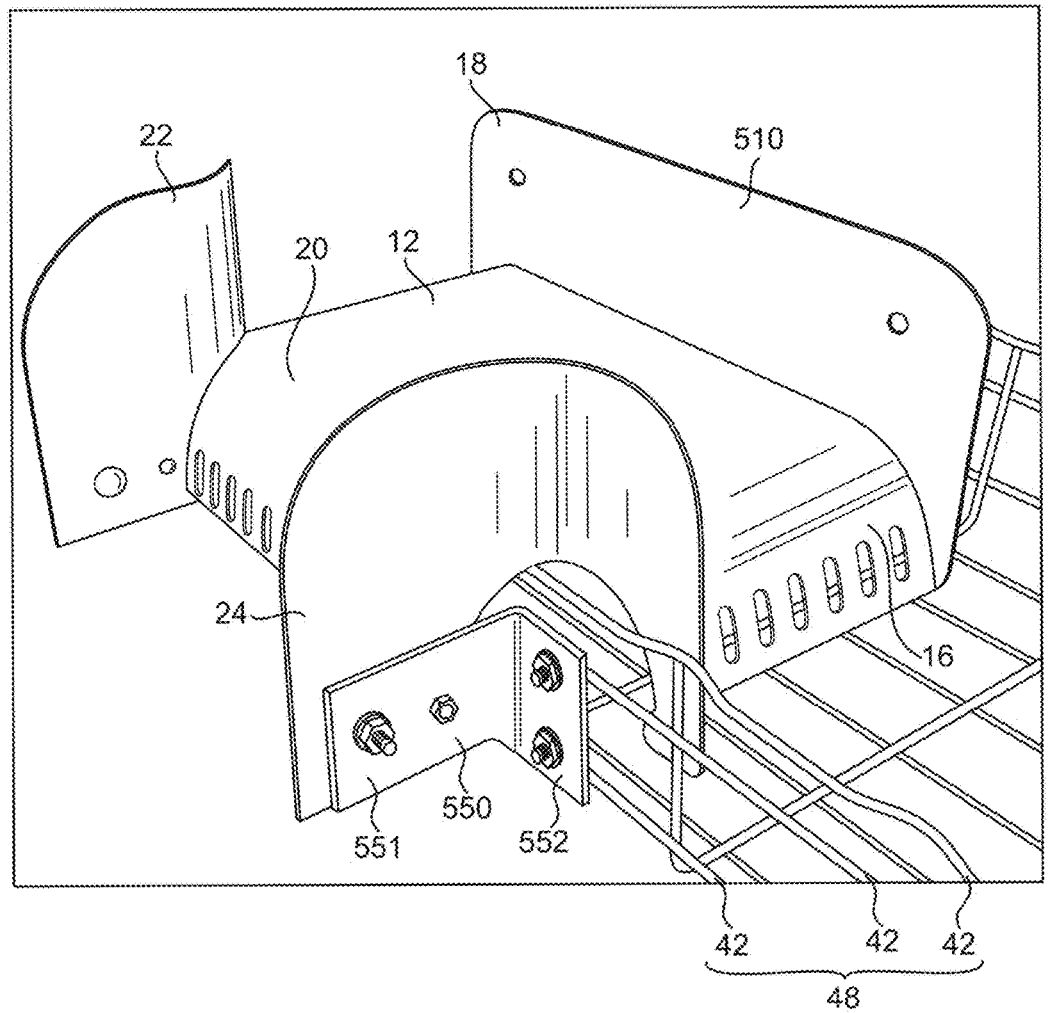
FIG. 31 is a right front perspective view of a cable router affixed to a cable tray according to a sixth aspect of the disclosure.
Figure 32:
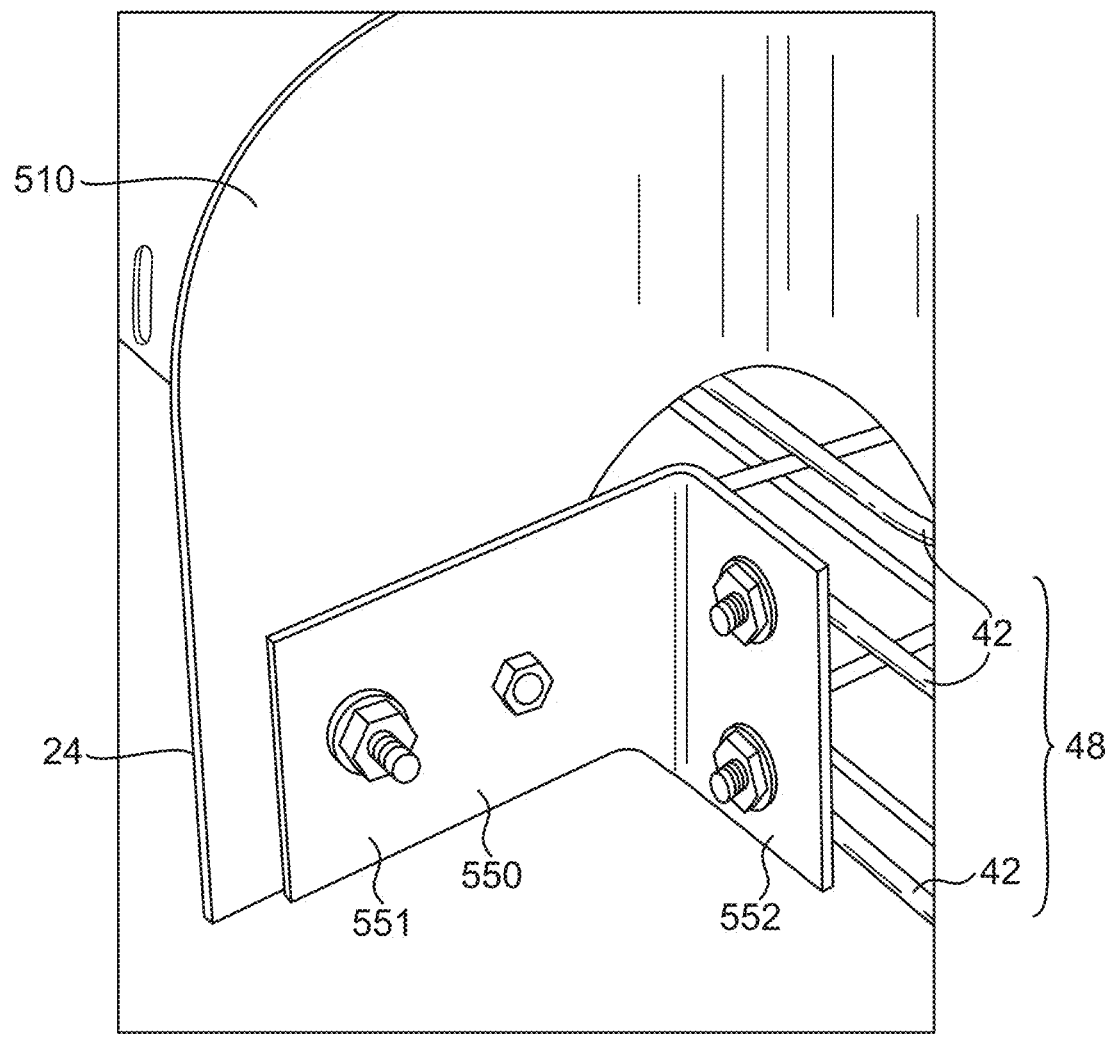
FIG. 32 is a detail right front perspective view of a cable router affixed to a cable tray according to a sixth aspect of the disclosure.
Figure 33:
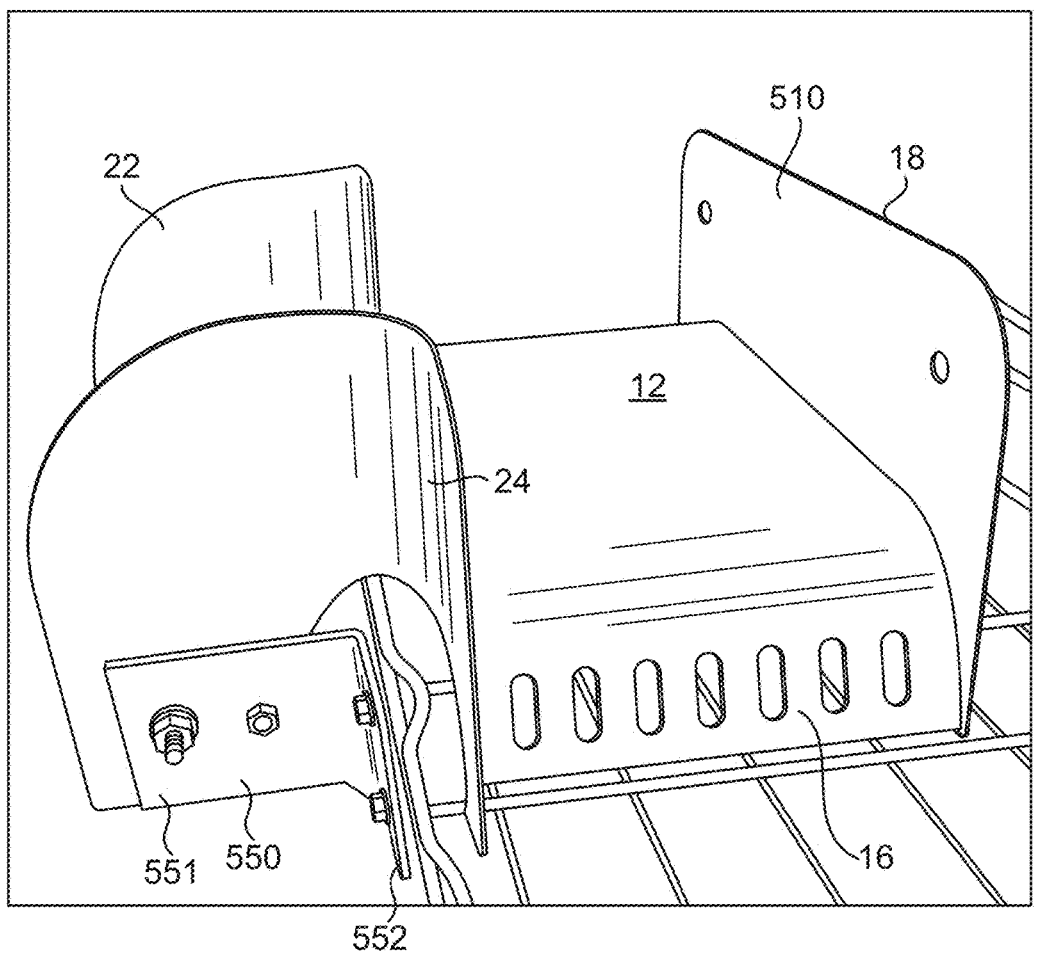
FIG. 33 is a right perspective view of a cable router affixed to a cable tray according to a sixth aspect of the disclosure.
Figure 34:
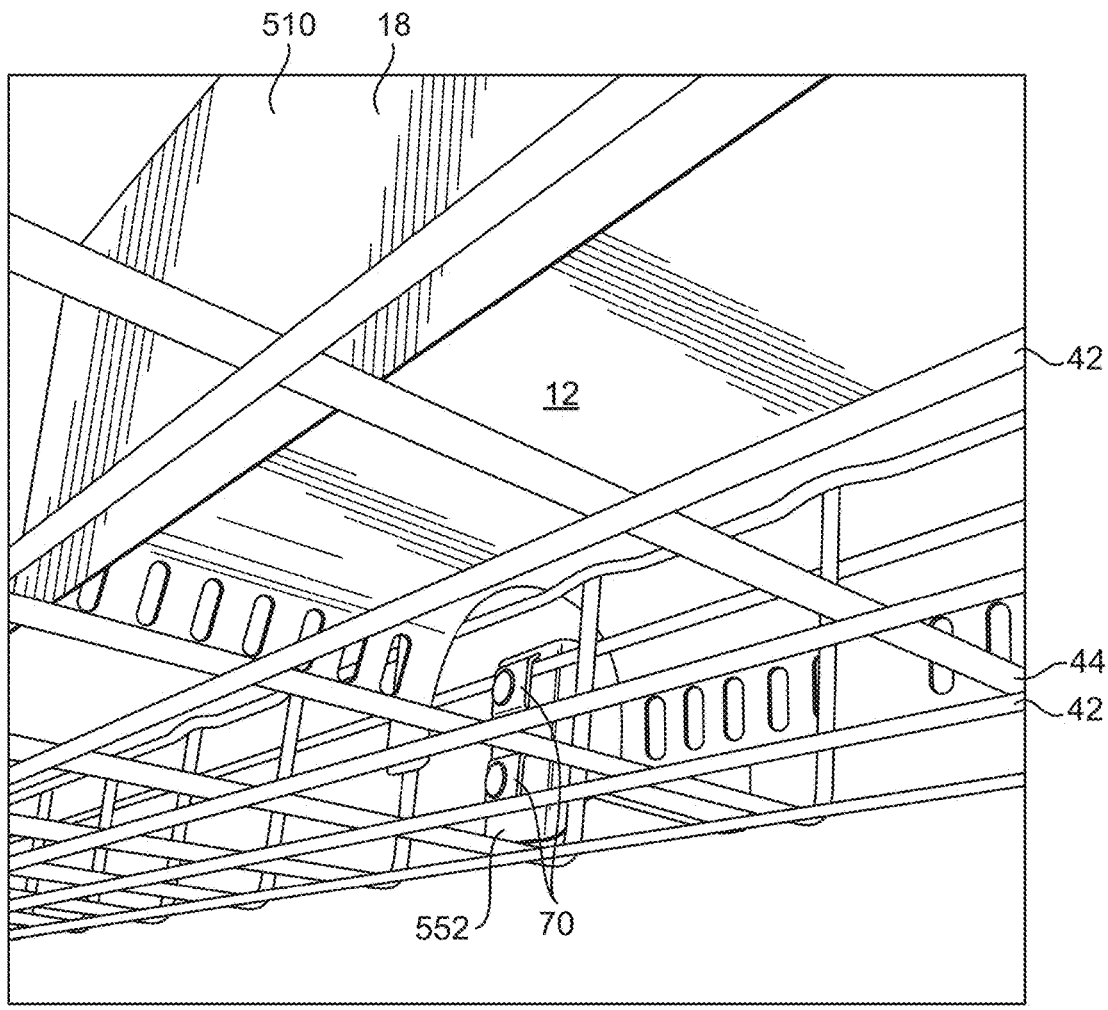
FIG. 34 is a left bottom perspective view of a cable router affixed to a cable tray according to a sixth aspect of the disclosure.

FIG. 30 illustrates another aspect of cable router 410 wherein a flange 417 extends substantially horizontally from the bottom edge of vertical rear wall 418. Cable router 410 also includes floor 12, left ramp 14, right ramp 16, front ramp 20 (including brace portion 20b), vertical left curved wall 22, and vertical right curved wall 24. Vertical rear wall 418 may extend a distance below the ends of left and right ramps 14, 16 such that the bottom edge of vertical rear wall 418 may be located proximate and/or contact bottom portion 46 of cable tray 40 to provide support for cable router 410. A population of apertures 419, such as slots or holes, extend along the length of flange 417. Cable tray 419 is shown as having a single aperture 419 located substantially in the middle of flange 417 between left and right ramps 14, 16. It will be understood however, that aspects of cable tray 419 may include any number and/or location of apertures 419 without departing from the disclosure.

Figure 8:
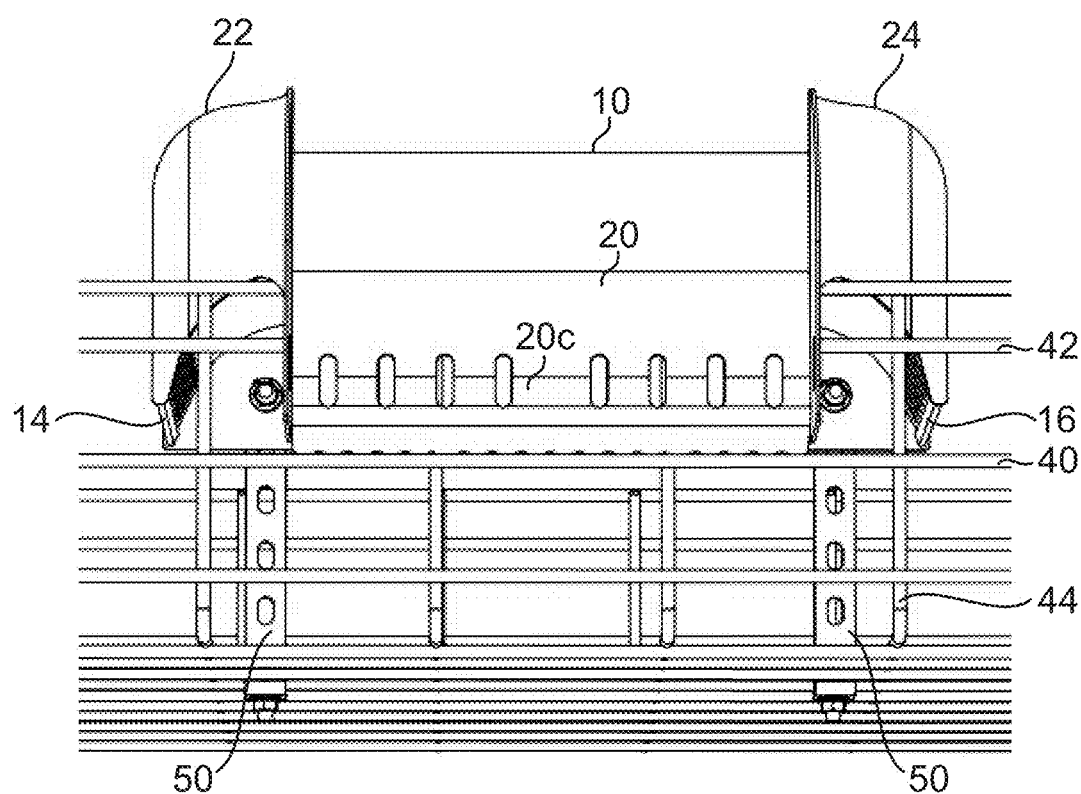
FIG. 8 is a front perspective view of a cable router affixed to a cable tray according to a first aspect of the disclosure.
Figure 9:
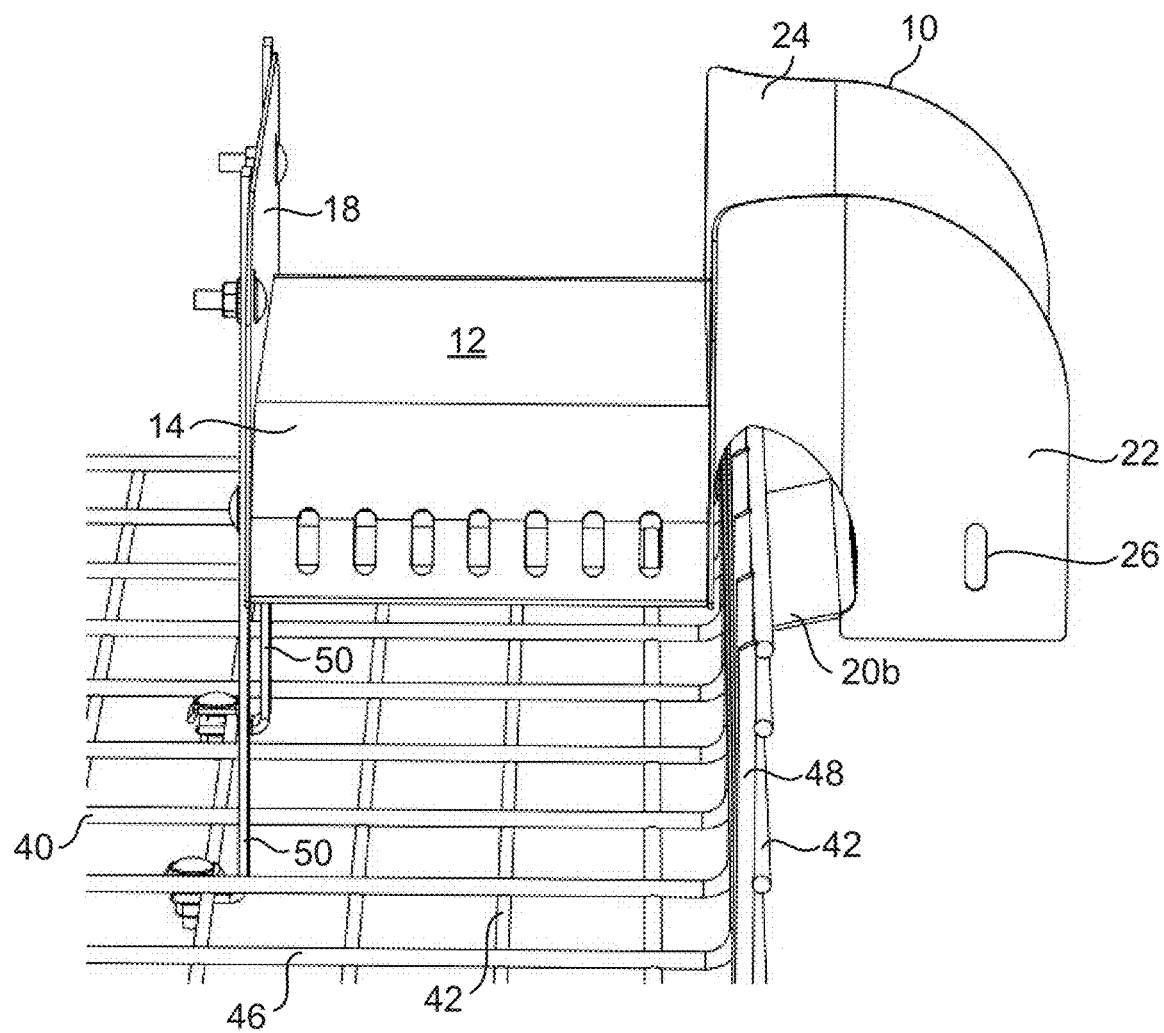
FIG. 9 is a left perspective view of a cable router affixed to a cable tray according to a first aspect of the disclosure.
Figure 10:
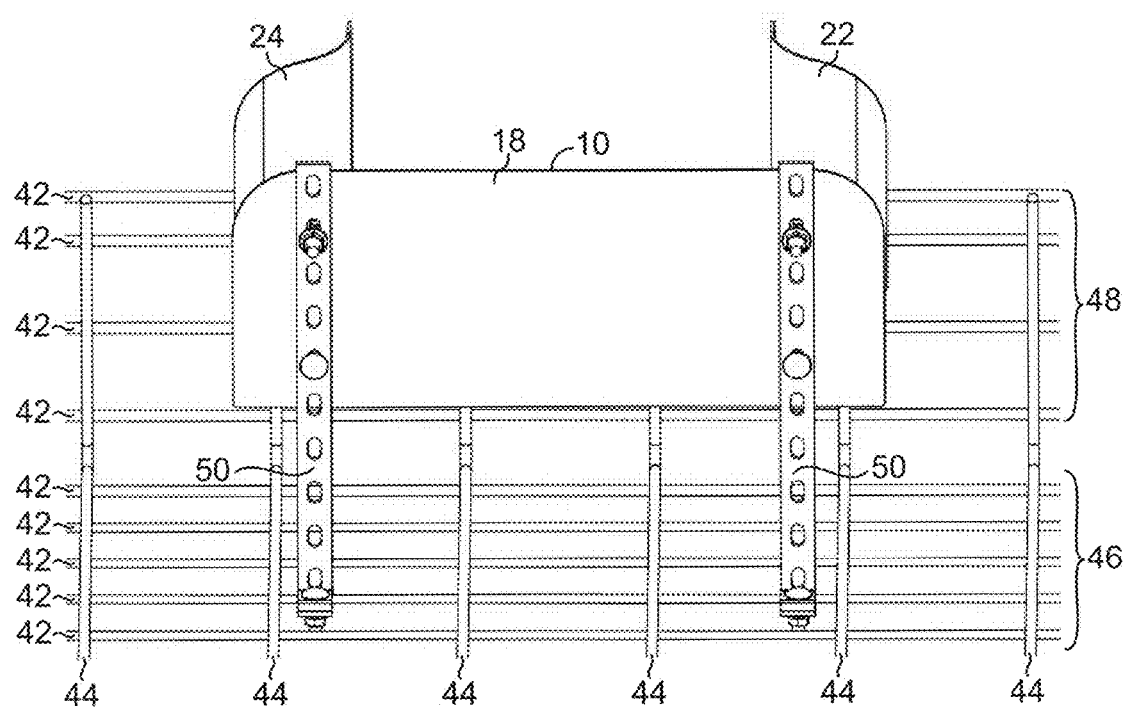
FIG. 10 is a rear perspective view of a affixed to a cable tray cable router according to a first aspect of the disclosure.
Figure 11:
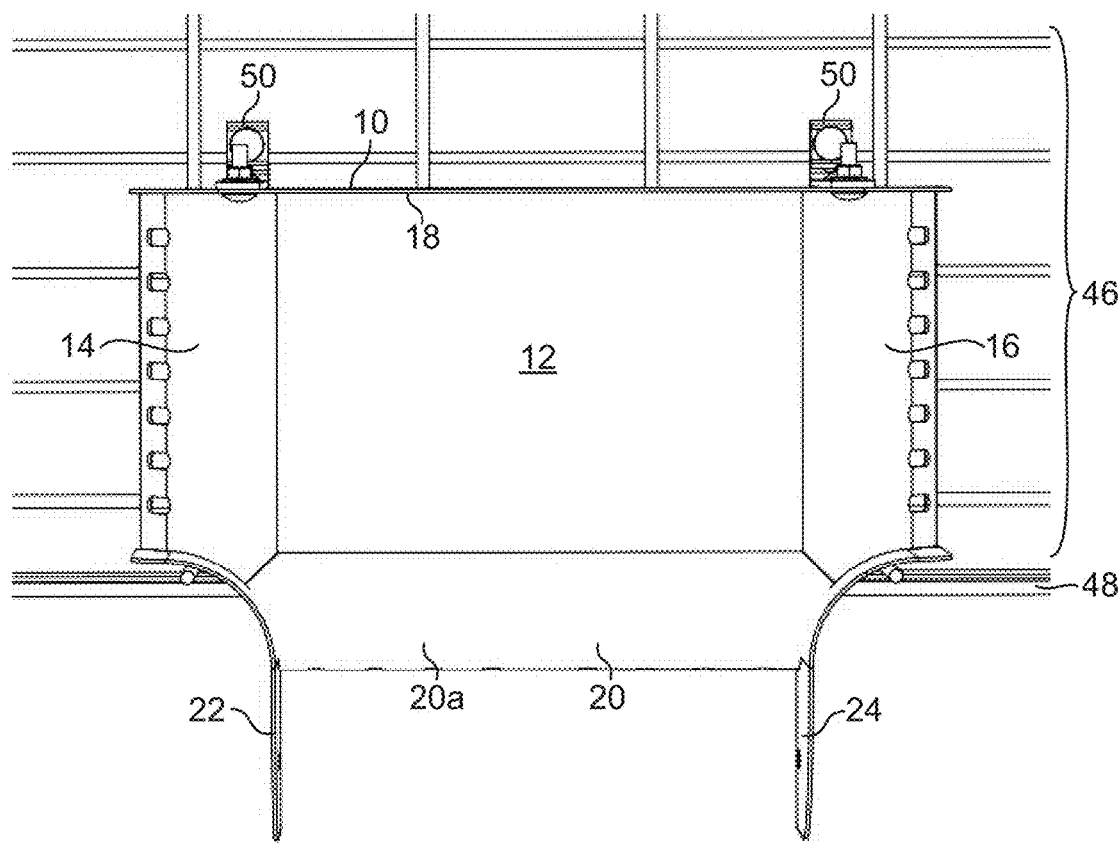
FIG. 11 is a top view of a cable router affixed to a cable tray according to a first aspect of the disclosure.
Figure 12:
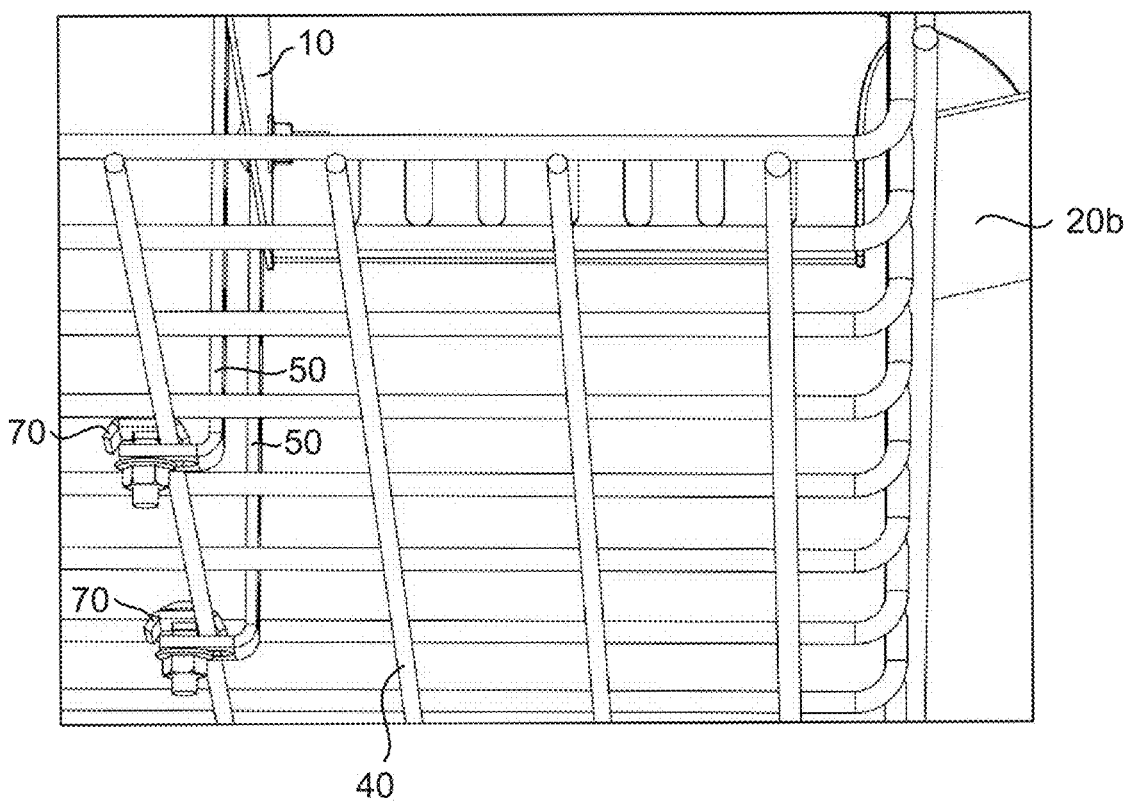
FIG. 12 is a left bottom perspective view of a cable router affixed to a cable tray according to a first aspect of the disclosure.
Figure 13:
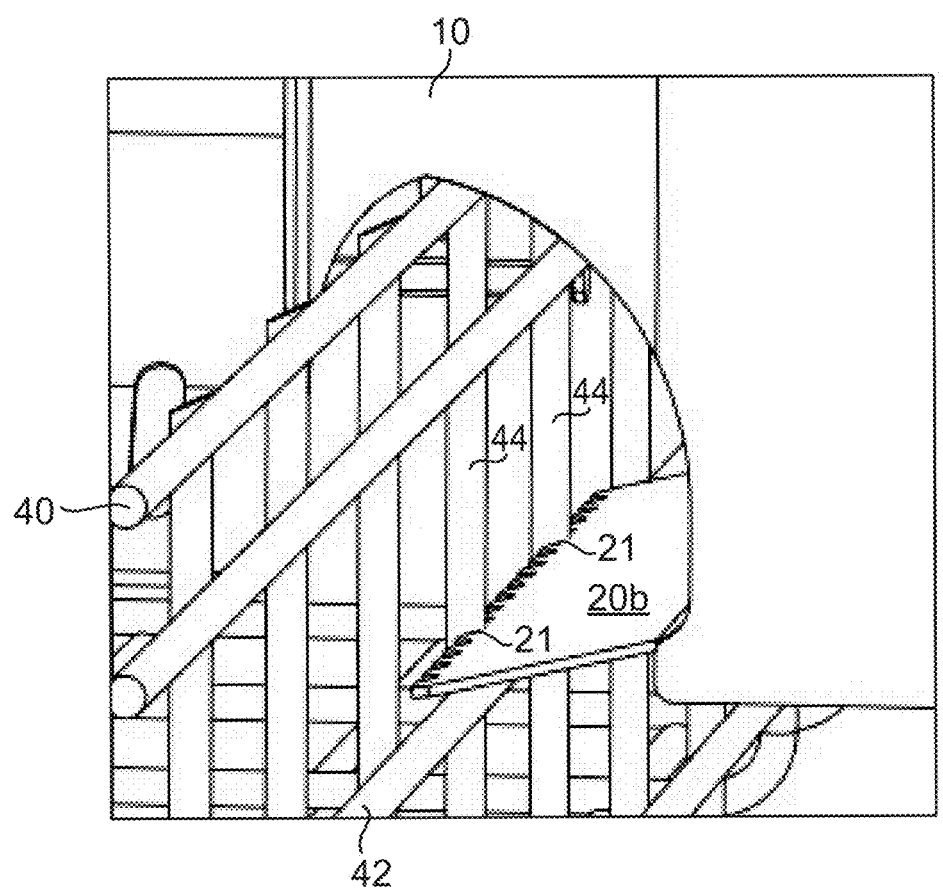
FIG. 13 is a left front perspective view of a cable router affixed to a cable tray according to a first aspect of the disclosure.
Figure 14:
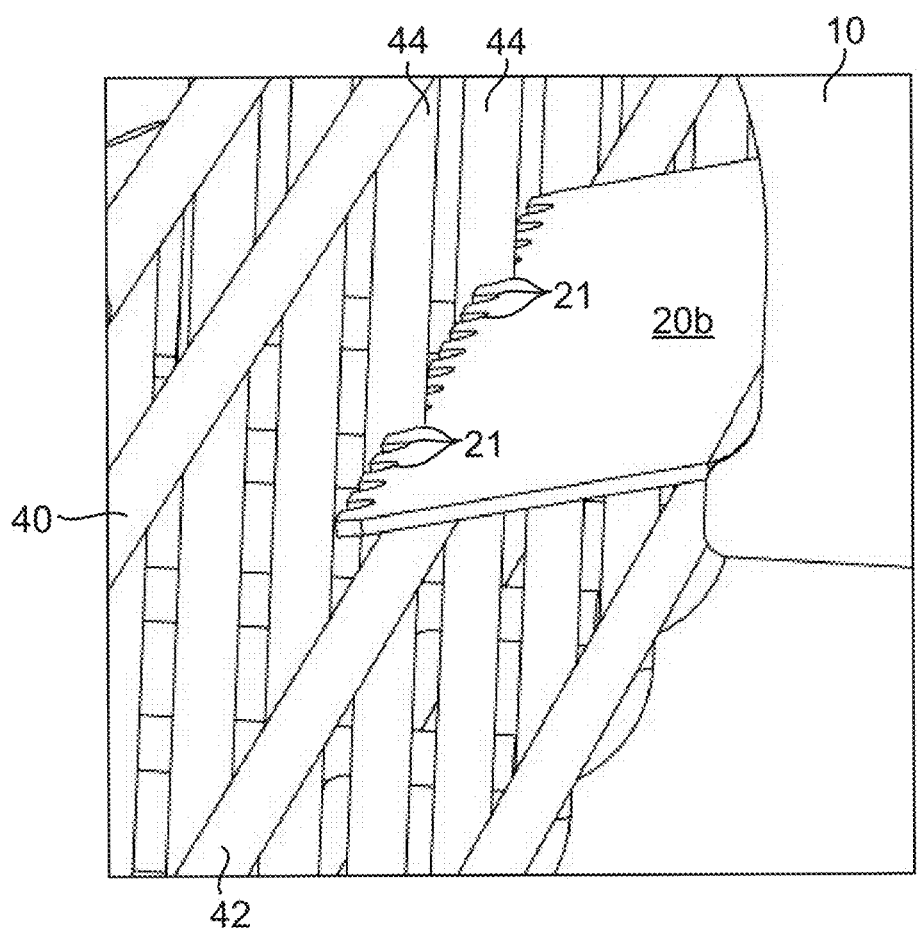
FIG. 14 is a left front perspective view of a cable router affixed to a cable tray according to a first aspect of the disclosure.
Figure 15:
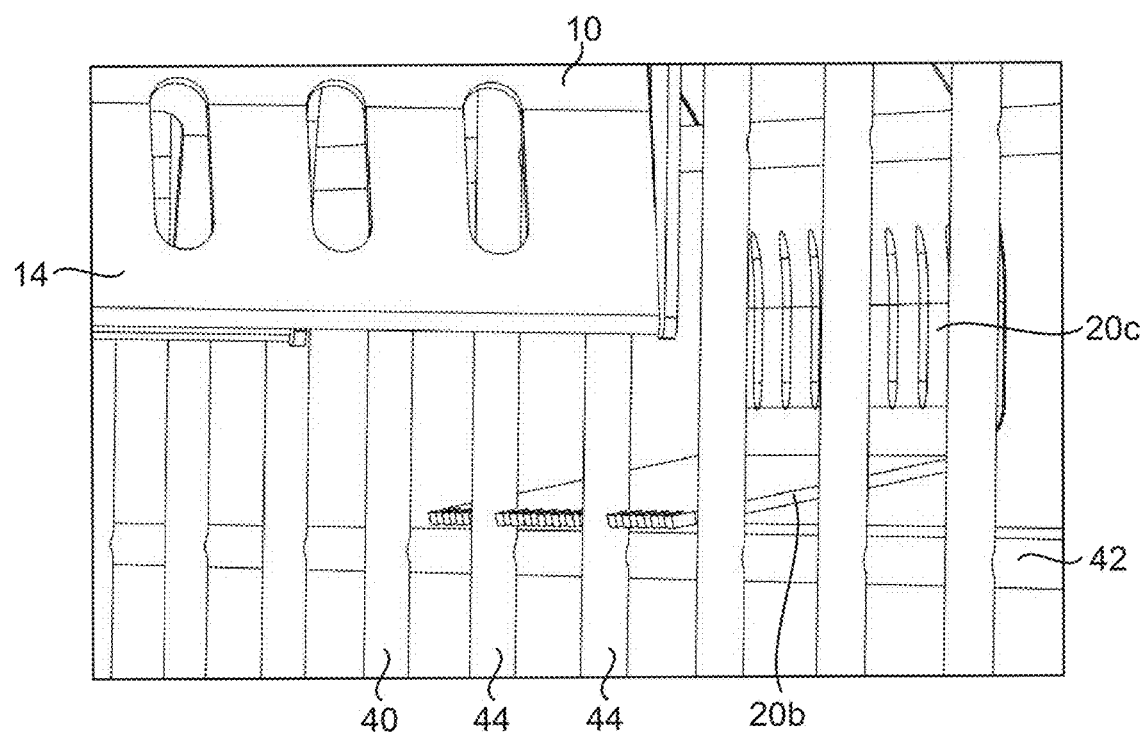
FIG. 15 is a left perspective view of a cable router affixed to a cable tray according to a first aspect of the disclosure.
Figure 16:
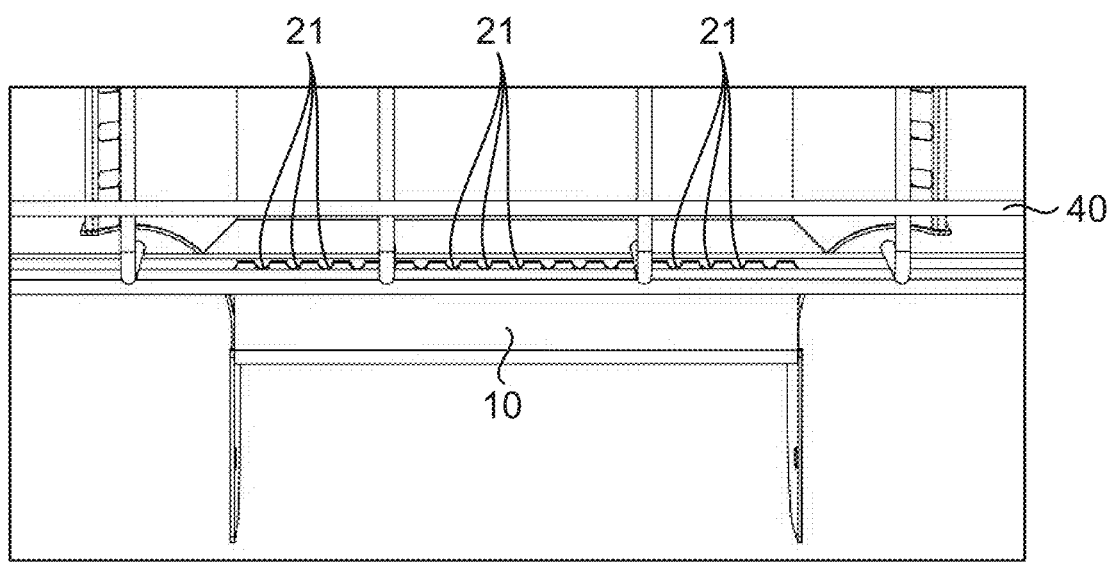
FIG. 16 is a bottom view of a cable router affixed to a cable tray according to a first aspect of the disclosure.
Figure 17:
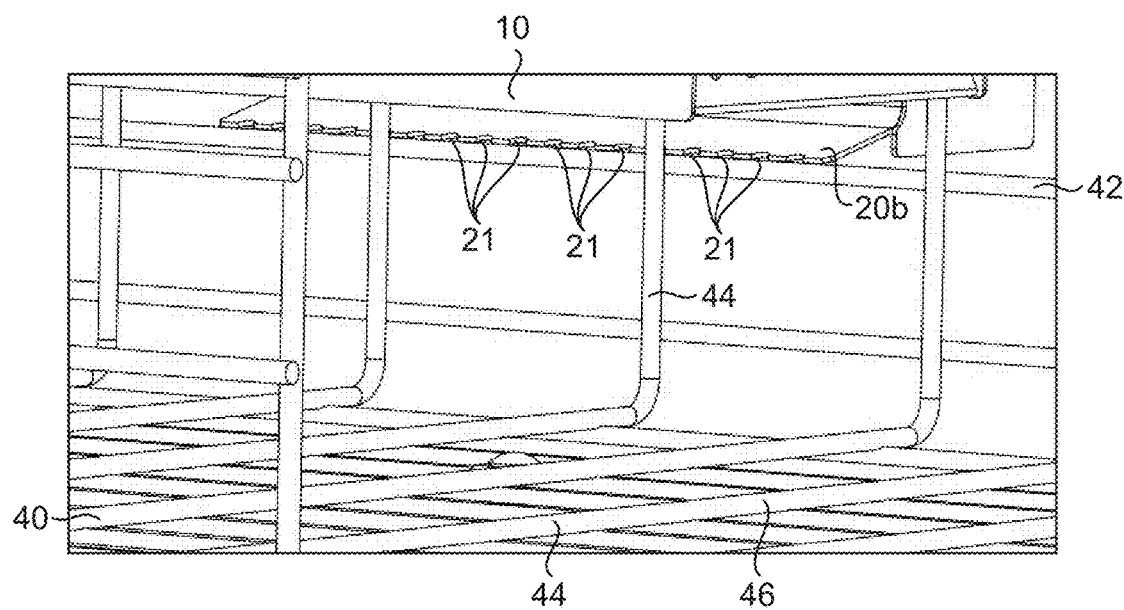
FIG. 17 is a right rear perspective view of a cable router affixed to a cable tray according to a first aspect of the disclosure.
Figure 18:
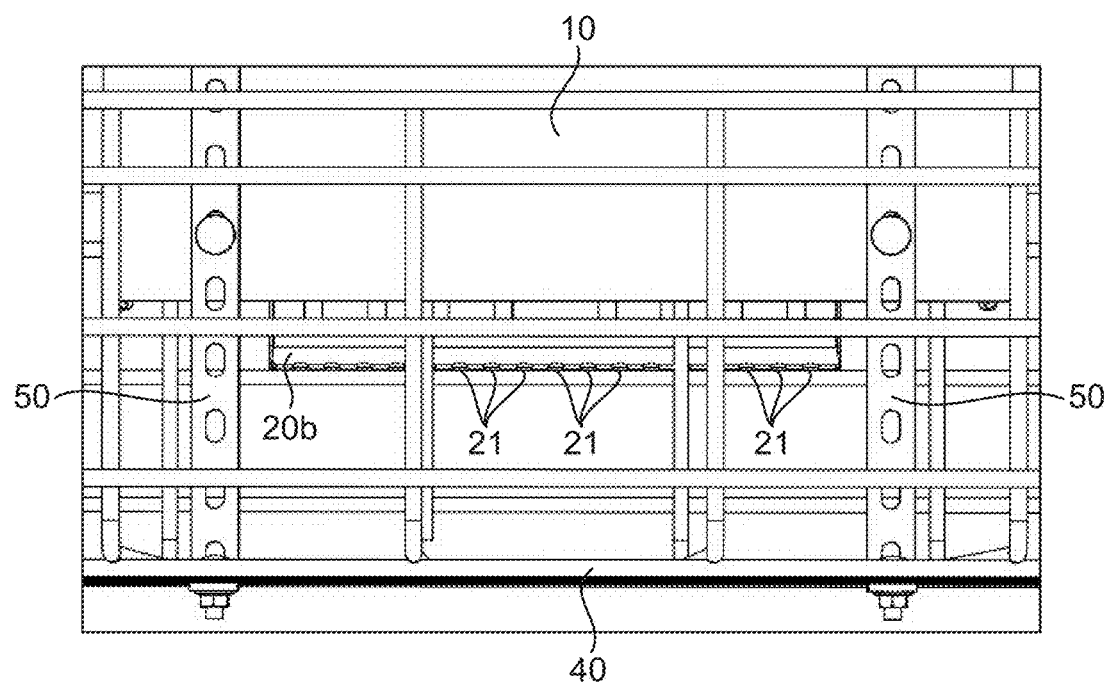
FIG. 18 is a rear perspective view of a cable router affixed to a cable tray according to a first aspect of the disclosure.

Unlike cable router 10, flange 417 and the population of apertures 419 permit cable router 410 to be installed or affixed to cable tray 40 without the need for brackets 50 (see, e.g., FIG. 8). Bolts may extend through one or more of the population of apertures 419 to secure cable router 410 to cable tray 40. Additionally, bolts may extend through clips 70 wherein clips 70 may be used to secure or lock vertical rear wall 418 to longitudinal and/or transverse wires 42, 44 of cable tray 40.

Additionally, in some aspects, a population of tabs 472 may extend below flange 417 and may be used to secure cable router 410 to cable tray 40. Tabs 472 may be substantially parallel to flange 417 and may extend a sufficient distance below flange 417 so that flange 417 can rest on top of longitudinal and/or transverse wires 42, 44 of cable tray 40 and so that tabs 472 may be below and/or contact bottom of longitudinal and/or transverse wires 42, 44 of cable tray 40. That is, when cable router 410 is installed, longitudinal and/or transverse wires 42, 44 of cable tray 40 are sandwiched between flange 417 and tabs 472. Tabs 472 accordingly may assist in maintaining the position of cable router 410 and/or may assist in reducing or preventing cable router 410 from sagging under the weight of cables carried therein. Cable tray 419 is shown as having two tabs 472 located proximate the left and right edges of flange 417. It will be understood however, that aspects of cable tray 419 may include any number and/or location of tabs 472 without departing from the scope of the disclosure.

With continued reference to FIG. 30, in addition to or instead of the population of notches 21 along the length of the brace 20b shown in cable router 10, cable router 410 may include one or more clips 470 which may be bolted onto brace 20b. Clips 470 may lock brace 20b onto one or more of the population of longitudinal wires 42. Furthermore, in this aspect, for example, the second portions of vertical left and right curved walls 22b, 24b of cable router 410 may be extended as compared to the second portions of left and right curved walls 22b, 24b of cable router 10 and may further include apertures 474, such as holes or slots, extending through the second portions of left and right curved walls 22b, 24b. Bolts may extend through one or more of the population of apertures 474 to secure cable router 410 to cable tray 40. Additionally, bolts may extend through clips 470 wherein clips 470 may be used to secure or lock vertical left and right curved walls 22, 24 to longitudinal and/or transverse wires 42, 44 of cable tray 40.

FIGS. 31-34 illustrate yet another aspect of cable router 510 wherein cable router 510 is secured to cable tray 40 using two substantially L-shaped brackets 550. Cable router 510 includes floor 12, left ramp 14, right ramp 16, rear wall 18, front ramp 520, vertical left curved wall 22, and vertical right curved wall 24. Unlike cable router 10, front ramp 520 of cable router 510 does not include brace 20b. However, the front portion of front ramp 520 may curve rearward to reduce or eliminate any sharp edges that could catch or snag cables routed up or down front ramp 520. Cable router 510 further includes two substantially L-shaped brackets 550, one of which is bolted or otherwise secured to vertical left curved wall 22 and one of which is bolted or otherwise secured to vertical right curved wall 24. Substantially L-shaped bracket 550 includes first bracket portion 551 and second bracket portion 552, wherein second bracket portion 552 is substantially perpendicular to first bracket portion 551. Second bracket portion 552 extends outward parallel to rear wall 18. In one embodiment, two bolts will extend through apertures (not shown) in first bracket portion 551 and apertures (e.g., apertures 26, 28 (see FIG. 1)) in vertical left and right curved walls 22, 24. Additionally, two bolts may extend through apertures (not shown) in second bracket portion 552 and through two clips 70 (see FIG. 34) wherein two clips 70 may be used to secure or lock substantially L-shaped brackets 550 to longitudinal and/or transverse wires 42, 44 of cable tray 40. While cable router 510 is shown with two bolts extending through each of first and second bracket portions 551, 552, it will be understood that, in certain aspects fewer than two bolts may be used and in certain aspects more than two bolts may be used.

Substantially L-shaped brackets 550 provide a sufficiently rigid connection of cable router 510 to cable tray 40 such that cable router 510 need not be secured to cable tray 40 using additional brackets or tabs (such as those described in connection with cable routers 10, 110, 310, and/or 410). Accordingly, vertical rear wall 18 need not extend a distance below the ends of left and right ramps 14, 16 as in cable routers 110, 310, and 410. Cable router 510 thus floats above and cantilevers over cable tray 40 and permits cables to be run under cable router 510 without having to feed the cable between the side wall 48 of cable tray 40 and bracket(s) 50 of cable router 10 or vertical rear walls 118, 318, and 418 of cable routers 110, 310, and 410, respectively.

Figure 35:
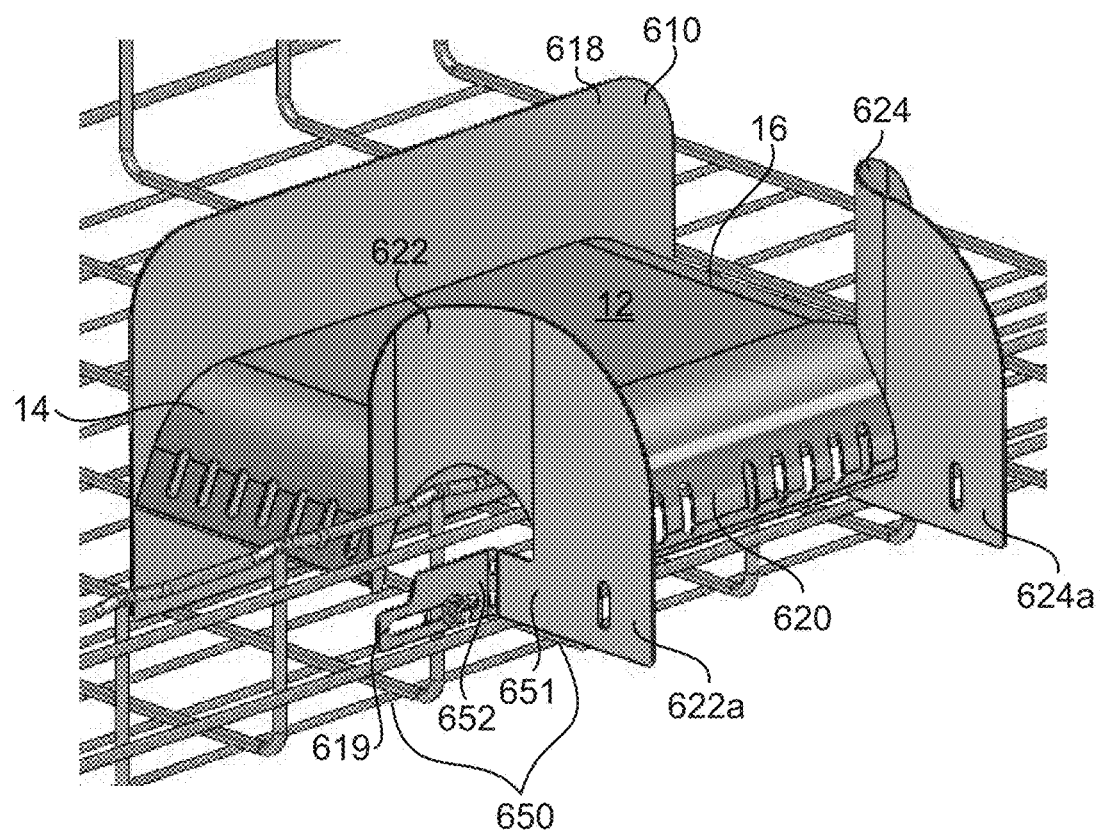
FIG. 35 is a left front perspective view of a cable router affixed to a cable tray according to a seventh aspect of the disclosure.
Figure 36:
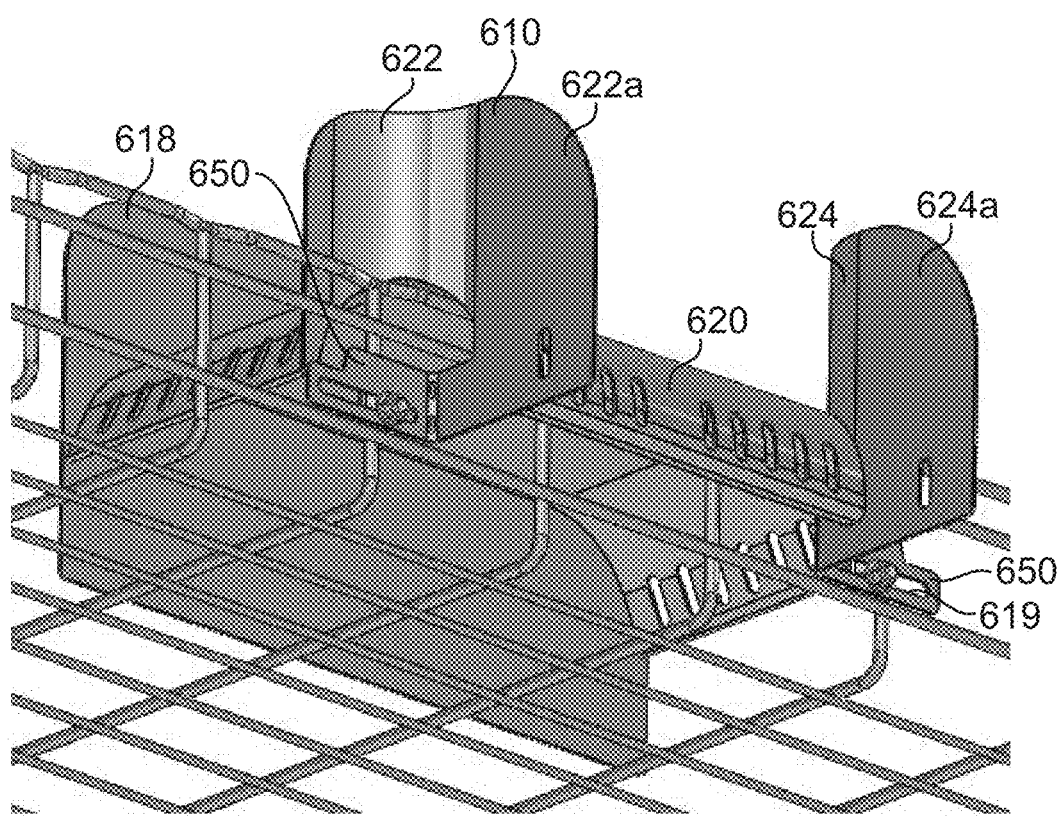
FIG. 36 is a left bottom perspective view of a cable router affixed to a cable tray according to a seventh aspect of the disclosure.

FIGS. 35-36 illustrate yet another aspect of cable router 610. Cable router 610 includes floor 12, left ramp 14, right ramp 16, rear wall 618, front ramp 620, vertical left curved wall 622, and vertical right curved wall 624. Unlike cable router 10, front ramp 620 of cable router 610 does not include brace 20b. However, the front portion of front ramp 620 may curve rearward to reduce or eliminate any sharp edges that could catch or snag cables routed up or down front ramp 620. Vertical rear wall 618 may extend a distance below the ends of left and right ramps 14, 16 such that the bottom edge of vertical rear wall 618 may be located proximate and/or contact bottom portion 46 of cable tray 40 to provide support for cable router 610. Cable router 610 further includes two integrally formed substantially L-shaped brackets 650 (e.g., brackets 650), one each extending from vertical left curved wall 622 and vertical right curved wall 624. Cable router 610 is secured to cable tray 40 using brackets 650.

Each bracket 650, includes first bracket portion 651 and second bracket portion 652, wherein second bracket portion 652 is substantially perpendicular to first bracket portion 651. First portions 622a, 624a of vertical left and right curved walls 622, 624 extend forward along the second direction away from rear wall 18. First bracket portion 651 of each bracket 650 is located proximate the bottom end of each of first portions 622a, 624a of vertical left and right curved walls 622, 624 and extends rearward along the second direction toward rear wall 18. First bracket portion 651 of each bracket 650 is substantially co-planar with each of first portions 622a, 624a of vertical left and right curved walls 622, 624. However, in other aspects it will be understood that first bracket portion 651 may be bent at an angle with respect to first portions 622a, 624a of vertical left and right curved walls 622, 624. The second bracket portion 652 of each bracket 650 extends substantially perpendicular from first bracket portion 651 and outward away from first portions 622*a*, 624*a* of vertical left and right curved walls 622, 624. Second bracket portion 652*a* extends outward parallel to rear wall 18.

In one embodiment, second bracket portions 652 of brackets 650 include elongate substantially horizontal slots 619 through which bolts or other fasteners may extend to secure cable router 610 to cable tray 40. In one embodiment, bolts will extend through slots 619 of second bracket portions 652 and through clips to secure or lock cable router 610 to longitudinal and/or transverse wires 42, 44 of cable tray 40. While cable router 610 is shown with one bolt extending through each second bracket portion 652, it will be understood that, in certain aspects more than one bolt may be used. Prior to tightening of bolts and/or when the bolts are loosened, elongate substantially horizontal slots 619 permit easy adjustment and/or alignment of cable router 610 along the first direction (e.g., the longitudinal direction of cable tray 40). When cable router 610 is located in the desired location on cable tray 40, the bolts are tightened to secure cable router 610 in place. While slots 619 are shown, it will be understood that certain aspects may include other types of apertures, such as holes, without departing from the scope of the current disclosure. For example, in various aspects a population of holes (e.g., about 2, about 3, about 4, about 5, about 6, etc.) may be provided in each second bracket portion 652, wherein the population of holes permit easy adjustment and/or alignment of cable router 610 along the first direction (e.g., the longitudinal direction of cable tray 40).

Figure 37:
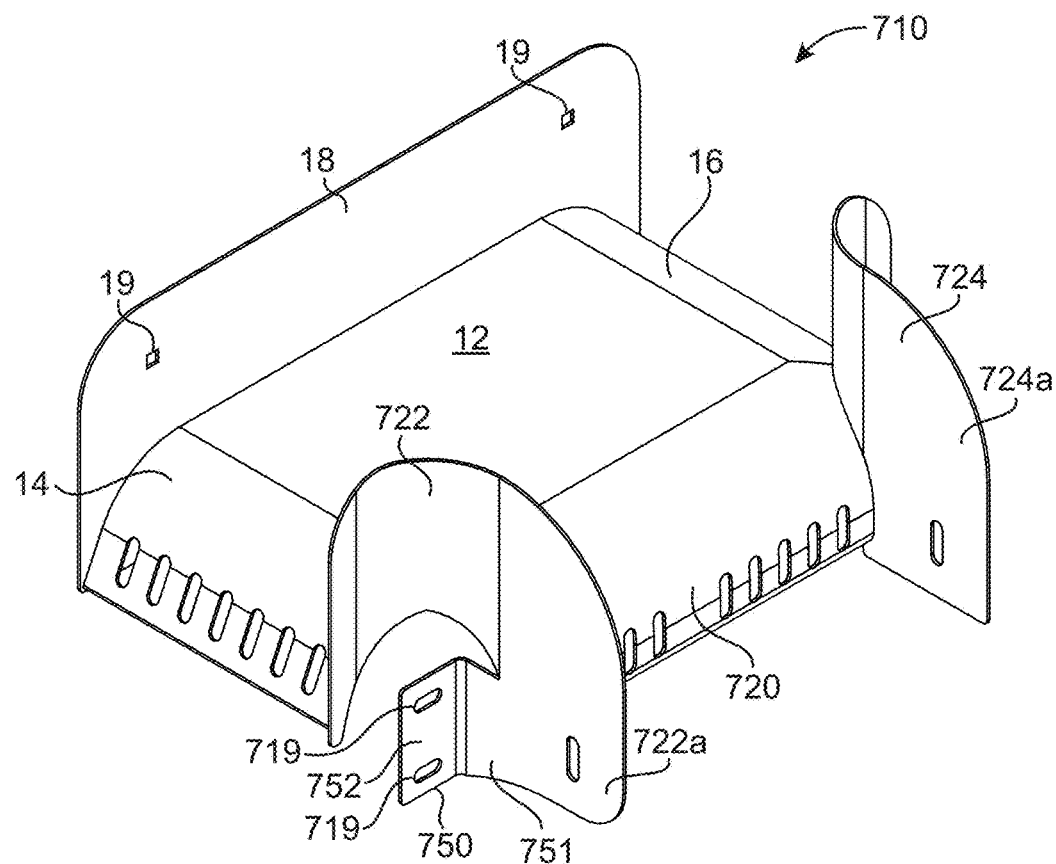
FIG. 37 is a left front perspective view of a cable router according to an eighth aspect of the disclosure.
Figure 38:
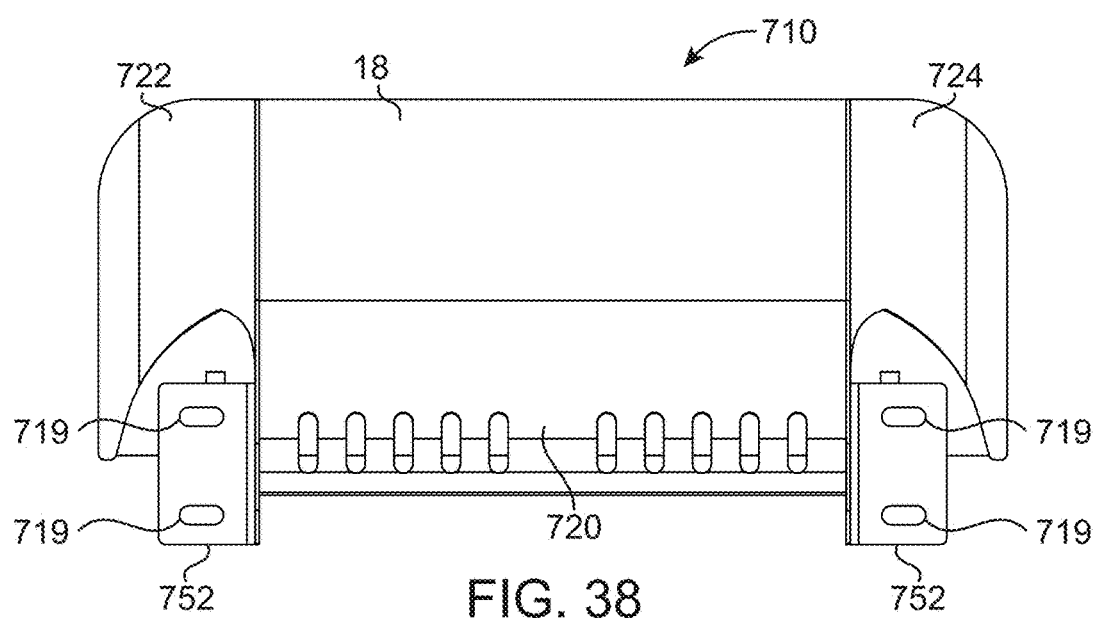
FIG. 38 is a front view of a cable router according to an eighth aspect of the disclosure.
Figure 39:
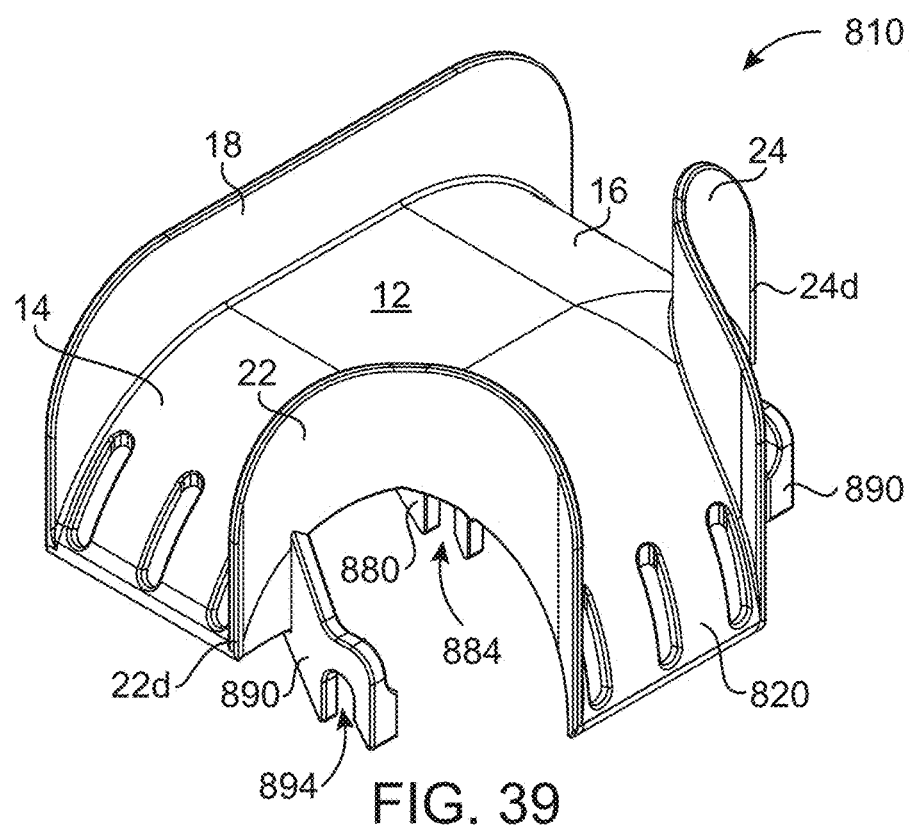
FIG. 39 is a left front perspective view of a cable router according to a ninth aspect of the disclosure.
Figure 40:
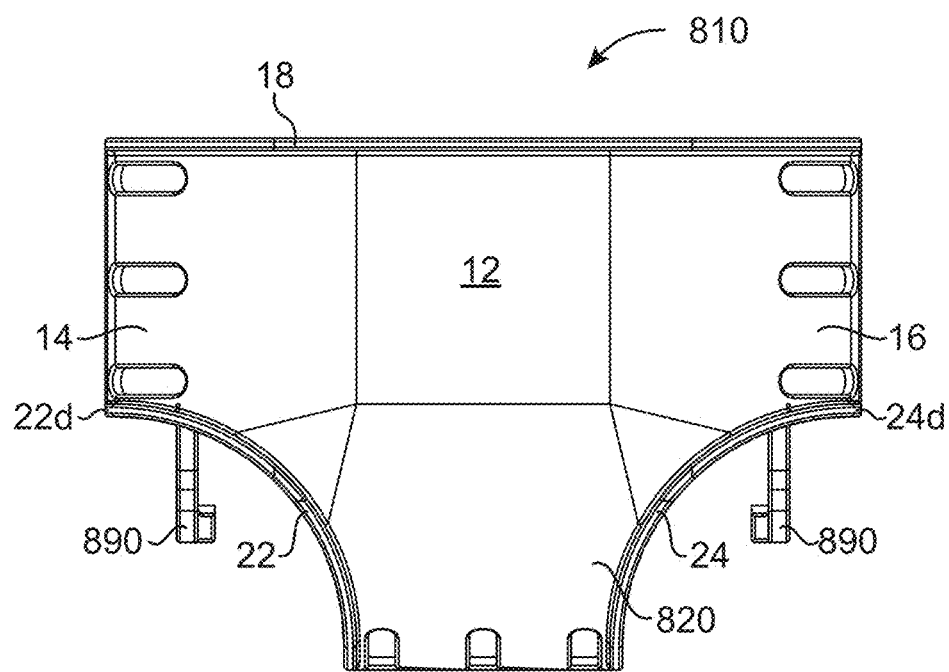
FIG. 40 is a top view of a cable router according to a ninth aspect of the disclosure.
Figure 41:
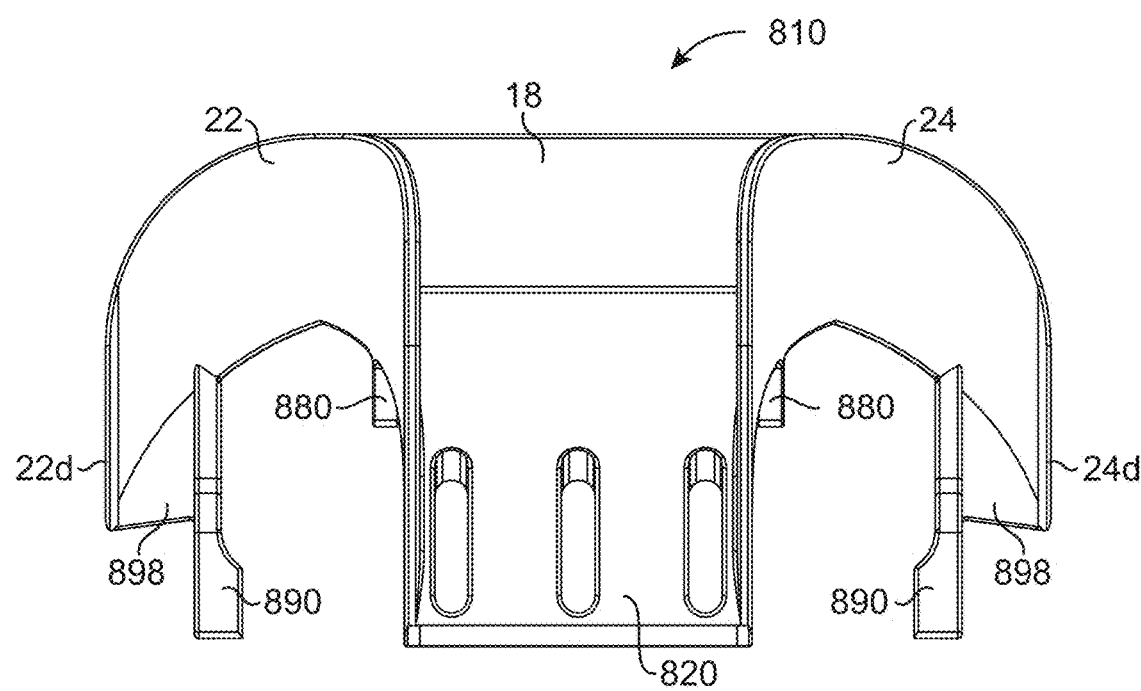
FIG. 41 is a front view of a cable router according to a ninth aspect of the disclosure.
Figure 42:
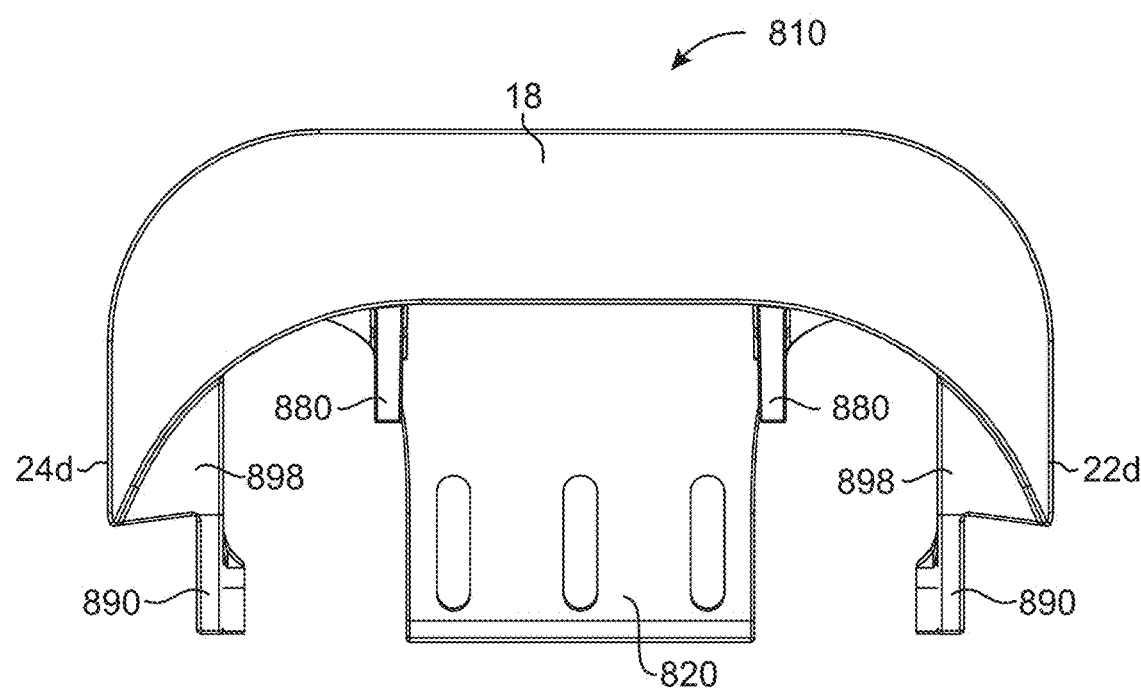
FIG. 42 is a rear view of a cable router according to a ninth aspect of the disclosure.
Figure 43:
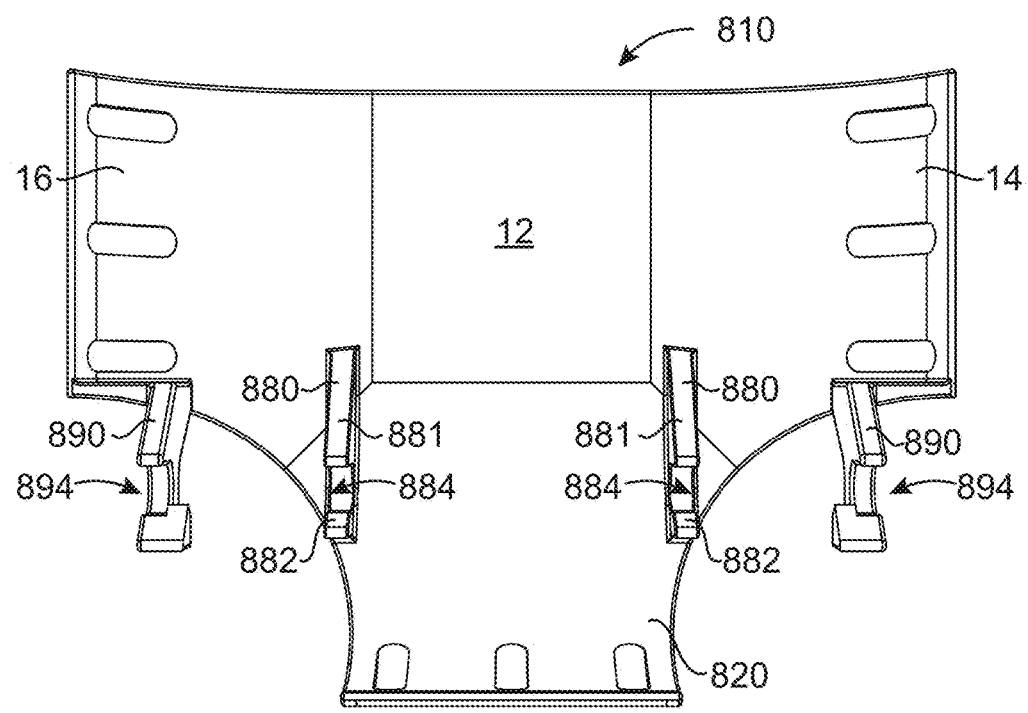
FIG. 43 is a bottom perspective view of a cable router according to a ninth aspect of the disclosure.

FIGS. 37-38 illustrate yet another aspect of cable router 710. Cable router 710 includes floor 12, left ramp 14, right ramp 16, rear wall 18, front ramp 720, vertical left curved wall 722, and vertical right curved wall 724. Unlike cable router 10, front ramp 720 of cable router 710 does not include brace 20*b*. However, the front portion of front ramp 720 may curve rearward to reduce or eliminate any sharp edges that could catch or snag cables routed up or down front ramp 720. Cable router 710 further includes two integrally formed substantially L-shaped brackets 750 (e.g., brackets 750), one each extending from vertical left curved wall 722 and vertical right curved wall 724. Brackets 750 are a variation of brackets 650 of cable router 610. Cable router 710 is secured to a cable tray 40 using brackets 750.

Each bracket 750, includes first bracket portion 751 and second bracket portion 752, wherein second bracket portion 752 is substantially perpendicular to first bracket portion 751. First portions 722*a*, 724*a* of vertical left and right curved walls 722, 724 extend forward along the second direction away from rear wall 18. First bracket portion 751 of each bracket 750 is located proximate the bottom end of each of first portions 722*a*, 724*a* of vertical left and right curved walls 722, 724 and extends rearward along the second direction toward rear wall 18. First bracket portion 751 of each bracket 750 is substantially co-planar with each of first portions 722*a*, 724*a* of vertical left and right curved walls 722, 724. However, in other aspects it will be understood that first bracket portion 751 may be bent at an angle with respect to first portions 722*a*, 724*a* of vertical left and right curved walls 722, 724. The second bracket portion 752 of each bracket 750 extends substantially perpendicular from first bracket portion 751 and outward away from first portions 722*a*, 724*a* of vertical left and right curved walls 722, 724. Second bracket portion 752*a* extends outward parallel to rear wall 18.

In one embodiment, each second bracket portion 752 of brackets 750 includes two elongate substantially horizontal slots 719 through which bolts or other fasteners may extend to secure cable router 710 to cable tray 40. In one embodiment, bolts will extend through slots 719 of second bracket portions 752 and through clips to secure or lock cable router 710 to longitudinal and/or transverse wires 42, 44 of cable tray 40. While cable router 710 is shown with two substantially horizontal slots 719 in each second bracket portion 752, it will be understood that, in certain aspects more than two slots 719 or fewer than two slots 719 may be included. Prior to tightening of bolts and/or when the bolts are loosened, elongate substantially horizontal slots 719 permit easy adjustment and/or alignment of cable router 710 along the first direction (e.g., the longitudinal direction of cable tray 40). When cable router 710 is located in the desired location on cable tray 40, the bolts are tightened to secure cable router 710 in place. While slots 719 are shown, it will be understood that certain aspects may include other types of apertures, such as holes, without departing from the scope of the current disclosure. For example, in various aspects a population of holes (e.g., about 2, about 3, about 4, about 5, about 6, etc.) may be provided in each second bracket portion 752, wherein the population of holes permit easy adjustment and/or alignment of cable router 710 along the first direction (e.g., the longitudinal direction of cable tray 40).

Substantially L-shaped brackets 750 provide a sufficiently rigid connection of cable router 710 to cable tray 40 such that cable router 710 need not be secured to cable tray 40 using additional brackets or tabs (such as those described in connection with cable routers 10, 110, 310, and/or 410). Accordingly, vertical rear wall 18 need not extend a distance below the ends of left and right ramps 14, 16 as in cable routers 110, 310, 410, and 610. Cable router 710 thus floats above and cantilevers over cable tray 40 and permits cables to be run under cable router 710 without having to feed the cable between the side wall 48 of cable tray 40 and bracket(s) 50 of cable router 10 or vertical rear walls 118, 318, 418, and 618 of cable routers 110, 310, 410, and 610 respectively.

FIGS. 39-46 illustrate yet another aspect of cable router 810 wherein cable router 810 snaps or slides on or into cable tray 40. Cable router 810 includes slotted portions which are adapted to receive longitudinal wires 42 of cable tray 40. Cable router 810 is adapted to be used in smaller cable trays and with lighter and/or smaller number of cables, wherein the rigid attachment by brackets, bolts, clips, etc. is not required. For example, cable router 810 may be used to route various wires or cables to an office desk, such as, Ethernet cable(s), power cable(s), audio/visual cable(s), fiber optic cable(s), telephone cable(s).

Cable router 810 includes floor 12, left ramp 14, right ramp 16, front ramp 820, vertical left curved wall 22, vertical right curved wall 24, tabs 880, and arms 890. Unlike cable router 10, front ramp 820 of cable router 810 does not include brace 20*b*. Cable router 810 is shown with two tabs 880, each having a wire receiving slot 884. Tabs 880 extend or project downward from below floor 12 and/or front ramp 820 in a direction opposite the upward extension or projection of vertical left and right curved walls 22, 24. A wire receiving slot 884 extends substantially vertical upward into each tab 880 and terminates in a semi-circular portion proximate the bottom side of floor 12 and/or front ramp 820. Wire receiving slots 884 are adapted to receive a longitudinal wire 42 of cable tray 40 when cable router 810 is placed on cable tray 40. Tab 880 may further include a tooth (not shown) extending into wire receiving slot 884 which may assist in retaining cable router 810 on cable tray 40. That is, a longitudinal wire 42 of the side wall 48 of cable tray 40 may snap into wire receiving slot 884 where it may be held in place by a tooth.

Stated another way, tab 880 can be described as having a first tab portion 881 and a second tab portion 882 separated a distance to create wire receiving slot 884. First tab portion 881 may be characterized as a right triangular shaped portion extending or projecting downward from below floor 12 and/or front ramp 820 wherein first tab portion 881 tapers in width from the base proximate floor 12 and/or front ramp 820 to a terminal point proximate the bottom of tab 880 and opening of wire receiving slot 884. The right triangular shape of first tab portion 881 assists in providing structural rigidity to tab 880. Second tab portion 882 may be characterized as a finger extending or projecting downward below floor 12 and/or front ramp 820. Second tab portion 882 may additionally include a chamfered or tapered tip portion 882*a* which serves to widen the entry of wire receiving slot 884 and may permit an increase in the ease with which cable router 810 may be placed on cable tray 40. That is, the chamfered or tapered tip portion 882*a* of second tab portion 882 may assist in guiding longitudinal wire 42 of cable tray 40 into wire receiving slot 884 of cable router 810.

As shown, cable router 810 includes two tabs 880, a first tab 880 proximate vertical left curved wall 22 and a second tab 880 proximate vertical right curved wall 24. In other aspects, cable router 810 may include less than two tabs 880. For example, a single tab 880 may extend or project downward from below floor 12 and/or front ramp 820 in a direction opposite the upward extension or projection of vertical left and right curved walls 22, 24. Such single tab 880 may be proximate vertical left curved wall 22, may be proximate vertical right curved wall 24, may be located substantially in the middle between vertical left curved wall 22 and vertical right curved wall 24, or at any location therebetween.

In yet other aspects, cable router 810 may include more than two tabs 880 (e.g., about 3 tabs, about 4 tabs, about 5 tabs, about 6 tabs, about 7 tabs, about 8 tabs, about 9 tabs, about 10 tabs, etc.). For example, a first tab 880 may be proximate vertical left curved wall 22, a second tab 880 may be proximate vertical right curved wall 24, a third tab 880 may be located substantially in the middle between first vertical left curved wall 22 and vertical right curved wall 24, and/or additional tabs 880 may be located at any location therebetween.

While tabs 880 are illustrated as thin tabs, in various aspects, tabs 880 may be substantially thicker such that tab 880 may be said to be a solid projection extending downward from below floor 12 and/or front ramp 820 in a direction opposite the upward extension or projection of vertical left and right curved walls 22, 24. Accordingly, the solid projection may extend a thickness in the first direction having a first end proximate vertical left curved wall 22 and a second end proximate vertical right curved wall 24. That is, the solid projection may have a thickness substantially the same as the width of first ramp (see, e.g., $W_F$ in FIG. 2). In such aspects, wire receiving slot 884 may be said to be a wire receiving channel extending through the thickness of the solid projection in the first direction.

In addition to tabs 880, cable router 810 further includes two arms 890, each having a wire receiving slot 894. Arms 890 extend or project at an angle downward and forward from vertical left and right curved walls 22, 24 in the second direction away from rear wall 18. A wire receiving slot 894 extends substantially vertical upward into each arm 890 and terminates in a semi-circular portion. Wire receiving slots 894 are adapted to receive a longitudinal wire 42 of the side wall 48 of cable tray 40 when cable router 810 is placed on cable tray 40. Arm 890 may further include a tooth 896 extending into wire receiving slot 894 which may assist in retaining cable router 810 on cable tray 40. That is, a longitudinal wire 42 of the side wall 48 of cable tray 40 may snap into wire receiving slot 894 where it may be held in place by tooth 896.

Stated another way, arm 890 can be described as having a first arm portion 891 and a second arm portion 892 separated a distance to create wire receiving slot 884. First arm portion 891 extends or projects at an angle downward and forward from vertical left and right curved walls 22, 24 in the second direction away from rear wall 18. Second arm portion 892 may be characterized as an inverted substantially L-shaped finger extending or projecting downward from first arm portion 891. Second arm portion 892 may additionally include a chamfered or tapered tip portion 892*a* which serves to widen the entry of wire receiving slot 894 and may permit an increase in the ease with which cable router 810 may be placed on cable tray 40. That is, the chamfered or tapered tip portion 892*a* of second arm portion 892 may assist in guiding longitudinal wire 42 of cable tray 40 into wire receiving slot 894 of cable router 810.

As shown, cable router 810 includes two arms 890, a first arm 890 proximate the terminal end 22*d* of vertical left curved wall 22 and a second arm 890 proximate the terminal end 24*d* of vertical right curved wall 24. Cable router 810 may further include a brace portion 898 extending between each arm 890 and the terminal ends 22*d*, 24*d* of vertical left and right curved walls 22, 24. Brace portions 898 may provide structural support for arms 890. As shown first and second arms 880 are shown slightly inset from the terminal ends 22*d*, 24*d* of vertical left and right curved walls 22, 24; however, it will be understood that in various aspects, first and second arms 890 may be at the terminal ends 22*d*, 24*d* of vertical left and right curved walls 22, 24. In one embodiment first and second arms 890 are set at a distance apart wider than the distance between first and second tabs 880. Placing first and second arms 890 wider apart than first and second tabs 880, provides resistance to rotational or rocking motion of cable router 810 in a direction parallel to the transverse direction of cable tray 40.

In other aspects, cable router 810 may include less than two arms 890. For example, a single arm 890 may extend or project at an angle downward and forward from vertical left and right curved walls 22, 24 in the second direction away from rear wall 18. Such single tab 880 may be proximate to or at terminal end 22*d* of vertical left curved wall 22, may be proximate to or at terminal end 24*d* of vertical right curved wall 24, may be located substantially in the middle between vertical left curved wall 22 and vertical right curved wall 24, or at any location therebetween.

In yet other aspects, cable router 810 may include more than two arms 890 (e.g., about 3 arms, about 4 arms, about 5 arms, about 6 arms, about 7 arms, about 8 arms, about 9 arms, about 10 arms, etc.). For example, a first arm 890 may be proximate to or at terminal end 22*d* of vertical left curved wall 22, a second arm 890 may be proximate to or at terminal end 24*d* of vertical right curved wall 24, a third arm 890 may be located substantially in the middle between terminal end 22*d* of vertical left curved wall 22 and terminal end 24*d* of vertical right curved wall 24, and/or additional arms 890 may be located at any location therebetween.

While arms 890 are illustrated as thin arms, in various aspects, arms 890 may be substantially thicker such that arm 890 may be said to be a solid projection that extends or projects at an angle downward and forward from vertical left and right curved walls 22, 24 in the second direction away from rear wall 18. Accordingly, the solid projection may extend a thickness in the first direction having a first end proximate to or at terminal end 22d of vertical left curved wall 22 and a second end proximate to or at terminal end 24d of vertical right curved wall 24. That is, the solid projection may have a thickness substantially the same as the width of cable router 810 in the first direction. In such aspects, wire receiving slot 894 may be said to be a wire receiving channel extending through the thickness of the solid projection in the first direction.

Figure 44:
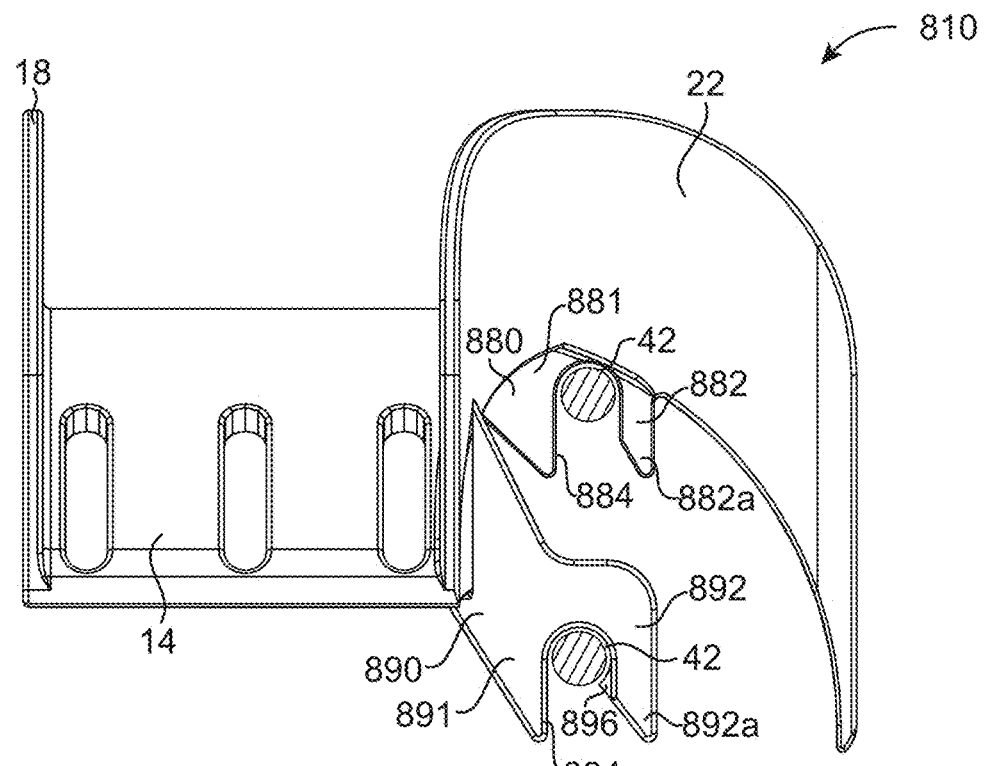
FIG. 44 is a left view of a cable router according to a ninth aspect of the disclosure.
Figure 45:
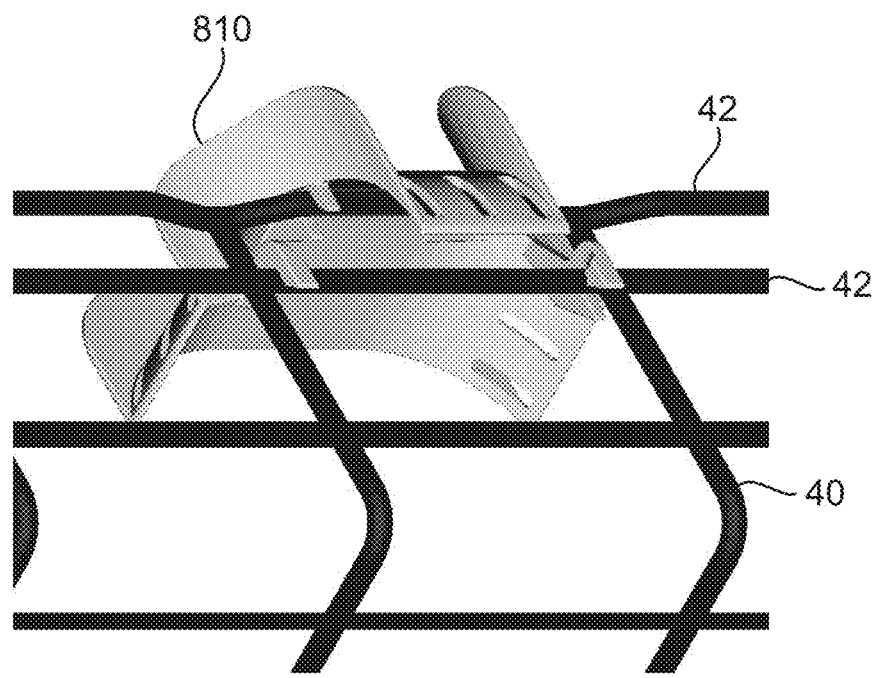
FIG. 45 is a left bottom perspective view of a cable router affixed to a cable tray according to a ninth aspect of the disclosure.
Figure 46:
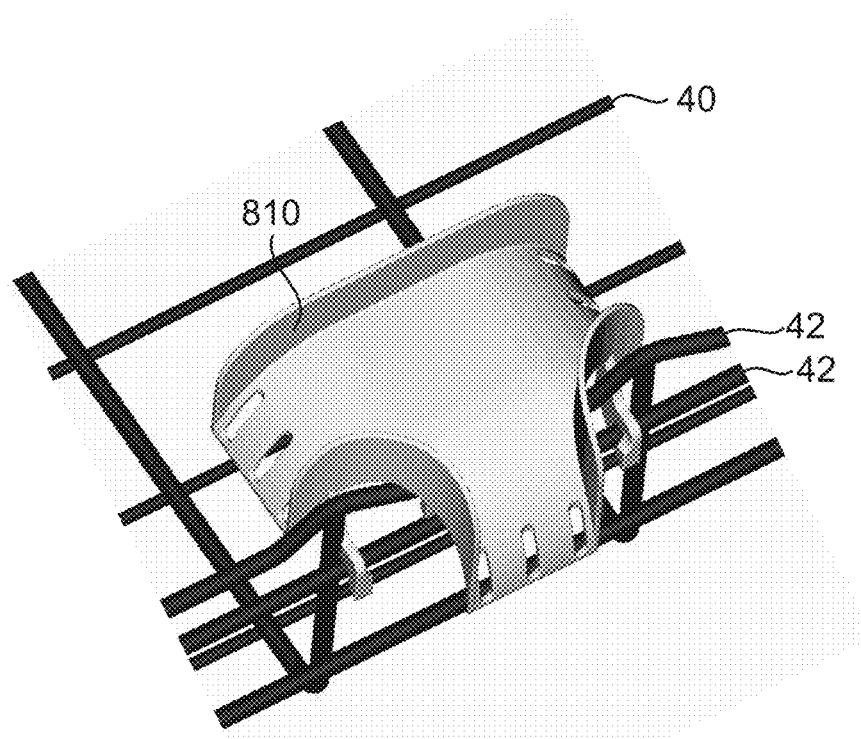
FIG. 46 is a left top perspective view of a cable router affixed to a cable tray according to a ninth aspect of the disclosure.
Figure 47:
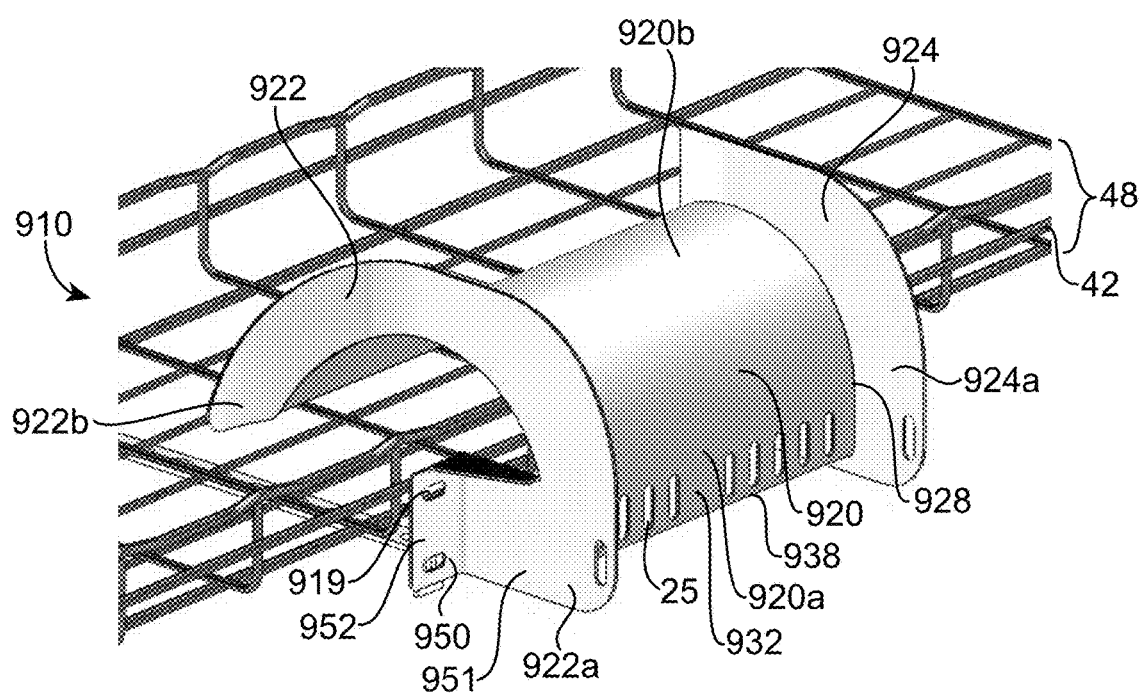
FIG. 47 is a left front perspective view of a cable router according to a tenth aspect of the disclosure.
Figure 48:
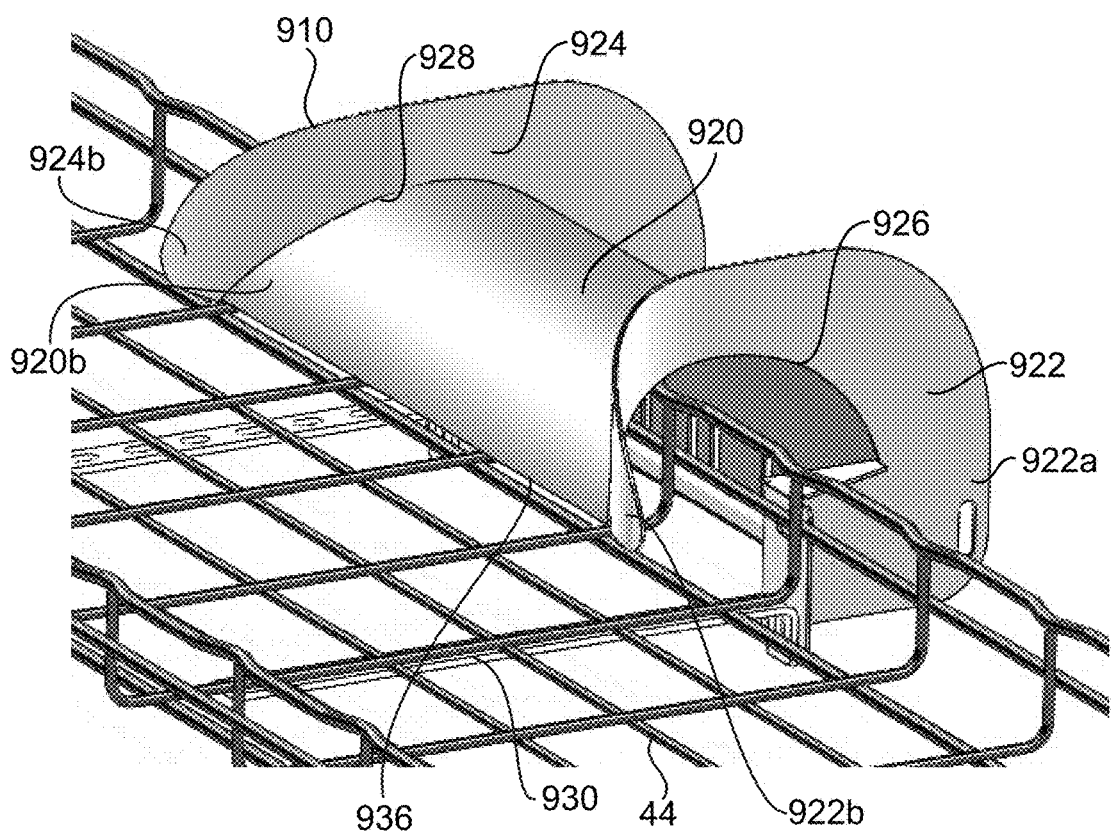
FIG. 48 is a left rear perspective of a cable router according to a tenth aspect of the disclosure.
Figure 49:
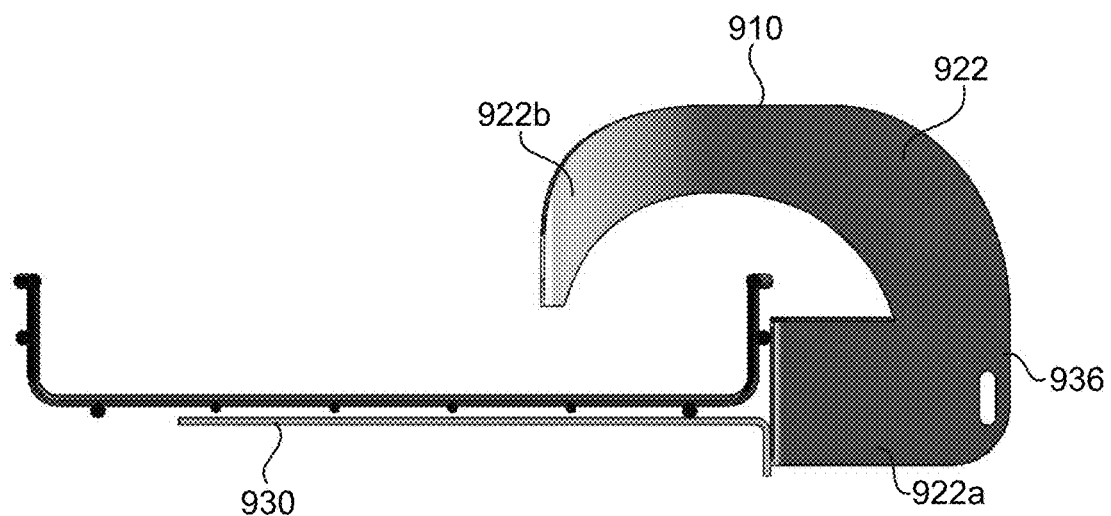
FIG. 49 left view of a cable router according to a tenth aspect of the disclosure.

Now with reference to FIGS. 44-46, wire receiving slots 884, 894 of tabs 880 and arms 890 are closely aligned in the second direction. Wire receiving slots 884 of tabs 880 are positioned slightly further away from rear wall 18 than wire receiving slots 894 of arms 890. This slight offset in alignment of wire receiving slots 884, 894 accommodates cable trays wherein the top longitudinal wire 42 of a sidewall 48 of cable tray 40 is slightly bowed outward as compared to an adjacent lower longitudinal wire 42 of the sidewall 48. In various aspects, however, the centerlines of wire receiving slots 884, 894 of tabs 880 and arms 890 may be coplanar such that there is no offset in the second direction between wire receiving slots 884 of tabs 880 and wire receiving slots 894 of arms 890.

In one embodiment, cable router 810 is used in lighter duty applications as compared to cable routers 10, 110, 210, 310, 410, 510, and 610. In various aspects, cable router 810 may be smaller in size than cable routers 10, 110, 210, 310, 410, 510, and 610. Cable router 810 may be used to carry a small number of cables (e.g., about 1, about 2, about 3, about 4, about 5) and therefore does not need to be large in size and/or does not need to be mounted in cable tray 40 in the manner provided for cable routers 10, 110, 210, 310, 410, 510, and 610. In one embodiment, cable router 810 is constructed of plastic; however, it will be understood that any type of suitable materials, may be used, including, but not limited to, composites (e.g., fiberglass, carbon fiber, etc.), and metals (e.g., steel, stainless steel, aluminum or alloys thereof).

FIGS. 47-50 illustrate yet another aspect of cable router 910. Cable router 910 includes curved ramp 920 having front curved ramp portion 920a, rear curved ramp portion 920b, vertical left curved wall 922 joined to the left side (when viewed from the front) of the curved ramp 920 along seam 926, and vertical right curved wall 924 joined to the right side (when viewed from the front) of the curved ramp 920 along seam 928. In certain embodiments, particular those embodiments in which cable router 910 may be molded, seams 926 and 928 may not be included as the right and left curved walls 922 and 924 may transition into the curved ramp 920. Unlike other cable routers described herein, cable router 910 lacks a floor and rear wall. The curved front ramp 920 may curve rearwardly over one of the sidewalls 48 of cable tray 40. The front portion 932 of the curved ramp 920 may be substantially vertical. However, it will be understood that, in certain aspects, curved ramp 920, which includes front portion 932, front curved ramp portion 920a, rear curved ramp portion 920b, and rear portion 934 may be formed of a continuous curve. In this embodiment, the cable router 910 is secured to the sidewall 48 of the cable tray 40 and the rear curved ramp portion 920b may float above and cantilevers over cable tray 40 and permits cables to be run under cable router 910.

The front portion 932 can include a population of apertures 25, such as holes or slots. The apertures 25 may be used to secure one or more cables to the curved ramp 920. For instance, zip ties, hose clamps, straps, etc. may be looped through one or more of the population of apertures 25 and around cables routed through cable router 910 to secure cables to cable router 910.

Figure 50:
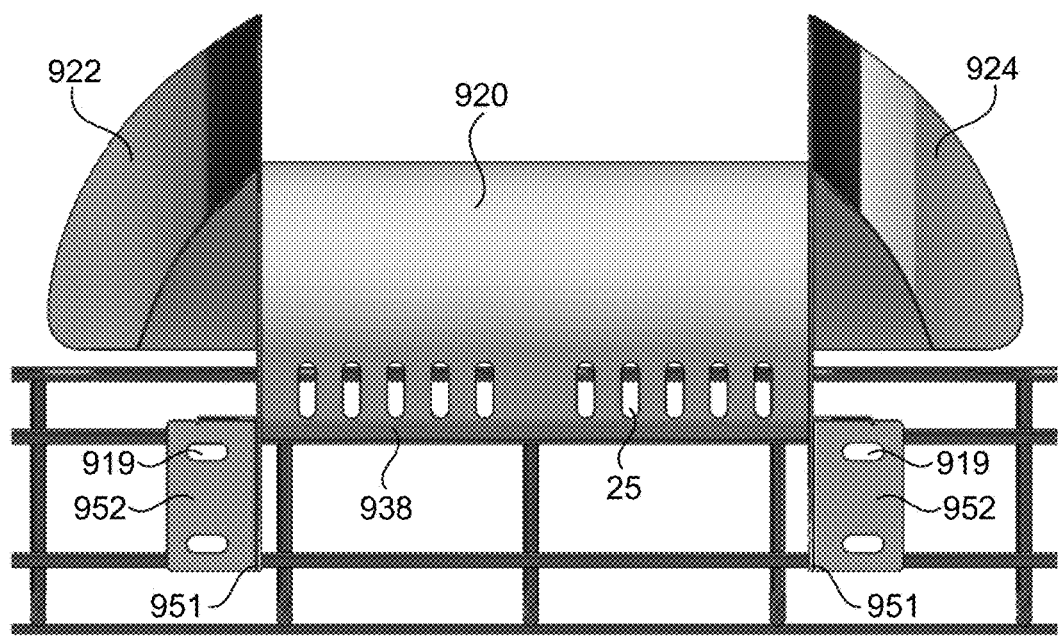
FIG. 50 is front view of a cable router affixed to a cable tray according to a tenth aspect of the disclosure.
Figure 51:
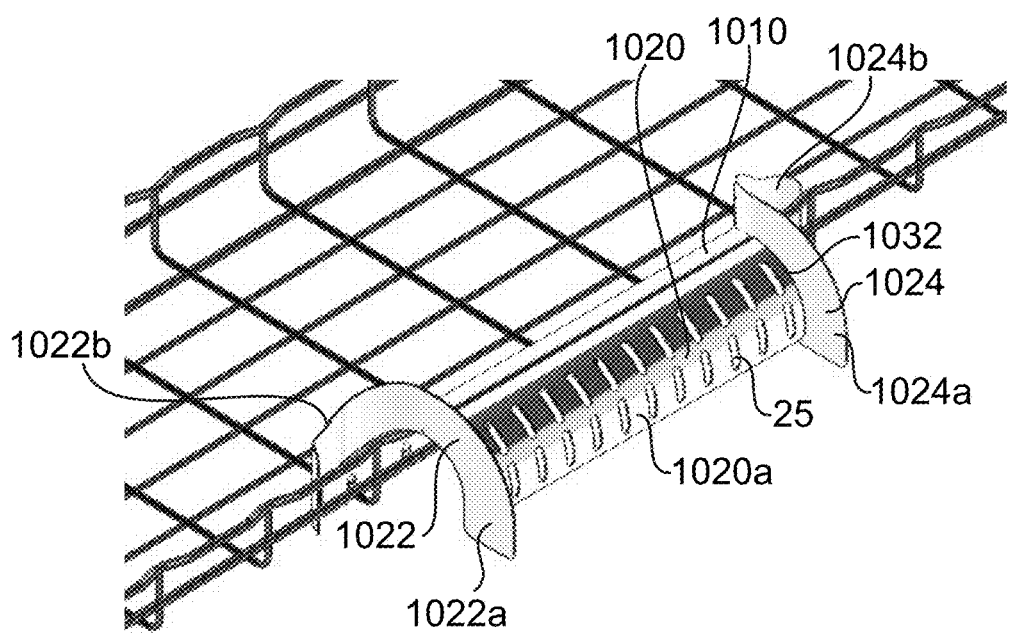
FIG. 51 is a left front perspective view of a cable router affixed to a cable tray according to an eleventh aspect of the disclosure.

Referring again to FIGS. 47-50, vertical left and right curved walls, 922 and 924 extend the entire length of the curved ramp 920 from the edge of the front portion 938 to the edge of the rear portion 936. A first portion 922a and 924a of the curved walls extend forward of the front portion 920a of the curved ramp 920. Furthermore, a second portion 922b of left curved wall 922 extends leftward (when viewing cable router 910 from a front view as illustrated in FIG. 50) along a direction generally perpendicular to the first portion 922a. Similarly, a second portion 924b of right curved wall 924 extends rightward along a direction generally perpendicular to the first portion 924a. Thus, the rear portion 920b of the curved ramp 920 flares outwardly in both directions such that the edge 936 of the rear portion 934 may be wider than the edge 938 of the front portion 932.

Cable router 910 further includes two integrally formed substantially L-shaped brackets 950, one each extending from vertical left curved wall 922 and vertical right curved wall 924. Cable router 910 may be secured to a cable tray 40 using brackets 950.

Each bracket 950 includes first bracket portion 951 and second bracket portion 952, wherein second bracket portion 952 is substantially perpendicular to first bracket portion 951. First portions 922a, 924a of vertical left and right curved walls 922, 924 extend forward along the second direction away from front curved ramp 920 and perpendicular to the front portion 920a. First bracket portion 951 of each bracket 950 is located proximate the bottom end of each of first portions 922a, 924a of vertical left and right curved walls 922, 924 and extends rearward along the second direction toward the rear curved ramp portion 920b. First bracket portion 951 of each bracket 950 is substantially co-planar with each of first portions 922a, 924a of vertical left and right curved walls 922, 924. However, in other aspects it will be understood that first bracket portion 951 may be bent at an angle with respect to first portions 922a, 924a of vertical left and right curved walls 922, 924. The second bracket portion 952 of each bracket 950 extends substantially perpendicular from first bracket portion 951 and outward away from first portions 922a, 924a of vertical left and right curved walls 922, 924.

In one embodiment, each second bracket portion 952 of brackets 950 includes one or more elongate substantially horizontal slots 919 through which bolts or other fasteners may extend to secure cable router 910 to cable tray 40. In one embodiment, bolts will extend through slots 919 of second bracket portions 952 and through clips to secure or lock cable router 910 to the cable tray 40. While cable router 910 is shown with two substantially horizontal slots 919 in each second bracket portion 952, it will be understood that, in certain aspects more than two slots 919 or fewer than two slots 919 may be included. Prior to tightening of bolts and/or when the bolts are loosened, elongate substantially horizontal slots 919 permit easy adjustment and/or alignment of cable router 910 along the first direction (e.g., the longitudinal direction of cable tray 40). When cable router 910 is located in the desired location on cable tray 40, the bolts are tightened to secure cable router 910 in place. While slots 919 are shown, it will be understood that certain aspects may include other types of apertures, such as holes, without departing from the scope of the current disclosure. For example, in various aspects a population of holes (e.g., about 2, about 3, about 4, about 5, about 6, etc.) may be provided in each second bracket portion 952, wherein the population of holes permit easy adjustment and/or alignment of cable router 910 along the first direction (e.g., the longitudinal direction of cable tray 40). Cable router 910 may be constructed of plastic; however, it will be understood that any type of suitable materials, may be used, including, but not limited to, composites (e.g., fiberglass, carbon fiber, etc.), and metals (e.g., steel, stainless steel, aluminum or alloys thereof).

Substantially L-shaped brackets 950 provide a sufficiently rigid connection of cable router 910 to cable tray 40. Alternatively, cable router 910 may be secured to cable tray 40 by using bolts passing through horizontal slots 919 and securing the cable router 910 to additional brackets 930 adhered to transverse wire 44.

FIGS. 51-56 illustrate yet another aspect of cable router 1010. Cable router 1010 includes curved ramp 1020 having front curved ramp portion 1020a and rear curved ramp portion 1020b, vertical left curved wall 1022, and vertical right curved wall 1024. Unlike other cable routers described herein, cable router 1010 lacks a floor and rear wall. The curved ramp 1020 may curve rearwardly over one of the sidewalls 48 of cable tray 40, permitting the rear curved ramp portion 1020b to be attached to the cable tray 40 as described below. The terminal ends of front curved ramp portion 1020a and the rear curved ramp portion 1020b may substantially vertical. However, it will be understood that, in certain aspects, curved ramp 1020, which includes front portion 1032, front curved ramp portion 1020a, rear curved ramp portion 1020b, and rear portion 1034 may be formed of a continuous curve.

The front curved ramp portion 1020a may include a population of apertures 25, such as holes or slots. The apertures 25 may be used to secure one or more cables to the curved ramp 1020. For instance, zip ties, hose clamps, straps, etc. may be looped through one or more of the population of apertures 25 and around cables routed through cable router 1010 to secure cables to cable router 910.

Figure 55:
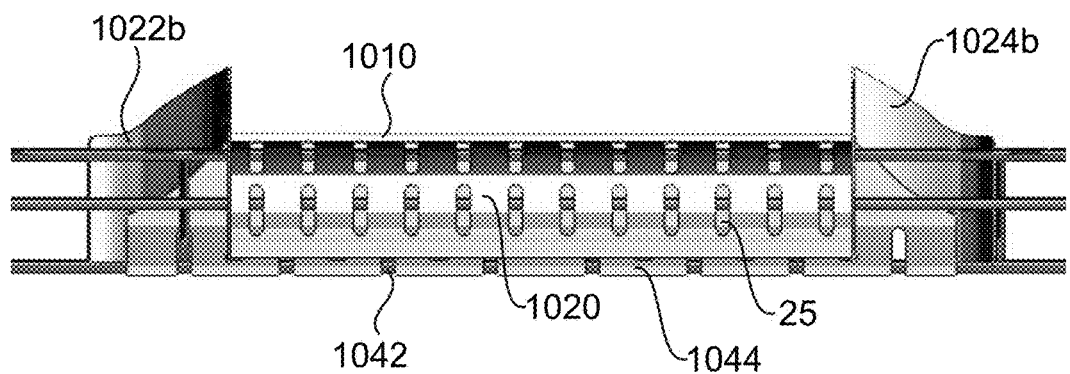
FIG. 55 is a front view of a cable router according to an eleventh aspect of the disclosure.
Figure 56:
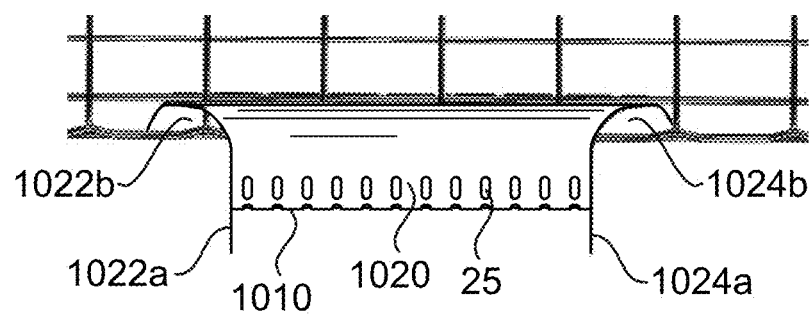
FIG. 56 is a top view of a cable router according to an eleventh aspect of the disclosure.
Figure 57:
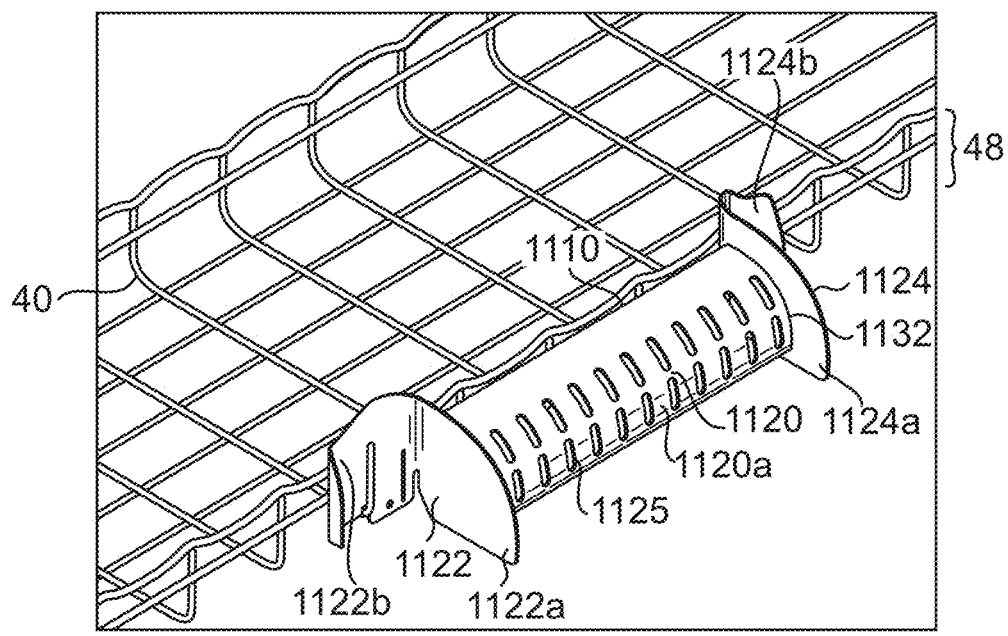
FIG. 57 is a left front perspective view of a cable router affixed to a cable tray according to a twelve aspect of the disclosure.

Referring again to FIGS. 51-56, vertical left and right curved walls, 1022 and 1024, extend the entire length of the curved ramp 1020 and are joined to the curved ramp 1020 along seams 1030 and 1032. In certain embodiments, particular those embodiments in which cable router 1010 may be molded, seams 1030 and 1032 may not be included as the right and left curved walls 1022 and 1024 may transition into the curved ramp 1020. A first portion 1022a and 1024a of each wall extends forward of the front portion 1032 of the curved ramp 1020. Furthermore, a second portion 1022b of left curved wall 1022 extends leftward (when viewing cable router 1010 from a front view as illustrated in FIG. 55) along a direction generally perpendicular to the first portion 1022a. Similarly, a second portion 1024b of right curved wall 1024 extends rightward along a direction generally perpendicular to the first portion 1024a. Thus, the rear curved ramp portion 1020b of the curved ramp 1020 flares outwardly in both lateral directions such that the edge 1036 of the rear curved ramp portion 1020b may be wider than the front curved ramp portion 1020a.

Figure 52:
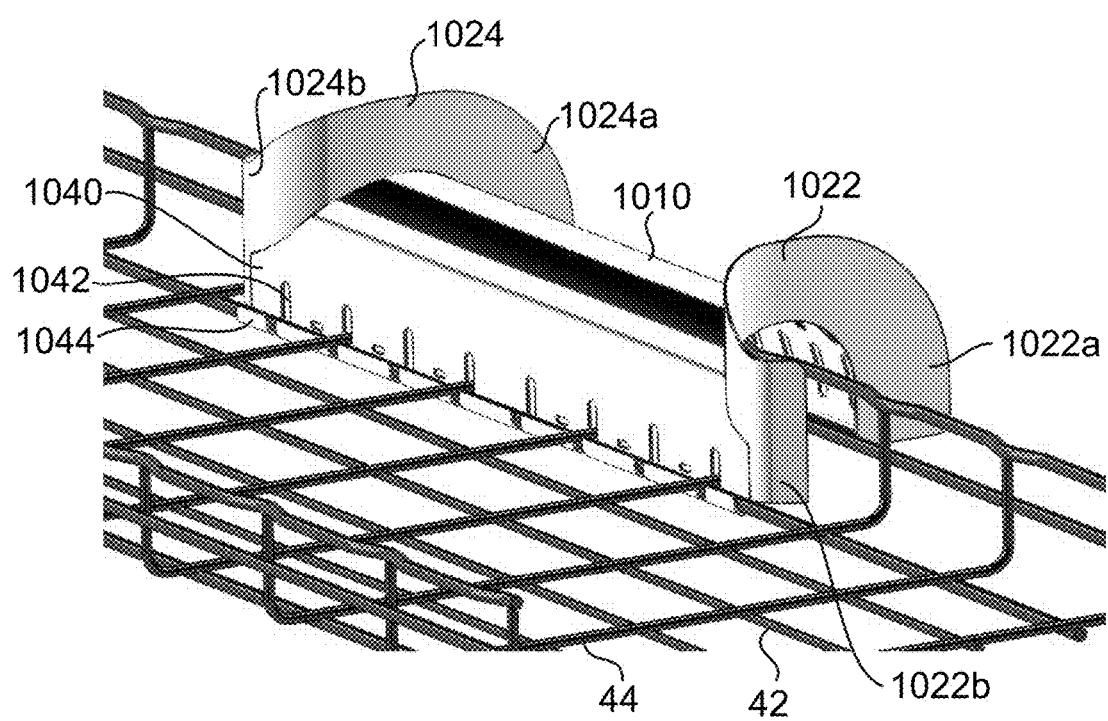
FIG. 52 is a left rear perspective view of a cable router according to an eleventh aspect of the disclosure.
Figure 53:
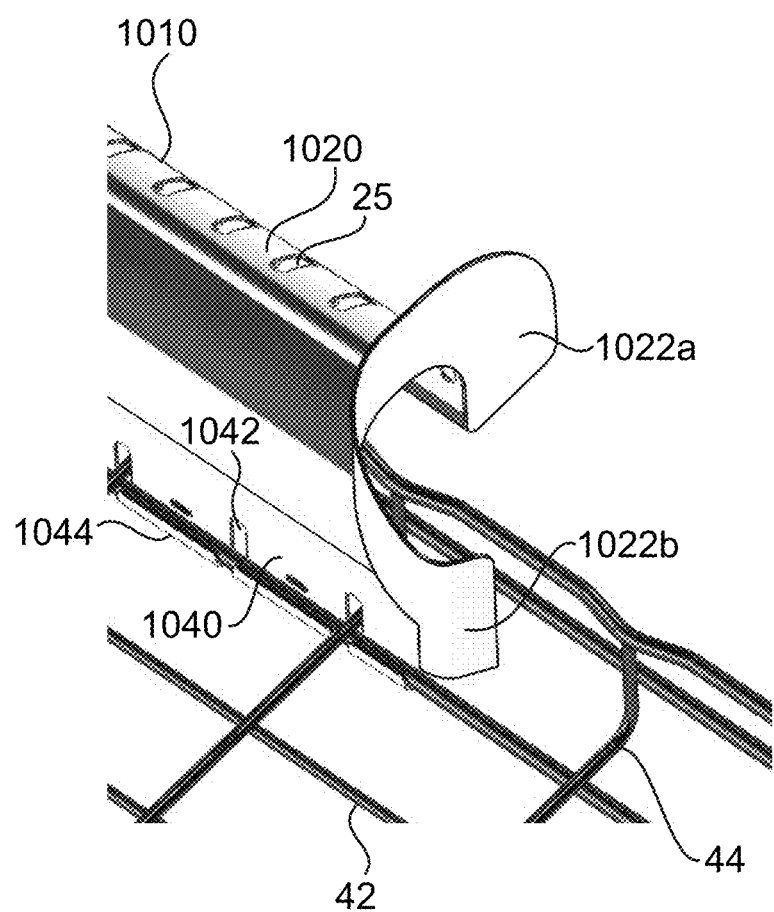
FIG. 53 is a detail left front perspective view of a cable router according to an eleventh aspect of the disclosure.
Figure 54:
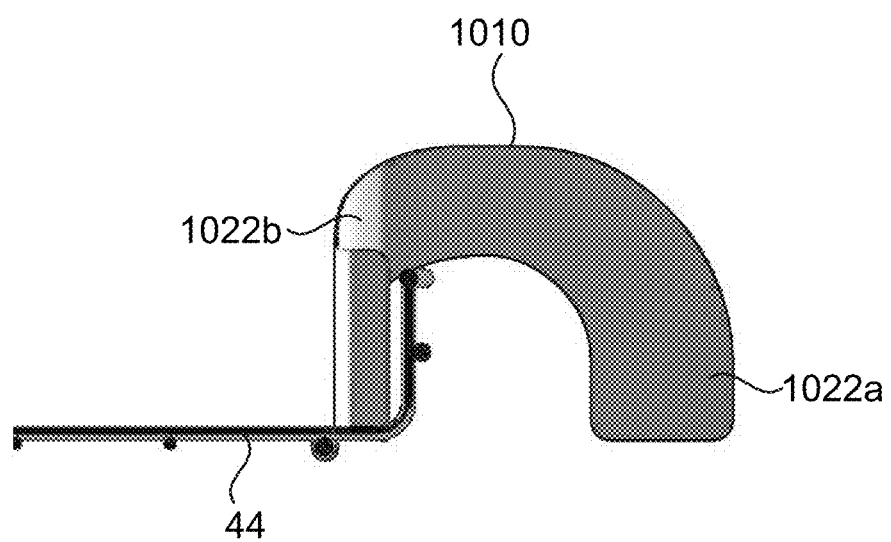
FIG. 54 is a left view of a cable router according to an eleventh aspect of the disclosure.

As illustrated in FIGS. 52-53, the rear curved ramp portion 1020b of the curved ramp 1020 provides a means for attaching the cable router 1010 to one of the longitudinal wires 42 of the cable tray 40. Thus, in one embodiment, the rear curved ramp portion 1020b includes a series of tabs 1040 separated by a series of notches 1042. The ends of the tabs 1040 are bent back over the tab such that the bent portion 1044 of each tab 1040 forms a channel for retaining at least a portion of the longitudinal wires 42 as a portion of the transverse wires 44 are seated into the notches 1042. The weight of the cable router 1010 ensures that the longitudinal wires 42 are firmly seated into the channel formed by the bent portions 1044, thus securing the cable router 1010 to the cable tray 40. With this aspect of the cable router 1010, the cable router 1010 takes up very little real estate of the floor of the cable tray 40. Cable router 1010 may be constructed of plastic; however, it will be understood that any type of suitable materials, may be used, including, but not limited to, composites (e.g., fiberglass, carbon fiber, etc.), and metals (e.g., steel, stainless steel, aluminum or alloys thereof).

FIGS. 57-62 illustrate yet another aspect of cable router 1110. Cable router 1110 includes curved ramp 1120 having front curved ramp portion 1120a, rear curved ramp portion 1120b, vertical left curved wall 1122, and vertical right curved wall 1124. Unlike other cable routers described herein, cable router 1110 lacks a floor and rear wall. The curved ramp 1120 may curve rearwardly over one of the sidewalls 48 of cable tray 40, permitting the rear curved ramp portion 1120b to be attached to the cable tray 40 as described below. The terminal ends of front curved ramp portion 1120a and the rear curved ramp portion 1120b may substantially vertical. However, it will be understood that, in certain aspects, curved ramp 1120, which includes front curved ramp portion 1120a and rear curved ramp portion 1120b, may be formed of a continuous curve. Alternatively, only the rear curved ramp portion 1120b may include a substantially planar vertical rear portion 1134.

The front curved ramp portion 1120a may include a population of apertures 1125, such as holes or slots. The apertures 1125 may be used to secure one or more cables to the curved ramp 1120. For instance, zip ties, hose clamps, straps, etc. may be looped through one or more of the population of apertures 1125 and around cables routed through or over cable router 1110 to secure cables to cable router 1110.

Referring again to FIGS. 57-62, vertical left and right curved walls, 1122 and 1124, preferably extend the entire length of the curved ramp 1120 and are joined to the curved ramp 1120 along seams 1130 and 1132. In certain embodiments, in particular those embodiments in which cable router 1110 may be molded, seams 1130 and 1132 may not be included as the right and left curved walls 1122 and 1124 may transition into the curved ramp 1120. A first portion 1122a and 1124a of each wall extends forward of the front curved ramp portion 1120a of the curved ramp 1120. Furthermore, a second portion 1122b of left curved wall 1122 extends leftward along a direction generally perpendicular to the first portion 1122a. Similarly, a second portion 1124b of right curved wall 1124 extends rightward along a direction generally perpendicular to the first portion 1124a. Thus, the rear curved ramp portion 1120b of the curved ramp 1120 flares outwardly in both lateral directions such that the rear edge of the rear curved ramp portion 1120b may be wider than the front curved ramp portion 1120a.

Figure 58:
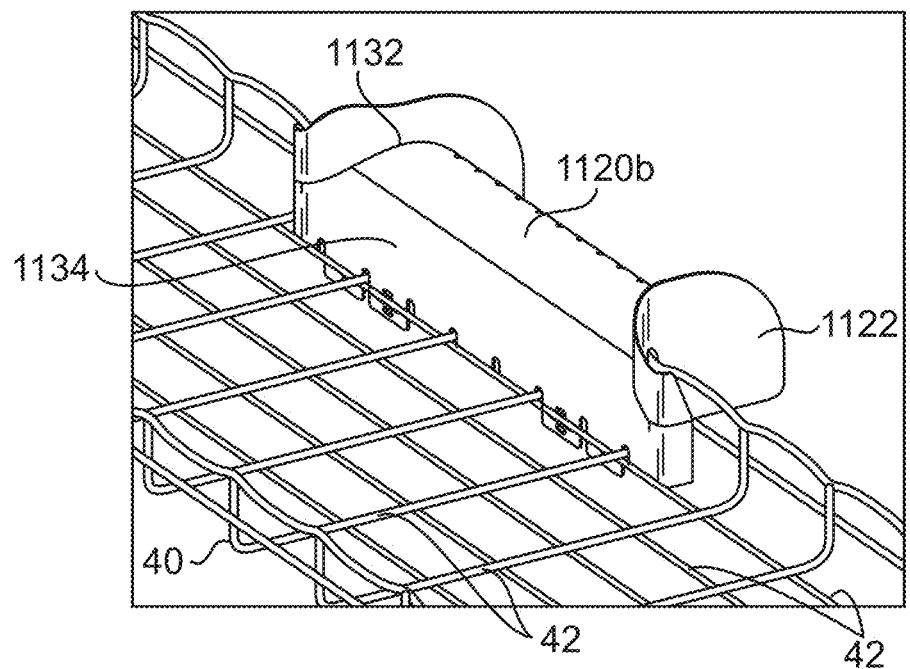
FIG. 58 is a left rear perspective view of a cable router according to a twelve aspect of the disclosure.
Figure 59:
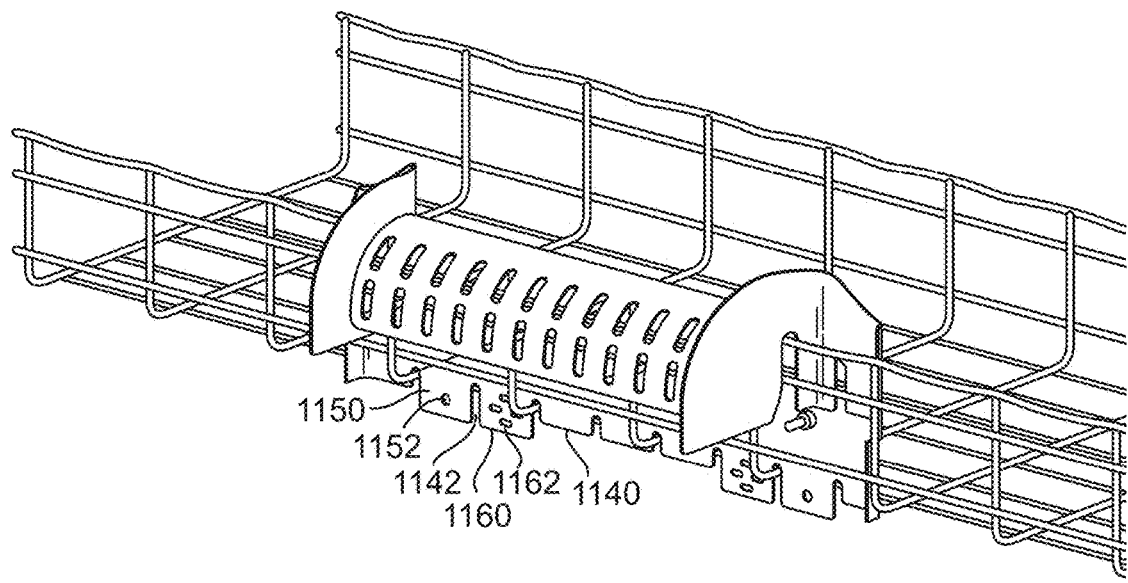
FIG. 59 is a right front perspective view of a cable router affixed to a cable tray according to a twelve aspect of the disclosure.
Figure 60:
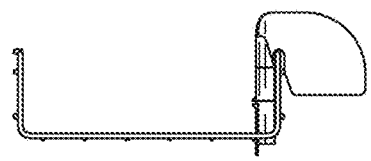
FIG. 60 is a left view of a cable router according to a twelve aspect of the disclosure.

As illustrated in FIGS. 58-59, the rear curved ramp portion 1120b of the curved ramp 1120 provides a means for attaching the cable router 1110 to one of the longitudinal wires 42 of the cable tray 40. Thus, in one embodiment, the rear curved ramp portion 1120b includes a population of tabs 1140 separated by a series of notches 1142 such that a portion of the wires 44 are seated into the notches 1142.

A number of the tabs 1140 may be in the form of bendable secure tabs 1160 having slots 1162. The secure tabs 1140 may be bent about a longitudinal wire 42 to secure the cable router 1110 to the cable tray 40. The slots 1162 may aid in the bending process by allowing the installer to use a screwdriver or other flat tool to bend the secure tabs 1140.

The rear curved ramp portion 1120b may also include a population of hardware secure tabs 1150 having holes 1152. The holes 1152 in the hardware secure tabs 1150 may be used to secure the cable router 1110 to an extender 1170 as described below.

Figure 61:
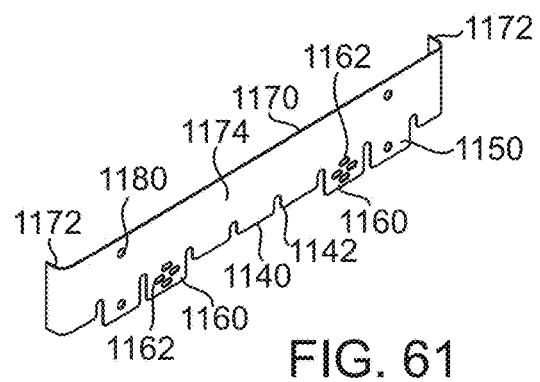
FIG. 61 is a left front perspective view of an extender according to the twelve aspect of the disclosure.
Figure 62:
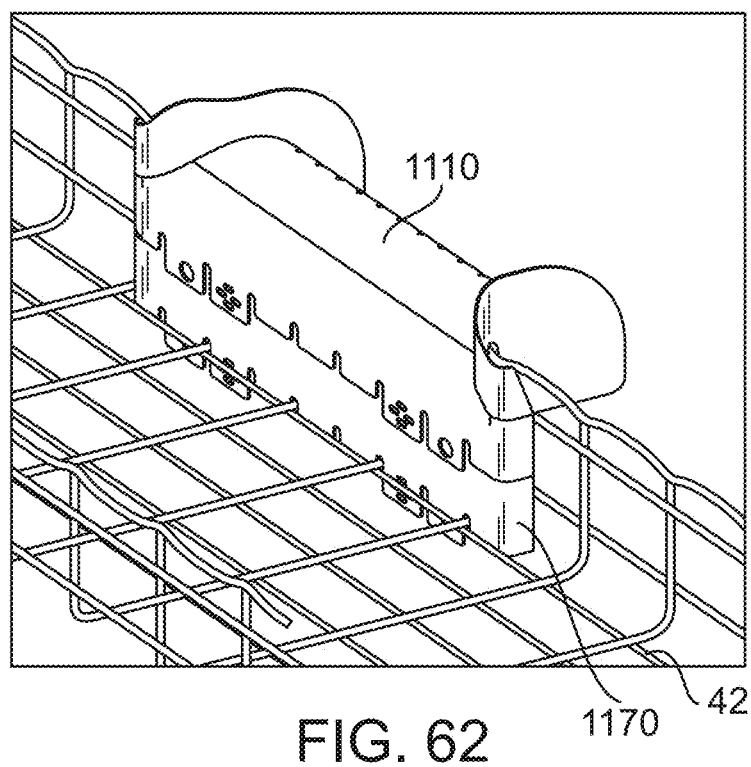
FIG. 62 is a left rear perspective view of an extender affixed to a cable router and cable tray according to a twelve aspect of the disclosure.

As illustrated in FIGS. 61-62, extender 1170 provides a means for attaching the cable router 1110 to one of the longitudinal wires 42 of the cable tray 40 when the cable tray 40 has a sidewall 48 of a greater height than the height of the cable router 1110. Thus, in one embodiment, the extender 1170 has a front side 1174, a curved end 1172 on the left side and a curved end 1172 on the right side so that the edge of the curved ends are substantially perpendicular to the front end side. The bottom portion of the extender 1170 may have similar features to the rear curved ramp portion 1120b of the cable router 1110. For example, the extender 1170 may include a population of tabs 1140 separated by a series of notches 1142 such that a portion of the wires 44 are seated into the notches 1142.

The extender 1170 may include bendable secure tabs 1160 having slots 1162. The secure tabs 1140 may be bent about a longitudinal wire 42 to secure the extender 1170 to the cable tray 40. The slots 1162 may aid in the bending process by allowing the installer to use a screwdriver or other flat tool to bend the secure tabs 1140.

The extender 1170 may also include a population of hardware secure tabs 1150 having holes 1152. The holes 1152 in the hardware secure tabs 1150 may be used to secure the extender 1170 to yet another extender 1170 to further allow the cable router 1110 to be secured to a cable tray.

The extender 1170 may also have a population of holes 1180. The holes 1180 may be used to secure the 1170 extender to the 1110 cable router. For instance, a fastener may be placed through the hole 1180 in the extender 1170 and through the hole 1152 of the cable router 1110 to secure the extender 1170 to the cable router 1110. Thus, the assembly of the cable router 1110 and the extender 1170 can be secured onto the cable tray 40 when cable router 40 has a sidewall 48 of a greater height than the height of cable router 1110.

The weight of the cable router 1110 ensures that a portion of the wires 44 are seated into the notches 1142. With this aspect of the cable router 1110, the cable router 1110 takes up very little real estate of the floor of the cable tray 40. Cable router 1110 may be constructed of plastic; however, it will be understood that any type of suitable materials, may be used, including, but not limited to, composites (e.g., fiberglass, carbon fiber, etc.), and metals (e.g., steel, stainless steel, aluminum or alloys thereof).

It will be understood that various features of the aspects of cable routers described herein may be used in combination with, or instead of, particular features of another aspect. For example, substantially L-shaped brackets 550, 650, 750, 950 affixed to or integrally formed with vertical left and right curved walls 22, 24, 622, 624, 722, 724, 922, 924 may be used in any aspect of cable routers 10, 110, 210, 310, 410, 510, 610, 710, 810 or 910 without departing from the scope of the disclosure. Additionally, for example, tabs 780 and arms 790 may be used in any aspect of cable routers 10, 110, 210, 310, 410, 510, 610, 710, or 810 without departing from the scope of the disclosure.

Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. An assembly comprising:
    a waterfall-type cable router for use with a cable tray, comprising:
        a curved ramp comprising a front portion and a rear portion, the ramp having a left side and a right side;
        a vertical left curved wall transitioning into the curved ramp and extending the length of the left side of the curved ramp, wherein the left curved wall comprises a first portion extending forward of the front portion of the curved ramp; and
        a vertical right curved wall transitioning into the curved ramp and extending the length of the right side of the curved ramp, wherein the right curved wall comprises a first portion extending forward of the front portion of the curved ramp;
        a plurality of flexible tabs in a first position extending downward from the rear portion of the curved ramp, wherein the flexible tabs are configured to allow bending to a second position to secure the cable router to the cable tray; and
        a plurality of secure tabs extending downward from the rear portion of the curved ramp wherein the tabs comprise a fastener hole to receive a fastener to secure the cable router to an extender; and
    an extender attached to the rear portion of the curved ramp comprising:
        a plate with a top portion and a bottom portion, and comprising a front face and a rear face;
        a plurality of tabs in a first position extending downward from the rear portion of the curved ramp wherein at least some of the tabs are configured to allow bending to a second position away from the front face to secure the extender to the cable tray; and
        a plurality of holes at the top portion of the plate wherein the holes at the top portion of the plate of the extender align with the fastener hole of the tabs on the cable router to receive the fastener to secure the extender to the cable router such that front face of the extender rests flush against the tabs of the cable router, and wherein the extender rests below and flush against the rear portion of the ramp.

2. The assembly of claim 1, wherein the bottom portion of the extender comprises of a population of notches configured to rest on one or more wires of a basket-type cable tray.

* * * * *